(12) United States Patent
Fan

(10) Patent No.: US 12,369,161 B2
(45) Date of Patent: Jul. 22, 2025

(54) COMMUNICATION METHOD AND APPARATUS

(71) Applicant: HUAWEI TECHNOLOGIES CO., LTD., Guangdong (CN)

(72) Inventor: Bo Fan, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 460 days.

(21) Appl. No.: 17/730,945

(22) Filed: Apr. 27, 2022

(65) Prior Publication Data

US 2022/0279491 A1 Sep. 1, 2022

Related U.S. Application Data

(63) Continuation of application No. PCT/CN2019/114876, filed on Oct. 31, 2019.

(51) Int. Cl.
H04W 72/0453 (2023.01)
H04L 5/00 (2006.01)
H04W 72/044 (2023.01)
H04W 72/23 (2023.01)

(52) U.S. Cl.
CPC ......... *H04W 72/23* (2023.01); *H04W 72/044* (2013.01)

(58) Field of Classification Search
CPC ............... H04W 72/23; H04W 72/044; H04W 72/0453; H04W 72/0446
See application file for complete search history.

(56) References Cited

U.S. PATENT DOCUMENTS

| 11,595,956 | B2* | 2/2023 | Cha | H04W 24/10 |
| 2020/0100223 | A1* | 3/2020 | Park | H04L 5/0092 |
| 2020/0221428 | A1 | 7/2020 | Moon et al. | |
| 2021/0368447 | A1* | 11/2021 | Kim | H04L 5/001 |
| 2021/0409094 | A1* | 12/2021 | Yuan | H04W 72/23 |
| 2022/0006570 | A1* | 1/2022 | Lee | H04W 72/543 |

FOREIGN PATENT DOCUMENTS

| CN | 108347778 A | 7/2018 |
| CN | 108809451 A | 11/2018 |
| CN | 109587710 A | 4/2019 |

(Continued)

OTHER PUBLICATIONS

3GPP TSG RAN WG1 meeting#89, R1-1707704 Title:NR PDCCH search space design with nested structure (Year: 2017).*

(Continued)

*Primary Examiner* — Faruk Hamza
*Assistant Examiner* — Abusayeed M Haque
(74) *Attorney, Agent, or Firm* — Fish & Richardson P.C.

(57) ABSTRACT

The present disclosure relates to communication methods and apparatuses. In one example method, configuration information is received from a network device, where the configuration information is used to configure a control-resource set and M search spaces associated with the control-resource set, and each search space in the M search spaces and the control-resource set are used to transmit a first physical downlink control channel (PDCCH) once. Further, the first PDCCH may be monitored on time-frequency resources corresponding to the control-resource set and the M search spaces. M is an integer greater than 1.

16 Claims, 15 Drawing Sheets

(56) References Cited

FOREIGN PATENT DOCUMENTS

| EP | 3461221 A1 | 3/2019 | | |
|---|---|---|---|---|
| EP | 3771133 A1 | 1/2021 | | |
| KR | 20190017675 A | 2/2019 | | |
| KR | 20190111307 A | 10/2019 | | |
| WO | 2014021058 A2 | 2/2014 | | |
| WO | 2019031850 A1 | 2/2019 | | |
| WO | WO-2020141014 A1 | * 7/2020 | ........... | H04B 7/0695 |

OTHER PUBLICATIONS

3GPP TSG RAN WG1 Meeting#90bis, R1-1717512 Title: Remaining details on group-common PDCCH (Year: 2017).*

CATT, "Discussion on Enhanced PDCCH for NR URLLC," 3GPP TSG RAN WG1 Meeting #92, R1-1801750, Athens, Greece, Feb. 26-Mar. 2, 2018, 4 pages.

Extended European Search Report issued in European Application No. 19951034.8 on Sep. 21, 2022, 15 pages.

Vivo, "Discussion on PDCCH Repetition for URLLC," 3GPP TSG RAN WG1 Meeting #92bis, R1-1803847, Sanya, China, Apr. 16-20, 2018, 6 pages.

Office Action in Chinese Appln. No. 201980101474.6, dated May 7, 2023, 10 pages.

3GPP TS 38.211 V15.4.0 (Dec. 2018), "3rd Generation Partnership Project; Technical Specification Group Radio Access Network; NR; Physical channels and modulation (Release 15)," Dec. 2018, 96 pages.

3GPP TS 38.212 V15.4.0 (Dec. 2018), "3rd Generation Partnership Project; Technical Specification Group Radio Access Network; NR; Multiplexing and channel coding (Release 15)," Dec. 2018, 100 pages.

3GPP TS 38.213 V15.4.0 (Dec. 2018), "3rd Generation Partnership Project; Technical Specification Group Radio Access Network; NR; Physical layer procedures for control (Release 15)," Dec. 2018, 104 pages.

3GPP TS 38.213 V15.7.0 (Sep. 2019), "3rd Generation Partnership Project; Technical Specification Group Radio Access Network; NR; Physical layer procedures for control (Release 15)," Sep. 2019, 108 pages.

3GPP TS 38.214 V15.4.0 (Dec. 2018), "3rd Generation Partnership Project; Technical Specification Group Radio Access Network; NR; Physical layer procedures for data (Release 15)," Dec. 2018, 102 pages.

3GPP TS 38.331 V15.4.0 (Dec. 2018), "3rd Generation Partnership Project; Technical Specification Group Radio Access Network; NR; Radio Resource Control (RRC) protocol specification (Release 15)," Dec. 2018, 474 pages.

3GPP TS 38.331 V15.7.0 (Sep. 2019), "3rd Generation Partnership Project; Technical Specification Group Radio Access Network; NR; Radio Resource Control (RRC) protocol specification (Release 15)," Sep. 2019, 527 pages.

Ericsson, "Correction on default CORESET for types 0A, 1, and 2 CSS," 3GPP TSG-RAN WG1 Meeting #97, R1-1907716, Reno, USA, May 13-17, 2019, 11 pages.

InterDigital, Inc. "On PDCCH transmission with high reliability," 3GPP TSG RAN WG1 Meeting #92, R1-1802576, Athens, Greece, Feb. 26-Mar. 2, 2018, 4 pages.

PCT International Search Report and Written Opinion issued in International Application No. PCT/CN2019/114876 on Jul. 27, 2020, 15 pages (with English translation).

Office Action issued in Indian Application No. 202227024300 on Sep. 14, 2022, 6 pages.

* cited by examiner

| Identifier of a serving cell | | Field 1 | Identifier of a control-resource set |
|---|---|---|---|
| Identifier of a control-resource set | Identifier of a TCI-state | | |
| Field 2 | Identifier of a TCI-state | | |
| Reserved bit | ... | | |

FIG. 10a

| Identifier of a serving cell | | F | Identifier of a control-resource set |
|---|---|---|---|
| Identifier of a control-resource set | TCI-state 1 | | |
| S/T | TCI-state 2 | | |

FIG. 10b

COMMUNICATION METHOD AND APPARATUS

CROSS-REFERENCE TO RELATED APPLICATIONS

This application is a continuation of International Application No. PCT/CN2019/114876, filed on Oct. 31, 2019, the disclosure of which is hereby incorporated by reference in its entirety.

TECHNICAL FIELD

This application relates to the field of wireless communications technologies, and in particular, to a communication method and apparatus.

BACKGROUND

In a communication system, a network device may send a physical downlink shared channel (PDSCH) to a terminal device, and the PDSCH is generally scheduled by using control information carried in a physical downlink control channel (PDCCH). The control information is, for example, downlink control information (DCI). Therefore, to correctly receive the PDSCH, the terminal device needs to first monitor the PDCCH, and obtains, by monitoring the PDCCH, the DCI carried in the PDCCH, to obtain related information required for receiving the PDSCH, for example, a location and a size of a time-frequency resource of the PDSCH.

In a fifth generation (5G) communication system, a plurality of types of services are introduced. Some services have a high reliability requirement, such as an ultra-reliable and low latency communications (URLLC) service. Therefore, a PDSCH used to transmit the service and a corresponding PDCCH also have a high transmission reliability requirement.

However, for the PDCCH, how to improve transmission reliability of the PDCCH still needs to be further studied.

SUMMARY

This application provides a communication method and apparatus, to repeatedly transmit a PDCCH a plurality of times.

According to a first aspect, this application provides a communication method, where the method may be applied to a terminal device, or may be applied to a chip inside the terminal device. In the method, configuration information is received from a network device, where the configuration information is used to configure one control-resource set and M search spaces, the control-resource set is associated with the M search spaces, and each search space in the M search spaces and the control-resource set associated with the search space are used to transmit a first PDCCH once. Further, the first PDCCH may be monitored on time-frequency resources corresponding to the control-resource set and the M search spaces. M is an integer greater than 1.

In the foregoing method, the first PDCCH is repeatedly transmitted a plurality of times by configuring one control-resource set and M search spaces, so that transmission reliability of the first PDCCH can be improved while configuration resources are saved.

In a possible design, the control-resource set meets a first preset condition, and/or the M search spaces meet a second preset condition.

In this way, if the terminal device determines that the control-resource set meets the first preset condition and/or the M search spaces meet the second preset condition, the terminal device may learn that the control-resource set and the M search spaces are used to transmit the first PDCCH M times, so that a combined decoding method is subsequently used, to save processing resources.

In a possible design, that the control-resource set meets a first preset condition includes one or more of the following:
the control-resource set is associated with a plurality of search spaces;
the control-resource set corresponds to a plurality of activated transmission configuration indicator states (TCI-state); and
a quantity of activated TCI-states corresponding to the control-resource set is equal to a quantity of search spaces associated with the control-resource set; and
that the M search spaces meet a second preset condition includes one or more of the following:
periods of the M search spaces are the same;
duration of the M search spaces is the same; and
time-domain start locations corresponding to the M search spaces are the same.

In a possible design, before the first PDCCH is monitored on the time-frequency resources corresponding to the control-resource set and the M search spaces, the method further includes: receiving first indication information from the network device, where the first indication information is used to indicate that the control-resource set and the M search spaces are used to transmit the first PDCCH M times.

In a possible design, a frequency domain resource corresponding to the control-resource set includes M frequency domain resource parts, and the M frequency domain resource parts are one-to-one associated with the M search spaces; and that each search space in the M search spaces and the control-resource set associated with the search space are used to transmit a first PDCCH once includes: each search space in the M search spaces and a frequency domain resource part associated with the search space are used to transmit the first PDCCH once.

In a possible design, the control-resource set corresponds to M activated TCI-states; and monitoring the first PDCCH on time-frequency resources corresponding to the control-resource set and the M search spaces includes: receiving, based on the M activated TCI-states, the first PDCCH on the time-frequency resources corresponding to the control-resource set and the M search spaces.

In a possible design, the M activated TCI-states are one-to-one associated with the M search spaces.

In a possible design, if the control-resource set corresponds to M activated TCI-states, the method further includes: receiving second indication information from the network device, where the second indication information is used to indicate to activate the M TCI-states corresponding to the control-resource set.

In a possible design, the second indication information includes one or more of the following:
identifiers of the M TCI-states;
first information, where the first information is used to indicate a quantity of activated TCI-states;
second information, where the second information is used to indicate that there are a plurality of activated TCI-states; and
third information, where the third information is used to indicate that the M TCI-states are used to simultaneously transmit the first PDCCH or transmit the first PDCCH through time division.

In a possible design, the time-frequency resources corresponding to the control-resource set and the M search spaces include M groups of time-frequency resources, and each search space in the M search spaces and the control-resource set associated with the search space correspond to one group of time-frequency resources in the M groups of time-frequency resources; and the M groups of time-frequency resources are totally the same; or the M groups of time-frequency resources have a same time domain resource but different frequency domain resources; or the M groups of time-frequency resources have a same frequency domain resource but different time domain resources; or the M groups of time-frequency resources have different frequency domain resources and different time domain resources.

According to a second aspect, this application provides a communication method, where the method may be applied to a network device, or may be applied to a chip inside the network device. In the method, configuration information is sent to a terminal device, where the configuration information is used to configure one control-resource set and M search spaces, the control-resource set is associated with the M search spaces, and each search space in the M search spaces and the control-resource set associated with the search space are used to transmit a first PDCCH once. Further, the first PDCCH may be transmitted M times on time-frequency resources corresponding to the control-resource set and the M search spaces. M is an integer greater than 1.

In the foregoing method, the first PDCCH is repeatedly transmitted a plurality of times by configuring one control-resource set and M search spaces, so that transmission reliability of the first PDCCH can be improved while configuration resources are saved.

In a possible design, the control-resource set meets a first preset condition, and/or the M search spaces meet a second preset condition.

In a possible design, that the control-resource set meets a first preset condition includes one or more of the following:
the control-resource set is associated with a plurality of search spaces;
the control-resource set corresponds to a plurality of activated TCI-states; and
a quantity of activated TCI-states corresponding to the control-resource set is equal to a quantity of search spaces associated with the control-resource set; and
that the M search spaces meet a second preset condition includes one or more of the following:
periods of the M search spaces are the same;
duration of the M search spaces is the same; and
time-domain start locations of the M search spaces are the same.

In a possible design, before the first PDCCH is transmitted M times on the time-frequency resources corresponding to the control-resource set and the M search spaces, the method further includes: sending first indication information to the terminal device, where the first indication information is used to indicate that the control-resource set and the M search spaces are used to transmit the first PDCCH M times.

In a possible design, a frequency domain resource corresponding to the control-resource set includes M frequency domain resource parts, and the M frequency domain resource parts are one-to-one associated with the M search spaces; and that each search space in the M search spaces and the control-resource set associated with the search space are used to transmit a first PDCCH once includes: each search space in the M search spaces and a frequency domain resource part associated with the search space are used to transmit the first PDCCH once.

In a possible design, the control-resource set corresponds to M activated TCI-states; and transmitting the first PDCCH M times on time-frequency resources corresponding to the control-resource set and the M search spaces includes: transmitting, based on the M activated TCI-states, the first PDCCH on the time-frequency resources corresponding to the control-resource set and the M search spaces.

In a possible design, the M activated TCI-states are one-to-one associated with the M search spaces.

In a possible design, if the control-resource set corresponds to M activated TCI-states, the method further includes: sending second indication information to the terminal device, where the second indication information is used to indicate to activate the M TCI-states corresponding to the control-resource set.

In a possible design, the second indication information includes one or more of the following:
identifiers of the M TCI-states;
first information, where the first information is used to indicate a quantity of activated TCI-states;
second information, where the second information is used to indicate that there are a plurality of activated TCI-states; and
third information, where the third information is used to indicate that the M TCI-states are used to simultaneously transmit the first PDCCH or transmit the first PDCCH through time division.

In a possible design, the time-frequency resources corresponding to the control-resource set and the M search spaces include M groups of time-frequency resources, and each search space in the M search spaces and the control-resource set associated with the search space correspond to one group of time-frequency resources in the M groups of time-frequency resources; and the M groups of time-frequency resources are totally the same; or the M groups of time-frequency resources have a same time domain resource but different frequency domain resources; or the M groups of time-frequency resources have a same frequency domain resource but different time domain resources; or the M groups of time-frequency resources have different frequency domain resources and different time domain resources.

According to a third aspect, this application provides a communication method, where the method may be applied to a terminal device, or may be applied to a chip inside the terminal device. In the method, configuration information is received from a network device, where the configuration information is used to configure M control-resource sets and M search spaces, the M control-resource sets are one-to-one associated with the M search spaces, and each control-resource set in the M control-resource sets and a search space associated with the control-resource set are used to transmit a first PDCCH once. Further, the first PDCCH may be monitored on time-frequency resources corresponding to the M control-resource sets and the M search spaces. M is an integer greater than 1.

In the foregoing method, an existing configuration manner may be still used. When the first PDCCH needs to be transmitted once, one control-resource set and one search space may be configured. When the first PDCCH needs to be transmitted a plurality of (for example, M) times, M control-resource sets and M search spaces may be configured. In this way, the first PDCCH can be repeatedly transmitted a plurality of times while a small change is made to an existing solution, so that transmission reliability of the first PDCCH is improved.

In a possible design, the M control-resource sets meet a first preset condition, and/or the M search spaces meet a second preset condition.

In a possible design, that the M control-resource sets meet a first preset condition includes: frequency domain resources corresponding to the M control-resource sets are the same, and/or demodulation reference signal (DMRS) scrambling identifiers of the M control-resource sets are the same; and
that the M search spaces meet a second preset condition includes one or more of the following:
detection periods of the M search spaces are the same;
duration of the M search spaces is the same; and
time-domain start locations of the M search spaces are the same.

In a possible design, before the first PDCCH is monitored on the time-frequency resources corresponding to the M control-resource sets and the M search spaces, the method further includes: receiving first indication information from the network device, where the first indication information is used to indicate that the M control-resource sets and the M search spaces are used to transmit the first PDCCH M times.

In a possible design, each control-resource set in the M control-resource sets corresponds to one activated TCI-state; and monitoring the first PDCCH on time-frequency resources corresponding to the M control-resource sets and the M search spaces includes: receiving, based on the M activated TCI-states, the first PDCCH on the time-frequency resources corresponding to the M control-resource sets and the M search spaces.

In a possible design, the time-frequency resources corresponding to the M control-resource sets and the M search spaces include M groups of time-frequency resources, and each control-resource set in the M control-resource sets and the search space associated with the control-resource set correspond to one group of time-frequency resources in the M groups of time-frequency resources; and the M groups of time-frequency resources are totally the same; or the M groups of time-frequency resources have a same time domain resource but different frequency domain resources; or the M groups of time-frequency resources have a same frequency domain resource but different time domain resources; or the M groups of time-frequency resources have different frequency domain resources and different time domain resources.

According to a fourth aspect, this application provides a communication method, where the method may be applied to a network device, or may be applied to a chip inside the network device. In the method, configuration information is sent to a terminal device, where the configuration information is used to configure M control-resource sets and M search spaces, the M control-resource sets are one-to-one associated with the M search spaces, and each control-resource set in the M control-resource sets and a search space associated with the control-resource set are used to transmit a first PDCCH once. Further, the first PDCCH may be transmitted M times on time-frequency resources corresponding to the M control-resource sets and the M search spaces. M is an integer greater than 1.

In the foregoing method, an existing configuration manner may be still used. When the first PDCCH needs to be transmitted once, one control-resource set and one search space may be configured. When the first PDCCH needs to be transmitted a plurality of (for example, M) times, M control-resource sets and M search spaces may be configured. In this way, the first PDCCH can be repeatedly transmitted a plurality of times while a small change is made to an existing solution, so that transmission reliability of the first PDCCH is improved.

In a possible design, the M control-resource sets meet a first preset condition, and/or the M search spaces meet a second preset condition.

In a possible design, that the M control-resource sets meet a first preset condition includes: frequency domain resources corresponding to the M control-resource sets are the same, and/or DMRS scrambling identifiers of the M control-resource sets are the same; and
that the M search spaces meet a second preset condition includes one or more of the following:
detection periods of the M search spaces are the same;
duration of the M search spaces is the same; and
time-domain start locations of the M search spaces are the same.

In a possible design, before the first PDCCH is transmitted M times on the time-frequency resources corresponding to the M control-resource sets and the M search spaces, the method further includes: sending first indication information to the terminal device, where the first indication information is used to indicate that the M control-resource sets and the M search spaces are used to transmit the first PDCCH M times.

In a possible design, each control-resource set in the M control-resource sets corresponds to one activated TCI-state; and transmitting the first PDCCH M times on time-frequency resources corresponding to the M control-resource sets and the M search spaces includes: transmitting, based on the M activated TCI-states, the first PDCCH on the time-frequency resources corresponding to the M control-resource sets and the M search spaces.

In a possible design, the time-frequency resources corresponding to the M control-resource sets and the M search spaces include M groups of time-frequency resources, and each control-resource set in the M control-resource sets and the search space associated with the control-resource set correspond to one group of time-frequency resources in the M groups of time-frequency resources; and the M groups of time-frequency resources are totally the same; or the M groups of time-frequency resources have a same time domain resource but different frequency domain resources; or the M groups of time-frequency resources have a same frequency domain resource but different time domain resources; or the M groups of time-frequency resources have different frequency domain resources and different time domain resources.

According to a fifth aspect, this application provides a communication method, where the method may be applied to a terminal device, or may be applied to a chip inside the terminal device. In the method, configuration information is received from a network device, where the configuration information is used to configure M control-resource sets and one search space, the M control-resource sets each are associated with the search space, and each control-resource set in the M control-resource sets and the search space associated with the control-resource set are used to transmit a first PDCCH once. Further, the first PDCCH is monitored on time-frequency resources corresponding to the M control-resource sets and the search space. M is an integer greater than 1.

In the foregoing method, the first PDCCH is repeatedly transmitted a plurality of times by configuring M control-resource sets and one search space, so that transmission reliability of the first PDCCH can be improved while configuration resources are saved.

In a possible design, the M control-resource sets meet a first preset condition, and/or the search space meets a second preset condition.

In a possible design, that the M control-resource sets meet a first preset condition includes one or more of the following:
search spaces associated with the M control-resource sets are the same;
frequency domain resources corresponding to the M control-resource sets are the same; and
DMRS scrambling identifiers of the M control-resource sets are the same; and
that the search space meets a second preset condition includes one or more of the following:
the search space is associated with a plurality of control-resource sets;
the search space includes a plurality of monitoring occasions (MO); and
a quantity of MOs included in the search space is equal to a quantity of control-resource sets associated with the search space.

In a possible design, before the first PDCCH is monitored on the time-frequency resources corresponding to the M control-resource sets and the search space, the method further includes: receiving first indication information from the network device, where the first indication information is used to indicate that the M control-resource sets and the search space are used to transmit the first PDCCH M times.

In a possible design, the search space includes M MOs, and the M MOs are one-to-one associated with the M control-resource sets; and that each control-resource set in the M control-resource sets and the search space associated with the control-resource set are used to transmit a first PDCCH once includes: each control-resource set in the M control-resource sets and an MO associated with the control-resource set are used to transmit the first PDCCH once.

In a possible design, each control-resource set in the M control-resource sets corresponds to one activated TCI-state; and monitoring the first PDCCH on time-frequency resources corresponding to the M control-resource sets and the search space includes: receiving, based on the M activated TCI-states, the first PDCCH on the time-frequency resources corresponding to the M control-resource sets and the search space.

In a possible design, the time-frequency resources corresponding to the M control-resource sets and the search space include M groups of time-frequency resources, and each control-resource set in the M control-resource sets and the search space associated with the control-resource set correspond to one group of time-frequency resources in the M groups of time-frequency resources; and the M groups of time-frequency resources are totally the same; or the M groups of time-frequency resources have a same time domain resource but different frequency domain resources; or the M groups of time-frequency resources have a same frequency domain resource but different time domain resources; or the M groups of time-frequency resources have different frequency domain resources and different time domain resources.

According to a sixth aspect, this application provides a communication method, where the method may be applied to a network device, or may be applied to a chip inside the network device. In the method, configuration information is sent to a terminal device, where the configuration information is used to configure M control-resource sets and one search space, the M control-resource sets each are associated with the search space, and each control-resource set in the M control-resource sets and the search space associated with the control-resource set are used to transmit a first PDCCH once. Further, the first PDCCH may be transmitted M times on time-frequency resources corresponding to the M control-resource sets and the search space. M is an integer greater than 1.

In the foregoing method, the first PDCCH is repeatedly transmitted a plurality of times by configuring M control-resource sets and one search space, so that transmission reliability of the first PDCCH can be improved while configuration resources are saved.

In a possible design, the M control-resource sets meet a first preset condition, and/or the search space meets a second preset condition.

In a possible design, that the M control-resource sets meet a first preset condition includes one or more of the following:
search spaces associated with the M control-resource sets are the same;
frequency domain resources corresponding to the M control-resource sets are the same; and
DMRS scrambling identifiers of the M control-resource sets are the same; and
that the search space meets a second preset condition includes one or more of the following:
the search space is associated with a plurality of control-resource sets;
the search space includes a plurality of MOs; and
a quantity of MOs included in the search space is equal to a quantity of control-resource sets associated with the search space.

In a possible design, before the first PDCCH is transmitted M times on the time-frequency resources corresponding to the M control-resource sets and the search space, the method further includes: sending first indication information to the terminal device, where the first indication information is used to indicate that the M control-resource sets and the search space are used to transmit the first PDCCH M times.

In a possible design, the search space includes M MOs, and the M MOs are one-to-one associated with the M control-resource sets; and that each control-resource set in the M control-resource sets and the search space associated with the control-resource set are used to transmit a first PDCCH once includes: each control-resource set in the M control-resource sets and an MO associated with the control-resource set are used to transmit the first PDCCH once.

In a possible design, each control-resource set in the M control-resource sets corresponds to one activated TCI-state; and transmitting the first PDCCH M times on time-frequency resources corresponding to the M control-resource sets and the search space includes: transmitting, based on the M activated TCI-states, the first PDCCH on the time-frequency resources corresponding to the M control-resource sets and the search space.

In a possible design, the time-frequency resources corresponding to the M control-resource sets and the search space include M groups of time-frequency resources, and each control-resource set in the M control-resource sets and the search space associated with the control-resource set correspond to one group of time-frequency resources in the M groups of time-frequency resources; and the M groups of time-frequency resources are totally the same; or the M groups of time-frequency resources have a same time domain resource but different frequency domain resources; or the M groups of time-frequency resources have a same frequency domain resource but different time domain resources; or the M groups of time-frequency resources have different frequency domain resources and different time domain resources.

According to a seventh aspect, this application provides a communication method, where the method may be applied to a terminal device, or may be applied to a chip inside the terminal device. In the method, configuration information is received from a network device, where the configuration information is used to configure one control-resource set and one search space, the control-resource set is associated with the search space, and the control-resource set and the search space are used to transmit a first PDCCH M times. Further, the first PDCCH may be monitored on a time-frequency resource corresponding to the control-resource set and the search space.

In the foregoing method, the first PDCCH is repeatedly transmitted a plurality of times by configuring one control-resource set and one search space, so that transmission reliability of the first PDCCH can be improved while configuration resources are saved.

In a possible design, the control-resource set meets a first preset condition, and/or the search space meets a second preset condition.

In a possible design, that the control-resource set meets a first preset condition includes: the control-resource set corresponds to a plurality of activated TCI-states, or the control-resource set corresponds to a plurality of activated TCI-states, and a quantity of activated TCI-states corresponding to the control-resource set is equal to a quantity of MOs included in the search space; and that the search space meets a second preset condition includes: the search space includes a plurality of MOs, or the quantity of MOs included in the search space is equal to the quantity of activated TCI-states corresponding to the control-resource set.

In a possible design, before the first PDCCH is monitored on the time-frequency resource corresponding to the control-resource set and the search space, the method further includes: receiving first indication information from the network device, where the first indication information is used to indicate that the control-resource set and the search space are used to transmit the first PDCCH M times.

In a possible design, the search space includes M MOs, and the M MOs each are associated with the control-resource set; and that the control-resource set and the search space are used to transmit a first PDCCH M times includes: each MO in the M MOs and the control-resource set associated with the MO are used to transmit the first PDCCH once.

In a possible design, a frequency domain resource corresponding to the control-resource set includes M frequency domain resource parts, and the M frequency domain resource parts each are associated with the search space; and that the control-resource set and the search space are used to transmit a first PDCCH M times includes: each frequency domain resource part in the M frequency domain resource parts and the search space associated with the frequency domain resource part are used to transmit the first PDCCH once.

In a possible design, the control-resource set corresponds to M activated TCI-states; and monitoring the first PDCCH on a time-frequency resource corresponding to the control-resource set and the search space includes: receiving, based on the M activated TCI-states, the first PDCCH on the time-frequency resource corresponding to the control-resource set and the search space.

In a possible design, if the control-resource set corresponds to M activated TCI-states, the method further includes: receiving second indication information from the network device, where the second indication information is used to indicate to activate the M TCI-states corresponding to the control-resource set.

In a possible design, the second indication information includes one or more of the following:
    identifiers of the M TCI-states;
    first information, where the first information is used to indicate a quantity of activated TCI-states;
    second information, where the second information is used to indicate that there are a plurality of activated TCI-states; and
    third information, where the third information is used to indicate that the M TCI-states are used to simultaneously transmit the first PDCCH or transmit the first PDCCH through time division.

In a possible design, the time-frequency resource corresponding to the control-resource set and the search space includes M groups of time-frequency resources, and each group of time-frequency resources in the M groups of time-frequency resources is used to transmit the first PDCCH once; and the M groups of time-frequency resources are totally the same; or the M groups of time-frequency resources have a same time domain resource but different frequency domain resources; or the M groups of time-frequency resources have a same frequency domain resource but different time domain resources; or the M groups of time-frequency resources have different frequency domain resources and different time domain resources.

According to an eighth aspect, this application provides a communication method, where the method may be applied to a network device, or may be applied to a chip inside the network device. In the method, configuration information is sent to a terminal device, where the configuration information is used to configure one control-resource set and one search space, and the control-resource set is associated with the search space. Further, a first PDCCH may be transmitted M times on a time-frequency resource corresponding to the control-resource set and the search space.

In the foregoing method, the first PDCCH is repeatedly transmitted a plurality of times by configuring one control-resource set and one search space, so that transmission reliability of the first PDCCH can be improved while configuration resources are saved.

In a possible design, the control-resource set meets a first preset condition, and/or the search space meets a second preset condition.

In a possible design, that the control-resource set meets a first preset condition includes: the control-resource set corresponds to a plurality of activated TCI-states, or the control-resource set corresponds to a plurality of activated TCI-states, and a quantity of activated TCI-states corresponding to the control-resource set is equal to a quantity of MOs included in the search space; and that the search space meets a second preset condition includes: the search space includes a plurality of MOs, or the search space includes a plurality of MOs, and the quantity of MOs included in the search space is equal to the quantity of activated TCI-states corresponding to the control-resource set.

In a possible design, before the first PDCCH is transmitted M times on the time-frequency resource corresponding to the control-resource set and the search space, the method further includes: sending first indication information to the terminal device, where the first indication information is used to indicate that the control-resource set and the search space are used to transmit the first PDCCH M times.

In a possible design, the search space includes M MOs, and the M MOs each are associated with the control-resource set; and each MO in the M MOs and the control-resource set associated with the MO are used to transmit the first PDCCH once.

In a possible design, a frequency domain resource corresponding to the control-resource set includes M frequency domain resource parts, and the M frequency domain resource parts each are associated with the search space; and each frequency domain resource part in the M frequency domain resource parts and the search space associated with the frequency domain resource part are used to transmit the first PDCCH once.

In a possible design, the control-resource set corresponds to M activated TCI-states; and transmitting a first PDCCH M times on a time-frequency resource corresponding to the control-resource set and the search space includes: transmitting, based on the M activated TCI-states, the first PDCCH on the time-frequency resource corresponding to the control-resource set and the search space.

In a possible design, if the control-resource set corresponds to M activated TCI-states, the method further includes: sending second indication information to the terminal device, where the second indication information is used to indicate to activate the M TCI-states corresponding to the control-resource set.

In a possible design, the second indication information includes one or more of the following:
  identifiers of the M TCI-states;
  first information, where the first information is used to indicate a quantity of activated TCI-states;
  second information, where the second information is used to indicate that there are a plurality of activated TCI-states; and
  third information, where the third information is used to indicate that the M TCI-states are used to simultaneously transmit the first PDCCH or transmit the first PDCCH through time division.

In a possible design, the time-frequency resource corresponding to the control-resource set and the search space includes M groups of time-frequency resources, and each group of time-frequency resources in the M groups of time-frequency resources is used to transmit the first PDCCH once; and the M groups of time-frequency resources are totally the same; or the M groups of time-frequency resources have a same time domain resource but different frequency domain resources; or the M groups of time-frequency resources have a same frequency domain resource but different time domain resources; or the M groups of time-frequency resources have different frequency domain resources and different time domain resources.

According to a ninth aspect, this application provides a communication apparatus, where the communication apparatus may be a terminal device or a chip disposed inside the terminal device. The communication apparatus has a function of implementing the first aspect, the third aspect, the fifth aspect, or the seventh aspect. For example, the communication apparatus includes a corresponding module, unit, or means for performing steps in the first aspect, the third aspect, the fifth aspect, or the seventh aspect. The module, the unit, or the means may be implemented by software, or may be implemented by hardware, or may be implemented by executing corresponding software by hardware.

In a possible design, the communication apparatus includes a processing unit and a communication unit. The communication unit may be configured to receive/send a signal, to implement communication between the communication apparatus and another apparatus. For example, the communication unit is configured to receive configuration information from a network device. The processing unit may be configured to perform some internal operations of the communication apparatus, for example, perform separate decoding or combined decoding on a signal received by the communication unit. Functions performed by the processing unit and the communication unit may correspond to the steps in the first aspect, the third aspect, the fifth aspect, or the seventh aspect.

In a possible design, the communication apparatus includes a processor, and may further include a transceiver. The transceiver is configured to receive/send a signal, and the processor executes program instructions to complete the method performed by the terminal device in any one of the possible designs or implementations of the first aspect, the third aspect, the fifth aspect, or the seventh aspect. The communication apparatus may further include one or more memories, and the memory is configured to be coupled to the processor. The one or more memories may be integrated with the processor, or may be disposed independent of the processor. This is not limited in this application. The memory may store a necessary computer program or instructions for implementing functions in the first aspect, the third aspect, the fifth aspect, or the seventh aspect. The processor may execute the computer program or the instructions stored in the memory, and when the computer program is executed or the instructions are executed, the communication apparatus is enabled to implement the method in any one of the possible designs or implementations of the first aspect, the third aspect, the fifth aspect, or the seventh aspect.

In a possible design, the communication apparatus includes a processor and a memory, and the memory may store a necessary computer program or instructions for implementing functions in the first aspect, the third aspect, the fifth aspect, or the seventh aspect. The processor may execute the computer program or the instructions stored in the memory, and when the computer program is executed or the instructions are executed, the communication apparatus is enabled to implement the method in any one of the possible designs or implementations of the first aspect, the third aspect, the fifth aspect, or the seventh aspect.

In a possible design, the communication apparatus includes at least one processor and an interface circuit. The at least one processor is configured to: communicate with another apparatus by using the interface circuit, and perform the method performed by the terminal device in any one of the possible designs or implementations of the first aspect, the third aspect, the fifth aspect, or the seventh aspect.

According to a tenth aspect, this application provides a communication apparatus, where the communication apparatus may be a network device or a chip disposed inside the network device. The communication apparatus has a function of implementing the second aspect, the fourth aspect, the sixth aspect, or the eighth aspect. For example, the communication apparatus includes a corresponding module, unit, or means for performing steps in the second aspect, the fourth aspect, the sixth aspect, or the eighth aspect. The module, the unit, or the means may be implemented by software, or may be implemented by hardware, or may be implemented by executing corresponding software by hardware.

In a possible design, the communication apparatus includes a processing unit and a communication unit. The communication unit may be configured to receive/send a signal, to implement communication between the communication apparatus and another apparatus. For example, the communication unit is configured to send configuration information to a terminal device. The processing unit may be configured to perform some internal operations of the communication apparatus, for example, generate the configuration information. Functions performed by the processing unit and the communication unit may correspond to the steps in the second aspect, the fourth aspect, the sixth aspect, or the eighth aspect.

In a possible design, the communication apparatus includes a processor, and may further include a transceiver. The transceiver is configured to receive/send a signal, and the processor executes program instructions to complete the method in any one of the possible designs or implementations of the second aspect, the fourth aspect, the sixth aspect, or the eighth aspect. The communication apparatus may further include one or more memories, and the memory is configured to be coupled to the processor. The one or more memories may be integrated with the processor, or may be disposed independent of the processor. This is not limited in this application. The memory may store a necessary computer program or instructions for implementing functions in the second aspect, the fourth aspect, the sixth aspect, or the eighth aspect. The processor may execute the computer program or the instructions stored in the memory, and when the computer program is executed or the instructions are executed, the communication apparatus is enabled to implement the method in any one of the possible designs or implementations of the second aspect, the fourth aspect, the sixth aspect, or the eighth aspect.

In a possible design, the communication apparatus includes a processor and a memory, and the memory may store a necessary computer program or instructions for implementing functions in the second aspect, the fourth aspect, the sixth aspect, or the eighth aspect. The processor may execute the computer program or the instructions stored in the memory, and when the computer program is executed or the instructions are executed, the communication apparatus is enabled to implement the method in any one of the possible designs or implementations of the second aspect, the fourth aspect, the sixth aspect, or the eighth aspect.

In a possible design, the communication apparatus includes at least one processor and an interface circuit. The at least one processor is configured to: communicate with another apparatus by using the interface circuit, and perform the method in any one of the possible designs or implementations of the second aspect, the fourth aspect, the sixth aspect, or the eighth aspect.

According to an eleventh aspect, this application provides a computer-readable storage medium. The computer storage medium stores computer-readable instructions, and when a computer reads and executes the computer-readable instructions, the computer is enabled to perform the method in any one of the possible designs of the first to eighth aspects.

According to a twelfth aspect, this application provides a computer program product. When a computer reads and executes the computer program product, the computer is enabled to perform the method in any one of the possible designs of the first to eighth aspects.

According to a thirteenth aspect, this application provides a chip. The chip includes a processor, and the processor is coupled to a memory, and is configured to read and execute a software program stored in the memory, to implement the method in any one of the possible designs of the first to eighth aspects.

These aspects or other aspects of this application are clearer and more comprehensible in the following description of embodiments.

BRIEF DESCRIPTION OF DRAWINGS

FIG. 10a is a schematic diagram of a format of a media access control (MAC) control element (CE) according to an embodiment of this application;

FIG. 10b shows an example of a MAC CE according to an embodiment of this application;

DESCRIPTION OF EMBODIMENTS

Figure 1:
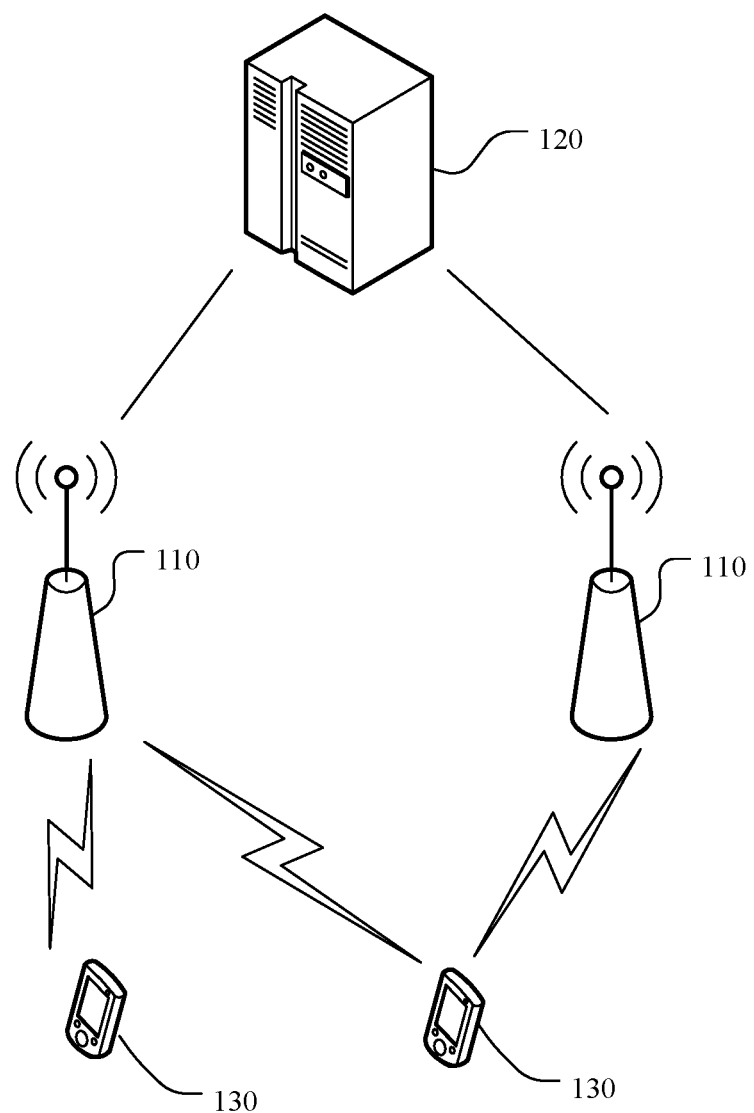
FIG. 1 is a schematic diagram of a network architecture to which an embodiment of this application is applicable.

The following describes the technical solutions in embodiments of the present invention with reference to the accompanying drawings in embodiments of the present invention. It is clear that the described embodiments are merely a part rather than all of embodiments of the present invention.

Some terms in embodiments of this application are first described, to help a person skilled in the art have a better understanding.

(1) A terminal device: may be a wireless terminal device that can receive scheduling and indication information of a network device. The wireless terminal device may be a device that provides a user with voice and/or data connectivity, a handheld device with a wireless connection function, or another processing device connected to a wireless modem. The wireless terminal device may communicate with one or more core networks or the internet through a radio access network (RAN). The wireless terminal device may be a mobile terminal device, such as a mobile phone (or referred to as a "cellular" phone or a mobile phone), a computer, and a data card, for example, may be a portable, pocket-sized, handheld, computer built-in, or in-vehicle mobile apparatus that exchanges language and/or data with the radio access network. For example, the device may include a personal communication service (PCS) phone, a cordless phone, a session initiation protocol (SIP) phone, a wireless local loop (WLL) station, a personal digital assistant (PDA), a tablet computer (Pad), and a computer having a wireless transceiver function. The wireless terminal device may also be referred to as a system, a subscriber unit, a mobile station, a mobile station (MS), a remote station, an access point (AP), a remote terminal, an access terminal, a user terminal, a user agent, a subscriber station (SS), customer premises equipment (CPE), a terminal, user equipment (UE), a mobile terminal (MT), or the like. The terminal device may be a wearable device, and a terminal device in a next-generation communication system such as a 5G communication system, a terminal device in a future evolved public land mobile network (PLMN), or the like.

(2) A network device is a device in a wireless network. For example, the network device may be a RAN node (or device) that enables a terminal device to access the wireless network, and may also be referred to as a base station. Currently, the RAN device is, for example, a next-generation NodeB (gNodeB) in the 5G communication system, a transmission reception point (TRP), an evolved NodeB (eNB), a radio network controller (RNC), a NodeB (NB), a base station controller (BSC), a base transceiver station (BTS), a home NodeB (for example, a home evolved NodeB or a home NodeB, HNB), a baseband unit (BBU), or a wireless fidelity (Wi-Fi) AP. In addition, in a network structure, the network device may include a centralized unit (CU) node, a distributed unit (DU) node, or a RAN device including a CU node and a DU node. In addition, in another possible case, the network device may be another apparatus that provides a wireless communication function for the terminal device. A specific technology and a specific device form that are used by the network device are not limited in embodiments of this application. For ease of description, in embodiments of this application, the apparatus that provides the wireless communication function for the terminal device is referred to as the network device.

(3) The terms "system" and "network" may be used interchangeably in embodiments of this application.

"At least one" means one or more, and "a plurality of" means two or more. The term "and/or" describes an association relationship for describing associated objects and represents that three relationships may exist. For example, A and/or B may indicate the following cases: Only A exists, only B exists, and both A and B exist, where A and B may be singular or plural. The character "/" generally represents an "or" relationship between the associated objects. "At least one of the following items" or a similar expression means any combination of these items, including any combination of a single item or a plurality of items. For example, "at least one of A, B, and C" includes A, B, C, AB, AC, BC, or ABC.

In addition, unless otherwise stated, ordinal numbers such as "first" and "second" in embodiments of this application are used to distinguish between a plurality of objects, and not used to limit an order, a time sequence, priorities, or importance of the plurality of objects. For example, first information and second information are merely used to distinguish different information, and are not used to indicate different priorities or importance degrees of the two types of information.

FIG. 1 is a schematic diagram of a network architecture to which an embodiment of this application is applicable. As shown in FIG. 1, a terminal device 130 may access a wireless network, to obtain a service of an external network (for example, the Internet) by using the wireless network, or communicate with another device by using the wireless network, for example, may communicate with another terminal device. The wireless network includes a RAN device 110 and a core network (CN) device 120. The RAN device 110 is configured to enable the terminal device 130 to access the wireless network, and the CN device 120 is configured to manage the terminal device and provide a gateway for communicating with the external network. It should be understood that a quantity of devices in the communication system shown in FIG. 1 is merely an example. This embodiment of this application is not limited thereto. In actual application, the communication system may include more terminal devices 130 and more RAN devices 110, and may further include another device.

A CN may include a plurality of CN devices 120. When the network architecture shown in FIG. 1 is applicable to a 5G communication system, the CN device 120 may be an access and mobility management function (AMF) entity, a session management function (SMF) entity, a user plane function (UPF) entity, or the like. When the network architecture shown in FIG. 1 is applicable to a long term evolution (LTE) communication system, the CN device 120 may be a mobility management entity (MME), a serving gateway (S-GW), or the like.

Figure 2:
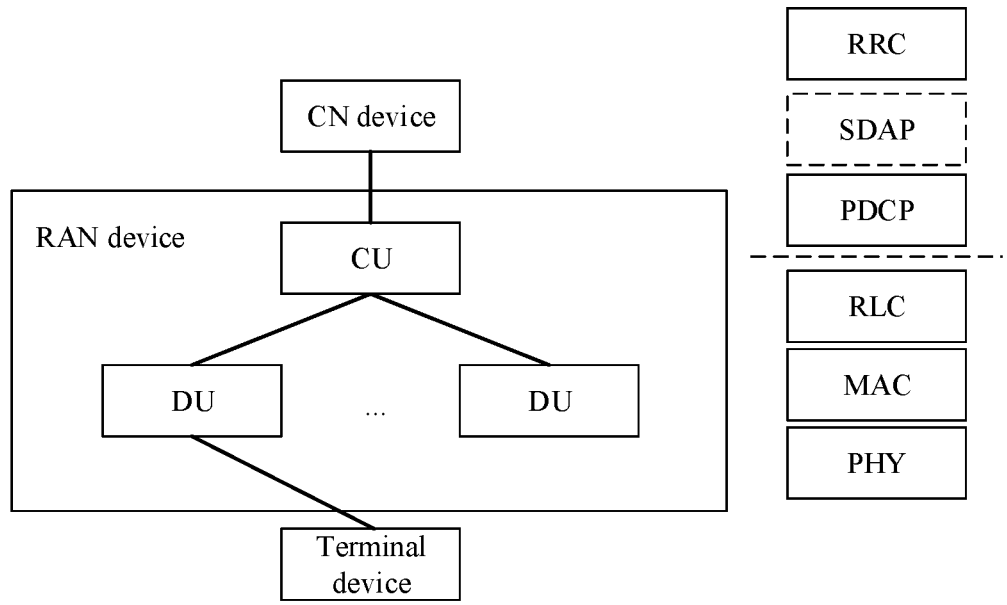
FIG. 2 is another schematic diagram of a network architecture to which an embodiment of this application is applicable.

FIG. 2 is a schematic diagram of another network architecture to which an embodiment of this application is applicable. As shown in FIG. 2, the network architecture includes a CN device, a RAN device, and a terminal device. The RAN device includes a baseband apparatus and a radio frequency apparatus. The baseband apparatus may be implemented by one node, or may be implemented by a plurality of nodes. The radio frequency apparatus may be implemented separately from the baseband apparatus, or may be integrated into the baseband apparatus, or a part of the radio frequency apparatus is disposed separately from the baseband apparatus and a part of the radio frequency apparatus is integrated into the baseband apparatus. For example, in an LTE communication system, a RAN device (eNB) includes a baseband apparatus and a radio frequency apparatus. The radio frequency apparatus may be separately disposed relative to the baseband apparatus. For example, a remote radio unit (RRU) is separately disposed relative to a BBU.

Communication between the RAN device and the terminal device complies with a specified protocol layer structure. For example, a control plane protocol layer structure may include a function of a protocol layer such as a radio resource control (RRC) layer, a packet data convergence protocol (PDCP) layer, a radio link control (RLC) layer, a MAC layer, and a physical layer. A user plane protocol layer structure may include a function of a protocol layer such as a PDCP layer, an RLC layer, a MAC layer, and a physical layer. In a possible implementation, a service data adaptation protocol (SDAP) layer may further exist above the PDCP layer.

The RAN device may implement functions of protocol layers such as RRC, PDCP, RLC, and MAC by using one node or a plurality of nodes. For example, in an evolved structure, the RAN device may include a CU and DU, and a plurality of DUs may be all controlled by one CU. As shown in FIG. 2, a CU and a DU may be divided based on a protocol layer of a wireless network. For example, functions of both the PDCP layer and a layer above the PDCP layer are set on the CU, and functions of protocol layers below the PDCP layer, such as the RLC layer and the MAC layer, are set on the DU.

Division based on the protocol layer is merely an example, and division may alternatively be performed based on another protocol layer, such as the RLC layer. Functions of both the RLC layer and a protocol layer above the RLC layer are set on the CU, and the function of the protocol layer below the RLC layer is set on the DU. Alternatively, division is performed at the protocol layer. For example, some functions of the RLC layer and the function of the protocol layer above the RLC layer are set on the CU, and a remaining function of the RLC layer and the function of the protocol layer below the RLC layer are set on the DU. In addition, division may alternatively be performed in another manner. For example, the division is performed based on a delay. A function whose processing time needs to satisfy a delay requirement is deployed on the DU, and a function whose processing time does not need to satisfy the delay requirement is deployed on the CU.

In addition, the radio frequency apparatus may not be disposed in the DU but is disposed separately from the DU, or may be integrated into the DU, or a part is disposed separately from the DU and a remaining part is integrated into the DU. This is not limited herein.

Figure 3:
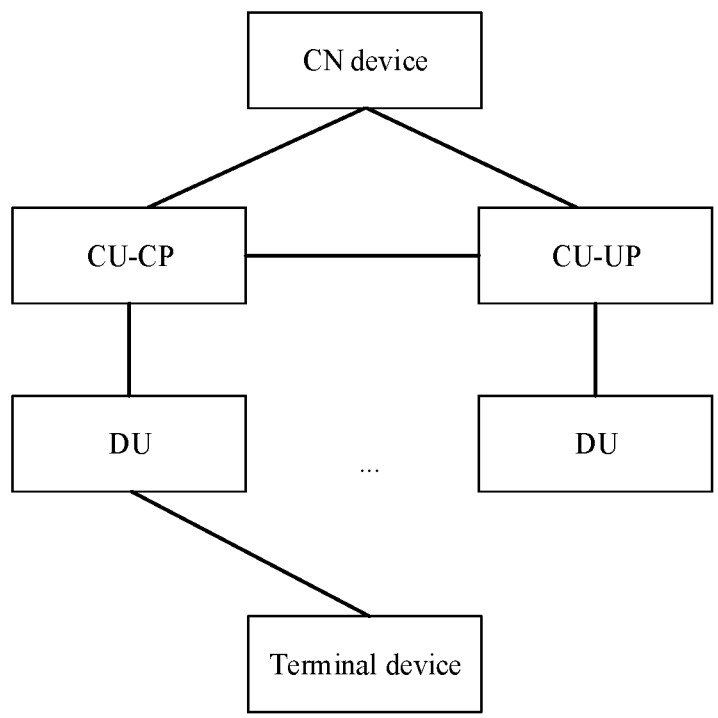
FIG. 3 is another schematic diagram of a network architecture to which an embodiment of this application is applicable.

FIG. 3 is a schematic diagram of another network architecture to which an embodiment of this application is applicable. Compared with the network architecture shown in FIG. 2, in FIG. 3, a control plane (CP) and a user plane (UP) of a CU may be further separated and implemented as different entities that are respectively a CU entity (namely, a CU-CP entity) on the CP and a CU entity (namely, a CU-UP entity) on the UP.

In the foregoing network architecture, signaling generated by the CU may be sent to a terminal device by using a DU, or signaling generated by a terminal device may be sent to the CU by using a DU. The DU may transparently transmit the signaling to the terminal device or the CU by directly encapsulating the signaling at a protocol layer without parsing the signaling. In the following embodiments, if transmission of such signaling between the DU and the terminal device is involved, that the DU sends or receives the signaling includes this scenario. For example, signaling at an RRC layer or a PDCP layer is finally processed as signaling at a PHY layer and the signaling at the PHY layer is sent to the terminal device, or signaling at an RRC layer or a PDCP layer is converted from received signaling at a PHY layer. In this architecture, it may also be considered that the signaling at the RRC layer or the PDCP layer is sent by the DU, or sent by the DU and the radio frequency apparatus.

The network architecture shown in FIG. 1, FIG. 2, or FIG. 3 may be applicable to communication systems of various radio access technologies (RAT), for example, may be an LTE communication system, may be a 5G (or referred to as new radio (NR)) communication system, or may be a transition system between the LTE communication system and the 5G communication system. The transition system may also be referred to as a 4.5G communication system, or certainly, may be a future communication system. The network architecture and the service scenario that are described in embodiments of this application are intended to describe the technical solutions in embodiments of this application more clearly, and do not constitute a limitation on the technical solutions provided in embodiments of this application. A person of ordinary skill in the art may know that, with evolution of a communication network architecture and emergence of new service scenarios, the technical solutions provided in embodiments of this application are also applicable to similar technical problems. The apparatus in the following embodiments of this application may be located in the terminal device or the network device based on a function implemented by the apparatus. When the foregoing CU-DU structure is used, the network device may be a CU, a DU, or a RAN device including a CU and a DU.

An example in which the network architecture shown in FIG. 1, FIG. 2, or FIG. 3 is applicable to the 5G communication system is used. In the 5G communication system, a carrier frequency (generally, greater than or equal to 6 GHz) higher than that in LTE is used, for example, a 28 GHz, 38 GHz, or 72 GHz frequency band, to implement wireless communication with a larger bandwidth and a higher transmission rate. Because of a comparatively high carrier frequency, a radio signal transmitted at the carrier frequency undergoes more severe fading in a space propagation process, and even it is difficult for a receive end to detect the radio signal. Therefore, in the 5G communication system, a beamforming (BF) technology is used to obtain a beam having good directivity, so as to increase an antenna gain, increase power in a transmission direction, and improve a signal to interference plus noise ratio (SINR) at the receive end.

For example, in the 5G communication system, the network device may send configuration information to the terminal device. The configuration information is used to configure a control-resource set (CORESET) and a search space associated with the control-resource set. The search space may also be referred to as a search space set. Further, the network device sends a downlink control channel to the terminal device on a time-frequency resource corresponding to the control-resource set and the search space associated with the control-resource set. Correspondingly, after receiving the configuration information, the terminal device may monitor the downlink control channel on the time-frequency resource corresponding to the control-resource set and the search space associated with the control-resource set. The downlink control channel may be a PDCCH, an enhanced physical downlink control channel (ePDCCH), or another downlink control channel. This is not specifically limited. In embodiments of this application, an example in which the downlink control channel is a PDCCH is mainly used for description.

The following describes related technical features of the PDCCH.

Figure 4A:
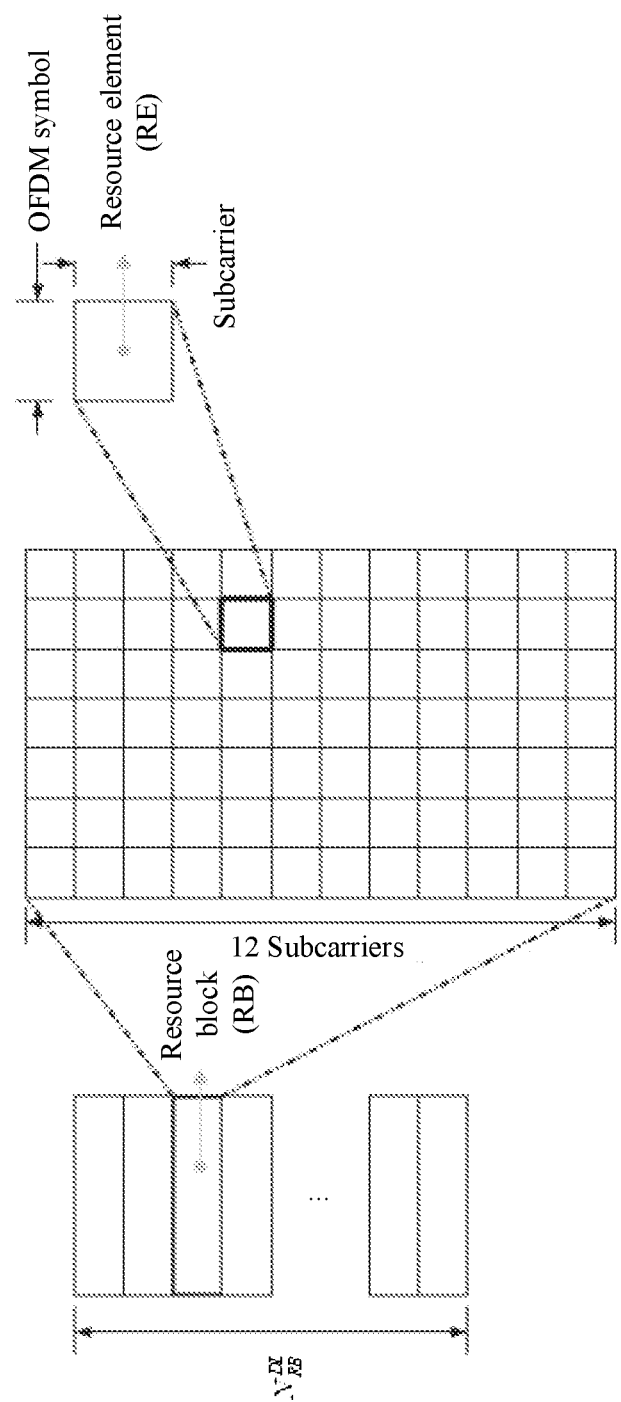
FIG. 4a is a schematic diagram of a downlink time-frequency resource grid according to an embodiment of this application.

(1) Time-frequency resource: The 5G communication system is used as an example. The time-frequency resource is divided into independent subcarriers in frequency domain, and a subcarrier spacing (SCS) may be determined based on an SCS parameter u. For example, a common SCS is 15 kHz or 30 kHz. A unit of an uplink/a downlink frequency domain resource is a resource block (RB), and each RB includes 12 consecutive subcarriers in frequency domain. FIG. 4a shows a downlink time-frequency resource grid. In FIG. 4a, $N_{RB}^{DL}$ represents a quantity of RBs in one time of downlink scheduling. One RB includes 12 consecutive subcarriers in frequency domain. Each element on a resource grid is referred to as a resource element (RE). The RE is a smallest physical resource, and includes one subcarrier in one time domain symbol. An uplink time-frequency resource grid is similar to the downlink time-frequency resource grid. The time domain symbol may also be briefly referred to as a symbol, and includes but is not limited to an orthogonal frequency division multiplexing (OFDM) symbol and a single carrier frequency division multiple access (SC-FDMA) symbol.

(2) Beam: A main problem of high-frequency communication is that signal energy decreases rapidly with a transmission distance increases. Consequently, a signal transmission distance is short. To overcome this problem, an analog beam technology is used in the high-frequency communication, and a large-scale antenna array is used for weighted processing, so that signal energy is concentrated in a relatively small range, to form a signal similar to an optical beam (the signal is referred to as an analog beam, a beam for short), and to extend a transmission distance.

The beam is a communication resource, and the beam may be a wide beam, a narrow beam, or another type of beam. A technology for forming the beam may be a beamforming technology or another technology. The beamforming technology may be specifically a digital beamforming technology, an analog beamforming technology, a hybrid digital/analog beamforming technology, or the like. Different beams may be considered as different communication resources, and same information or different information may be sent through different beams. Optionally, a plurality of beams having a same or similar communication feature may be considered as one beam, and the beam may include one or more antenna ports used to transmit a data channel, a control channel, a sounding signal, and the like. It may be understood that one or more antenna ports that form one beam may also be considered as an antenna port set, and the beam may also be referred to as a spatial domain filter, a space filter, or a spatial parameter. A beam used to send a signal may be referred to as a transmit beam (transmission beam, Tx beam), or may be referred to as a spatial domain transmit filter (spatial domain transmission filter) or a spatial transmit parameter (spatial transmission parameter). A beam used to receive a signal may be referred to as a receive beam (reception beam, Rx beam), or may be referred to as a spatial domain receive filter or a spatial receive parameter (spatial Rx parameter). The transmit beam may refer to distribution of signal strength formed in different directions in space after a signal is transmitted by using an antenna, and the receive beam may refer to distribution of signal strength, in different directions in space, of a radio signal received from an antenna.

In a current NR protocol, the beam may be represented by using a quasi co-location (QCL) relationship. Specifically, signals of two identical beams have a QCL relationship about a spatial receive parameter (spatial Rx parameter), namely, QCL-Type D: {Spatial Rx parameter} in a protocol. The beam may be specifically represented in the protocol by using identifiers of various signals, for example, a resource index of a channel state information-reference signal (CSI-RS), an index of a synchronization signal/physical broadcast channel block (SS/PBCH block, or may be briefly referred to as an SSB), a resource index of a sounding reference signal (SRS), and a resource index of a tracking reference signal (TRS).

In embodiments of this application, related information of the transmission beam may be indicated by using a transmission configuration indicator state (TCI-state). For example, when the terminal device knows a specific TCI-state used by the network device to send a channel or a signal (for example, a PDCCH), the terminal device may know a specific transmission beam used by the network device to send the PDCCH, and therefore may determine a specific reception beam to be used to receive the PDCCH. For example, the TCI-state may include a resource index (for example, a resource #1) of a reference signal, indicating that a channel or a signal that is transmitted by using the TCI-state has a same reception beam as the resource #1. In this way, the terminal device receives the channel or the signal by using a reception beam of the resource #1 (the terminal device already knows the reception beam of the resource #1 in advance).

(3) Configuration information: The configuration information may also be referred to as PDCCH configuration information, and is used to configure a parameter related to PDCCH transmission, for example, is used to configure a control-resource set and a search space. Each search space is associated with one control-resource set, and the search space and the control-resource set together correspond to one PDCCH. To be specific, the terminal device receives one PDCCH based on configuration of one search space and a control-resource set associated with the search space. If another PDCCH further needs to be received, the network device may configure a control-resource set and a search space that correspond to the another PDCCH.

(4) Control-resource set: The PDCCH is transmitted on a frequency domain resource corresponding to the control-resource set, and the frequency domain resource corresponding to the control-resource set may include a plurality of RBs. One or more TCI-states may be configured for one control-resource set. A PDCCH corresponding to a control-resource set may be transmitted by using one TCI-state in one or more TCI-states configured for the control-resource set. Specifically, a specific TCI-state for use may be activated through using signaling sent by the network device. In other words, although the network device configures a plurality of TCI-states for one control-resource set, these TCI-states are not activated (not valid), and can be valid only after being activated through signaling.

The following schematically shows a configuration information format of the control-resource set:

```
ControlResourceSet ::=              SEQUENCE {
    controlResourceSetId            ControlResourceSetId,
    frequencyDomainResources        BIT STRING (SIZE (45)),
    duration                        INTEGER (1..maxCoReSetDuration),
    cce-REG-MappingType             CHOICE {
        interleaved                 SEQUENCE {
            reg-BundleSize              ENUMERATED {n2, n3, n6},
            interleaverSize             ENUMERATED {n2, n3, n6},
            shiftIndex
INTEGER(0..maxNrofPhysicalResourceBlocks-1)
        },
        nonInterleaved              NULL
    },
    precoderGranularity             ENUMERATED {sameAsREG-bundle,
allContiguousRBs},
        tci-StatesPDCCH-ToAddList   SEQUENCE(SIZE
(1..maxNrofTCI-StatesPDCCH)) OF TCI-StateId
    tci-StatesPDCCH-ToReleaseList   SEQUENCE(SIZE
(1..maxNrofTCI-StatesPDCCH)) OF TCI-StateId
        tci-PresentInDCI            ENUMERATED {enabled}
        pdcch-DMRS-ScramblingID         INTEGER (0..65535)
}
```

Figure 4B:
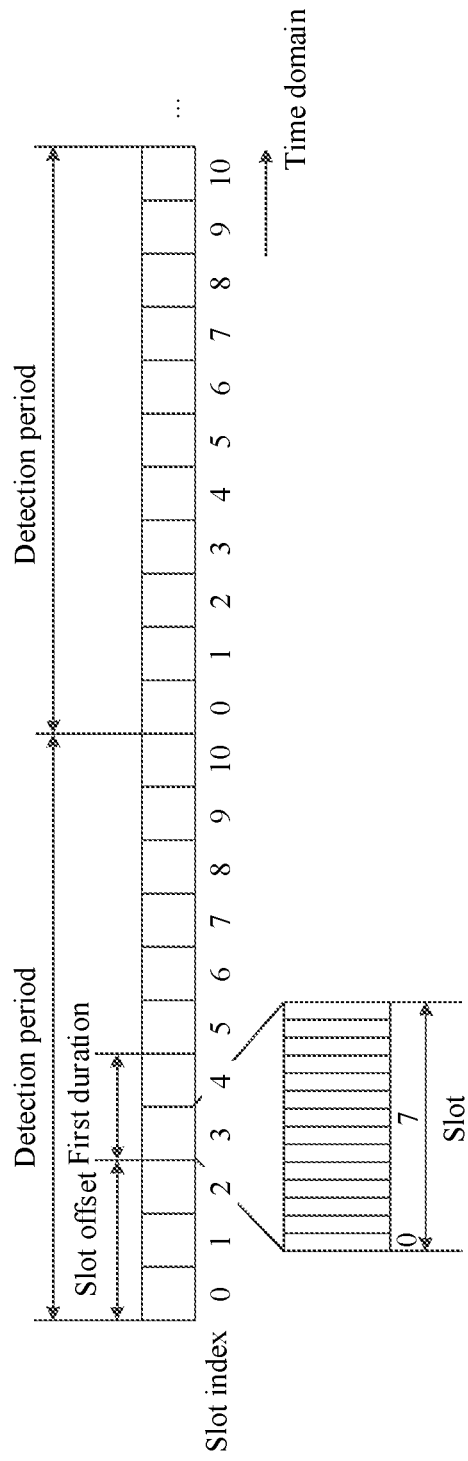
FIG. 4b shows an example of a parameter of a search space according to an embodiment of this application.

(5) Search space: Some time domain information may be configured for the search space, for example, a detection period (namely, a time interval of detecting the search space, where a unit may be a slot), a slot offset (namely, a slot offset between a start moment of the detection period and a moment at which the search space is actually detected, where the slot offset is less than a value of the detection period), second duration (namely, time for continuously detecting the search space, where the time may include a plurality of slots, and the quantity of included slots is less than the value of the detection period), and a time-domain start location (namely, a time-domain start location that corresponds to a control-resource set associated with the search space and that exists in each slot). For ease of understanding, specific examples are used to describe meanings of various parameters. As shown in FIG. 4b, the detection period is 10 slots, the slot offset is three slots, the second duration is two slots, the time-domain start location is the symbol 0 and the symbol 7 in one slot, and a first duration of the control-resource set associated with the search space is two symbols. In this example, the terminal device may detect the PDCCH in the symbol 0, the symbol 1, the symbol 7, and the symbol 8 in each of the slot 3 and the slot 4 in each detection period including 10 slots.

The following schematically shows a configuration information format of the search space:

```
SearchSpace ::=                     SEQUENCE {
    searchSpaceId                   SearchSpaceId,
    controlResourceSetId            ControlResourceSetId
    monitoringSlotPeriodicityAndOffset  CHOICE {... }
    duration                        INTEGER (2..2559)
    monitoringSymbolsWithinSlot     BIT STRING (SIZE (14))
    nrofCandidates                  SEQUENCE {... }
    searchSpaceType                 CHOICE {... }
}
```

For example, a plurality of search spaces may be associated with a same control-resource set, and this is equivalent to associating the control-resource set with the plurality of search spaces. The search space may correspond to one or more MOs, and may be specifically indicated by using a parameter monitoringSymbolsWithinSlot. The parameter monitoringSymbolsWithinSlot is a 14-bit bitmap, and each bit corresponds to one OFDM symbol. A bit whose value is 1 indicates that an OFDM symbol corresponding to the bit is the first OFDM symbol of an MO, namely, X consecutive OFDM symbols starting from the OFDM symbol correspond to one MO. X is indicated by a parameter duration of the control-resource set, and represents a quantity of symbols occupied by an MO. For example, if a value of monitoringSymbolsWithinSlot is 10000100000000, and a value of duration of the associated control-resource set is 3, the search space has two MOs, the first MO is located in the first to the third OFDM symbols, and the second MO is located in the sixth to the eighth OFDM symbols.

It may be learned from the foregoing descriptions that in a current PDCCH transmission solution, one PDCCH corresponds to one control-resource set and one search space set, and the PDCCH may be transmitted once on a time-frequency resource corresponding to the control-resource set and the search space. However, because a URLLC service is introduced into the 5G communication system, to ensure transmission reliability, a PDSCH used to transmit the URLLC service and a corresponding PDCCH need to be repeatedly transmitted a plurality of times.

Based on this, embodiments of this application provide a communication method and apparatus, to repeatedly transmit a PDCCH a plurality of times, so as to improve transmission reliability of the PDCCH.

In the following description process, an example in which the method provided in embodiments of this application is applied to the system architecture shown in FIG. 1 is used. In addition, the method may be performed by two communication apparatuses. The two communication apparatuses are, for example, a first communication apparatus and a second communication apparatus. The first communication apparatus may be a network side device or a communication apparatus that can support the network side device in implementing functions needed for the method, and certainly may alternatively be another communication apparatus such as a chip or a chip system. The second communication apparatus may be a terminal side device or a communication apparatus that can support the terminal side device in implementing functions needed for the method, and certainly may alternatively be another communication apparatus such as a chip or a chip system. For ease of description, the following uses an example in which the method is performed by a network device and a terminal device, that is, an example in which the first communication apparatus is the network device and the second communication apparatus is the terminal device. If embodiments are applied to the system architecture shown in FIG. 1, a network device (for example, a network device configured to execute the embodiment shown in FIG. 5) described below may be the network device in the system architecture shown in FIG. 1, and a terminal device (for example, a terminal device configured to execute the embodiment shown in FIG. 5) described below may be the terminal device in the system architecture shown in FIG. 1. It should be noted that the method provided in embodiments of this application may be applicable to a scenario in which a single network device transmits data or control signaling to a single terminal device or a plurality of terminal devices, or may be applicable to a scenario in which a plurality of network devices simultaneously transmit data or control signaling to a single terminal device.

For example, the communication method provided in embodiments of this application may include four possible solutions. For ease of description, the four solutions are referred to as Solution 1, Solution 2, Solution 3, and Solution 4.

In Solution 1, the network device may configure M control-resource sets and M search spaces for the terminal device. The M control-resource sets are one-to-one associated with the M search spaces. Each control-resource set in the M control-resource sets and a search space associated with the control-resource set are used to transmit a first PDCCH once. Further, the network device may transmit the first PDCCH M times on time-frequency resources corresponding to the M control-resource sets and the M search spaces. In the method, the network device may still use an existing configuration manner. When the first PDCCH needs to be transmitted once, one control-resource set and one search space may be configured. When the first PDCCH needs to be transmitted a plurality of (for example, M) times, M control-resource sets and M search spaces may be configured. In this way, the first PDCCH can be repeatedly transmitted a plurality of times while a small change is made to an existing solution, so that transmission reliability of the first PDCCH is improved.

In Solution 2, the network device may configure M control-resource sets and one search space for the terminal device. The M control-resource sets each are associated with the search space. Each control-resource set in the M control-resource sets and the search space associated with the control-resource set are used to transmit a first PDCCH once. Further, the network device may transmit the first PDCCH M times on time-frequency resources corresponding to the M control-resource sets and the search space. In the foregoing method, when determining that the first PDCCH needs to be transmitted M times, the network device may configure M control-resource sets and one search space. In this way, the first PDCCH can be repeatedly transmitted a plurality of times while configuration resources are saved, so that transmission reliability of the first PDCCH is improved.

In Solution 3, the network device configures one control-resource set and M search spaces for the terminal device. The control-resource set is associated with the M search spaces. Further, the network device transmits a first PDCCH M times on time-frequency resources corresponding to the control-resource set and the M search spaces. In the foregoing method, when determining that the first PDCCH needs to be transmitted M times, the network device may configure one control-resource set and M search spaces. In this way, the first PDCCH can be repeatedly transmitted a plurality of times while configuration resources are saved, so that transmission reliability of the first PDCCH is improved.

In Solution 4, the network device configures one control-resource set and one search space for the terminal device. Further, the network device transmits a first PDCCH M times on a time-frequency resource corresponding to the control-resource set and the search space. In the foregoing method, when determining that the first PDCCH needs to be transmitted M times, the network device may configure one control-resource set and one search space. In this way, the first PDCCH can be repeatedly transmitted a plurality of times while configuration resources are saved, so that transmission reliability of the first PDCCH is improved.

It should be noted that in embodiments of this application, that the first PDCCH is transmitted a plurality of times, for example, transmitted M times, may be as follows: The M times of transmission are simultaneously performed, for example, the M times of transmission are simultaneously performed by using a plurality of TCI-states, a plurality of DMRS ports, and/or a plurality of different groups of frequency domain resources. Alternatively, the M times of transmission may be performed through time division, for example, the M times of transmission are performed through time division by using a plurality of TCI-states, a plurality of DMRS ports, and/or a plurality of different groups of time domain resources. In other words, that the first PDCCH is transmitted M times may be understood as follows: M first PDCCHs are transmitted, and the M first PDCCHs may be simultaneously transmitted, or may be transmitted through time division. The M first PDCCHs may be PDCCHs used to schedule a same PDSCH. The PDSCH may be transmitted only once, or may be repeatedly transmitted a plurality of times, and all times of transmission may correspond to a same redundancy version (RV) or different RVs of a same transport block (TB), or may correspond to different TBs. Content carried in the M first PDCCHs may be totally the same, for example, content of DCI carried in the M first PDCCHs is totally the same. Alternatively, content carried in the M first PDCCHs may not be totally the same. For example, when the PDSCH is also transmitted M times, the M first PDCCHs are in a one-to-one correspondence with the M PDSCHs, and each first PDCCH carries a related transmission parameter of a corresponding PDSCH. Because transmission parameters in the M times of transmission of the PDSCH are different, content carried in the corresponding first PDCCHs is different and is not totally the same.

The following describes, by using Embodiment 1 to Embodiment 4, in detail the communication method provided in embodiments of this application.

Embodiment 1

In Embodiment 1, a possible implementation of the communication method is described based on the foregoing Solution 1.

Figure 5:
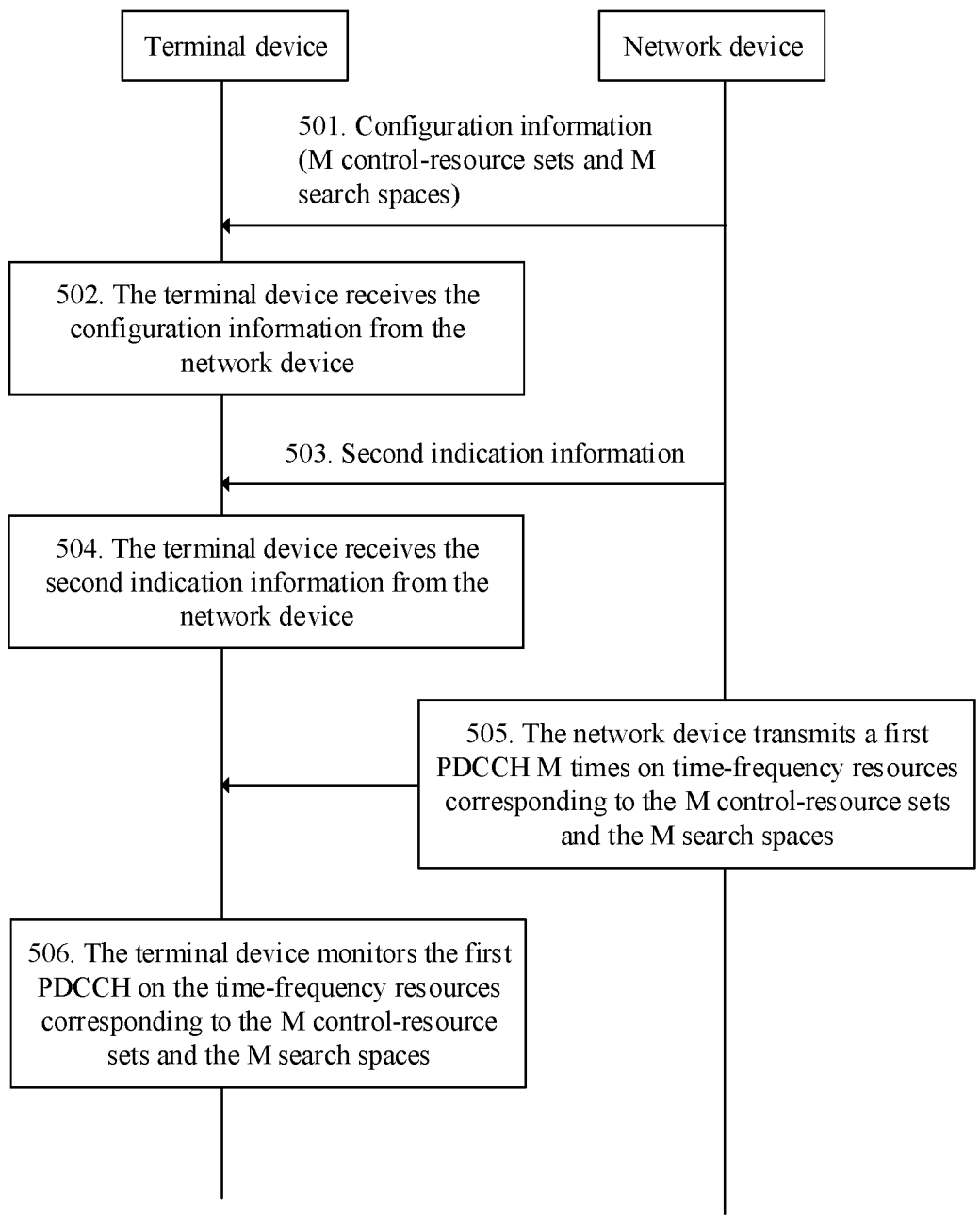
FIG. 5 is a schematic flowchart corresponding to a communication method according to Embodiment 1 of this application.

FIG. 5 is a schematic flowchart corresponding to a communication method according to Embodiment 1 of this application. As shown in FIG. 5, the method includes the following steps.

Step 501. A network device sends configuration information to a terminal device, where the configuration information is used to configure M control-resource sets and M search spaces, the M control-resource sets are one-to-one associated with the M search spaces, and M is an integer greater than 1.

Herein, each control-resource set in the M control-resource sets and a search space associated with the control-resource set may be used to transmit a first PDCCH once. Therefore, the M control-resource sets and the search spaces associated with the M control-resource sets may be used to transmit the first PDCCH M times.

Correspondingly, in step 502, the terminal device receives the configuration information from the network device.

In this embodiment of this application, after receiving the configuration information from the network device, the terminal device may determine whether the M control-resource sets and the M search spaces are used to transmit the first PDCCH M times. "Determine" herein may also be understood as "learn" or "know". This belongs to internal implementation of the terminal device. For example, the terminal device may determine, in a plurality of implementations, that the M control-resource sets and the M search spaces are used to transmit the first PDCCH M times. The following describes two possible implementations that are respectively Implementation a1 and Implementation a2. For example, a specific implementation for use may be indicated by using RRC, MAC CE, or DCI signaling.

Implementation a1

If the terminal device determines, based on the configuration information, that the M control-resource sets meet a preset condition 1 and/or the M search spaces meet a preset condition 2, the terminal device may determine that the M control-resource sets and the M search spaces are used to transmit the first PDCCH M times.

That the M control-resource sets meet a preset condition 1 may include the following: One or more parameters of the M control-resource sets are the same. For example, that the M control-resource sets meet a preset condition 1 may include one or more of the following:

(1) Frequency domain resources corresponding to the M control-resource sets are the same. For example, the M control-resource sets include a control-resource set 1. The control-resource set 1 is used as an example. A frequency domain resource of the control-resource set 1 may be indicated by using a bitmap. Each bit in the bitmap corresponds to a consecutive segment of frequency domain resource, for example, may be six consecutive RBs. For example, referring to the foregoing configuration information format of the control-resource set, the frequency domain resource corresponding to the control-resource set may be configured by using a parameter frequencyDomainResources. That frequency domain resources corresponding to the M control-resource sets are the same may be understood as follows: Parameters frequencyDomainResources of the M control-resource sets have a same value.

(2) Quantities of frequency domain resources corresponding to the M control-resource sets are the same. A control-resource set 1 is used as an example. When a frequency domain resource of the control-resource set 1 is indicated by using a bitmap, a quantity of frequency domain resources corresponding to the control-resource set 1 may be a quantity of bits whose values are 1 in the bitmap, for example, may be a quantity of bits whose values are 1 in a parameter frequencyDomainResources of the control-resource set 1. That quantities of frequency domain resources corresponding to the M control-resource sets are the same may be understood as follows: Quantities of bits whose values are 1 in parameters frequencyDomainResources of the M control-resource sets are the same.

(3) First duration of the M control-resource sets is the same. A control-resource set 1 is used as an example. First duration of the control-resource set 1 may be a quantity that is of consecutive symbols occupied in time domain and that corresponds to the control-resource set 1. For example, referring to the foregoing configuration information format of the control-resource set, the first duration may be configured by using a parameter duration. That first duration of the M control-resource sets is the same may be understood as follows: Parameters duration of the M control-resource sets have a same value.

(4) Control channel element (CCE)-resource element group (REG) mapping manners of the M control-resource sets are the same. A control-resource set 1 is used as an example. A CCE-REG mapping manner of the control-resource set 1 may be interleaving or non-interleaving. For example, referring to the foregoing configuration information format of the control-resource set, the CCE-REG mapping manner may be configured by using a parameter cce-REG-Mapping-Type. That CCE-REG mapping manners of the M control-resource sets are the same may be understood as follows: Parameters cce-REG-MappingType of the M control-resource sets have a same value.

(5) Precoding granularities of the M control-resource sets are the same. For example, referring to the foregoing configuration information format of the control-resource set, the precoding granularity may be configured by using a parameter precoderGranularity. That precoding granularities of the M control-resource sets are the same may be understood as follows: Parameters precoderGranularity of the M control-resource sets have a same value.

(6) Parameters tci-PresentInDCI of the M control-resource sets are the same.

(7) DMRS scrambling identifiers of the M control-resource sets are the same. For example, referring to the foregoing configuration information format of the control-resource set, the DMRS scrambling identifier may be configured by using a parameter pdcch-DMRS-ScramblingID. That DMRS scrambling identifiers of the M control-resource sets are the same may be understood as follows: Parameters pdcch-DMRS-ScramblingID of the M control-resource sets have a same value. In an example, the DMRS scrambling identifier may be a DMRS scrambling index.

It should be noted that the foregoing is described based on some possible cases in which the M control-resource sets meet the preset condition 1. In another possible example, another possible case may be further included. This is not specifically limited.

That the M search spaces meet a preset condition 2 may include the following: One or more parameters of the M search spaces are the same. For example, that the M search spaces meet a preset condition 2 may include one or more of the following:

(1) Detection periods of the M search spaces are the same.
(2) Slot offsets of the M search spaces are the same.

For example, referring to the foregoing configuration information format of the search space, the detection period and the slot offset may be configured by using a parameter monitoringSlotPeriodicityandoffset, where monitoringSlot- Periodicity corresponds to the detection period, and offset corresponds to the slot offset. For example, that detection periods and slot offsets of the M search spaces are the same may be understood as follows: Parameters monitoringSlotPeriodicityandoffset of the M search spaces have a same value. It should be noted that in another example, the parameters monitoringSlotPeriodicityandoffset of the M search spaces may be configured, so that the detection periods of the M search spaces are the same but the slot offsets thereof are different.

(3) Second duration of the M search spaces is the same. For example, the M search spaces may include a search space 1, and the search space 1 is used as an example. Second duration of the search space 1 may be understood as time in which the search space is continuously detected in one detection period, or a quantity of times the search space 1 repeatedly appears in one detection period. For example, referring to the foregoing configuration information format of the search space, the second duration may be configured by using a parameter duration. That second duration of the M search spaces is the same may be understood as follows: Parameters duration of the M search spaces have a same value.

(4) Time-domain start locations of the M search spaces are the same. For example, referring to the foregoing configuration information format of the search space, the time-domain start location may be configured by using a parameter monitoringSymbolsWithinSlot. That time-domain start locations of the M search spaces are the same may be understood as follows: Parameters monitoringSymbolsWithinSlot of the M search spaces have a same value.

(5) Quantities of times of blind detection of the M search spaces are the same. For example, referring to the foregoing configuration information format of the search space, the quantity of times of blind detection may be configured by using a parameter nrofCandidates. That quantities of times of blind detection of the M search spaces are the same may be understood as follows: Parameters nrofCandidates of the M search spaces have a same value.

(6) Types of the M search spaces are the same. For example, referring to the foregoing configuration information format of the search space, the type of the search space may be configured by using a parameter searchSpaceType. That types of the M search spaces are the same may be understood as follows: Parameters searchSpaceType of the M search spaces have a same value.

It should be noted that the foregoing is described based on some possible cases in which the M search spaces meet the preset condition 2. In another possible example, another possible case may be further included. This is not specifically limited.

Implementation a2

If the terminal device receives first indication information from the network device, and the first indication information indicates that the M control-resource sets and the M search spaces are used to transmit the first PDCCH M times, the terminal device may determine that the M control-resource sets and the M search spaces are used to transmit the first PDCCH M times. For example, the terminal device may receive the first indication information from the network device in a plurality of manners. For example, the first indication information may be carried in RRC signaling, MAC CE signaling, or DCI signaling. The first indication information may also have a plurality of specific representation forms.

In a possible implementation, the first indication information may indicate an association relationship between the M control-resource sets. For example, information, for example, an index, that is in a control-resource set and that indicates another control-resource set indicates that the control-resource set is associated with the another control-resource set. A plurality of control-resource sets having an association relationship may be used to repeatedly transmit the PDCCH. Alternatively, the first indication information may indicate an association relationship between the M search spaces. For example, information, for example, an index, that is in a search space and that indicates another search space indicates that the search space is associated with the another search space. A plurality of search spaces having an association relationship may be used to repeatedly transmit the PDCCH.

In another possible implementation, a field in the foregoing signaling may be used to indicate whether to repeatedly transmit the PDCCH. Further, a used PDCCH repeated transmission mode may be specifically indicated, for example, a time-domain repeated transmission mode, a space-domain repeated transmission mode, a frequency-domain repeated transmission mode, and a first repeated transmission mode. The time-domain repeated transmission mode means that in a plurality of times of transmission of the PDCCH, a same frequency domain resource is used, but different time domain resources are used. The frequency-domain repeated transmission mode means that in a plurality of times of transmission of the PDCCH, a same time domain resource is used, but different frequency domain resources are used. The space-domain repeated transmission mode means that in a plurality of times of transmission of the PDCCH, a same time domain resource and a same frequency domain resource are used. The first repeated transmission mode may be a transmission mode other than the foregoing three repetition transmission modes, for example, a transmission mode in which different time domain resources and different frequency domain resources are used in a plurality of times of transmission of the PDCCH. Alternatively, the first indication information may indicate information about a control-resource set and/or a search space that are/is used to repeatedly transmit the PDCCH. For example, the first indication information may indicate information, for example, an index, about the M control-resource sets and/or the M search spaces that are used to repeatedly transmit the PDCCH, so that the terminal device can learn that the M control-resource sets and/or the M search spaces are used to repeatedly transmit the PDCCH.

In this embodiment of this application, the M control-resource sets may meet a configuration constraint 1, and/or the M search spaces may meet a configuration constraint 2. In other words, if the M control-resource sets are used to repeatedly transmit the first PDCCH M times, the M control-resource sets need to meet the configuration constraint 1. If the M search spaces are used to repeatedly transmit the first PDCCH M times, the M search spaces need to meet the configuration constraint 2.

That the M control-resource sets meet the configuration constraint 1 may include the following: One or more parameters of the M control-resource sets are the same, and/or one or more parameters of the M control-resource sets are different. For example, that the M control-resource sets meet the configuration constraint 1 may include one or more of the following:

(1) Frequency domain resources corresponding to the M control-resource sets are the same.
(2) Quantities of frequency domain resources corresponding to the M control-resource sets are the same.
(3) First duration of the M control-resource sets is the same.
(4) CCE-REG mapping manners of the M control-resource sets are the same.
(5) Precoding granularities of the M control-resource sets are the same.
(6) Parameters tci-PresentInDCI of the M control-resource sets are the same.
(7) DMRS scrambling identifiers of the M control-resource sets are the same.
(8) Frequency domain resources corresponding to the M control-resource sets are different.
(9) DMRS scrambling identifiers of the M control-resource sets are different.

That the M search spaces meet the configuration constraint 2 may include the following: One or more parameters of the M search spaces are the same, and/or one or more parameters of the M search spaces are different. That the M search spaces meet the configuration constraint 2 may include one or more of the following:

(1) Detection periods of the M search spaces are the same.
(2) Slot offsets of the M search spaces are the same.
(3) Second duration of the M search spaces is the same.
(4) Time-domain start locations of the M search spaces are the same.
(5) Quantities of times of blind detection of the M search spaces are the same.
(6) Types of the M search spaces are the same.
(7) Time-domain start locations of the M search spaces are different. For example, when the time-domain start locations of the M search spaces are different, time-domain start locations of any two search spaces in the M search spaces need to be staggered from each other by at least X symbols, where X is a value indicated by parameters duration of the M control-resource sets (herein, it is assumed that the parameters duration of the M control-resource sets indicate a same value), to ensure that the M search spaces do not overlap, so that the first PDCCH is repeatedly transmitted through time division.
(8) Slot offsets of the M search spaces are different.

Step 503. The network device sends second indication information to the terminal device, where the second indication information is used to indicate to activate M TCI-states separately corresponding to the M control-resource sets.

For example, the network device may send a MAC CE to the terminal device. The MAC CE includes the second indication information. The M control-resource sets are in a one-to-one correspondence with the M TCI-states.

Correspondingly, in step 504, the terminal device receives the second indication information from the network device, and activates the M TCI-states.

Step 505. The network device transmits the first PDCCH M times on time-frequency resources corresponding to the M control-resource sets and the M search spaces.

For example, the network device may transmit, based on the M TCI-states separately corresponding to the M control-resource sets, the first PDCCH M times on the time-frequency resources corresponding to the M control-resource sets and the M search spaces. For example, the M control-resource sets include a control-resource set 1 and a control-resource set 2, the M search spaces include a search space 1 and a search space 2, the control-resource set 1 is associated with the search space 1, the control-resource set 2 is associated with the search space 2, an activated TCI-state corresponding to the control-resource set 1 is a TCI-state 1, and an activated TCI-state corresponding to the control-resource set 2 is a TCI-state 2. The network device may transmit, based on the TCI-state 1, the first PDCCH once on a time-frequency resource corresponding to the control-resource set 1 and the search space 1, and transmit, based on the TCI-state 2, the first PDCCH once on a time-frequency resource corresponding to the control-resource set 2 and the search space 2. In other words, the M control-resource sets and the M search spaces constitute M combinations {control-resource set, search space}, and each combination {control-resource set, search space} corresponds to one group of time-frequency resources, and is used to transmit the first PDCCH once. To be specific, one time of transmission of the first PDCCH corresponds to one group of time-frequency resources, and M times of transmission of the first PDCCH correspond to M groups of time-frequency resources. The M groups of time-frequency resources may be totally the same, or may have a same time domain resource but different frequency domain resources, or may have different time domain resources but a same frequency domain resource, or may have different time domain resources and different frequency domain resources. Generally, a time-frequency resource corresponding to one time of transmission of the first PDCCH may be briefly referred to as one group of time-frequency resources, and time-frequency resources corresponding to the M times of transmission of the first PDCCH may be briefly referred to as M groups of time-frequency resources.

It should be understood that one group of time-frequency resources corresponding to one time of transmission of the first PDCCH may include several CCEs, and a time-frequency resource on which the first PDCCH is actually borne may be some of the CCEs. In other words, one group of time-frequency resources corresponding to one time of transmission of the first PDCCH is not the time-frequency resource on which the first PDCCH is actually borne, but may be in a larger resource range.

In an example, the M groups of time-frequency resources corresponding to the M times of transmission of the first PDCCH may be totally the same, that is, the M groups of time-frequency resources have a same time domain resource and a same frequency domain resource. In this case, the network device may transmit the first PDCCH on a same time-frequency resource based on the M TCI-states. In this example, different DMRS ports may be used for the M first PDCCHs, for example, different DMRS ports generated by using a same DMRS scrambling identifier (parameters pdcch-DMRS-ScramblingID of the M control-resource sets are the same). Therefore, the network device may repeatedly transmit the first PDCCH in space domain by using different DMRS ports. Alternatively, a same DMRS port may be used for the M first PDCCHs. In this embodiment of this application, that a same or different DMRS ports may be used for the M first PDCCHs may be understood as follows: A same or different DMRS sequences may be used for the M first PDCCHs. In other words, the DMRS port may be replaced with the DMRS sequence. In this embodiment of this application, the DMRS port is used as an example for description.

Figure 6A:
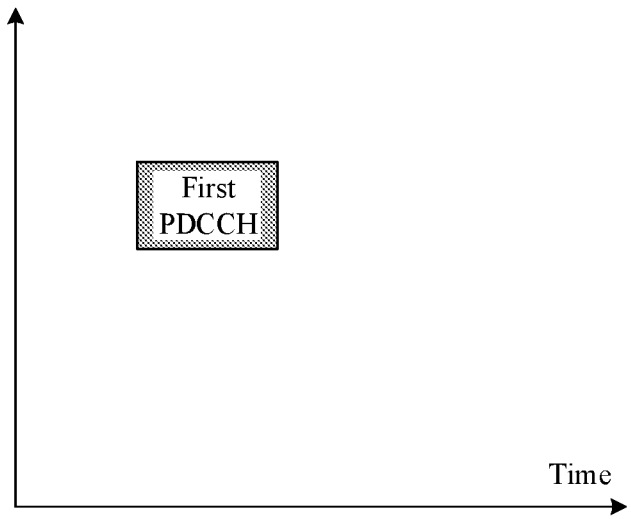
FIG. 6a is a schematic diagram of repeatedly transmitting a first PDCCH according to an embodiment of this application.
Figure 6B:
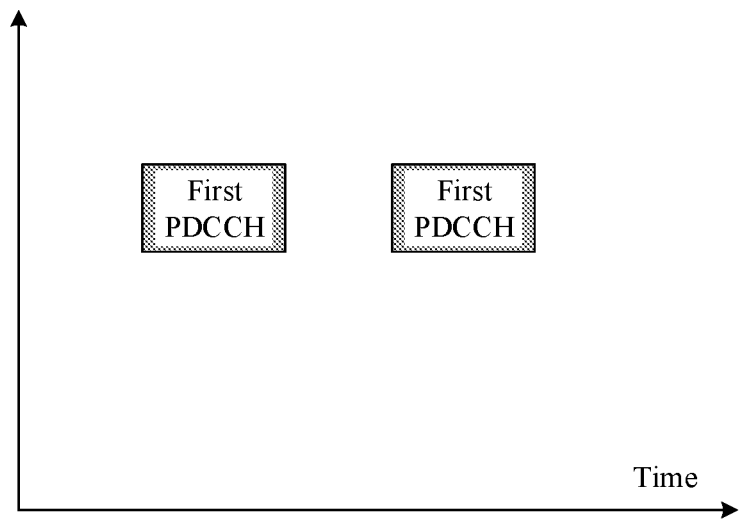
FIG. 6b is another schematic diagram of repeatedly transmitting a first PDCCH according to an embodiment of this application.

It should be noted that, because the time-frequency resources corresponding to the M control-resource sets and the M search spaces are time-frequency resources that periodically appear, the network device may transmit the first PDCCH on a same time-frequency resource in a same detection period, or transmit the first PDCCH on different time-frequency resources in different periods. For example, M=2. Referring to FIG. 6a, the network device may transmit the first PDCCH on a same time-frequency resource in a same detection period by using different DMRS ports (for example, a DMRS port 1 and a DMRS port 2) or a same DMRS port. Alternatively, referring to FIG. 6b, the network device may transmit the first PDCCH once on a time-frequency resource in the first detection period by using a DMRS port 1, and transmit the first PDCCH once on a time-frequency resource in the second detection period by using a DMRS port 2.

In this embodiment of this application, an example in which the detection periods of the M search spaces are the same and the network device transmits the first PDCCH on a time-frequency resource in a same detection period is mainly used for description.

Figure 6C:
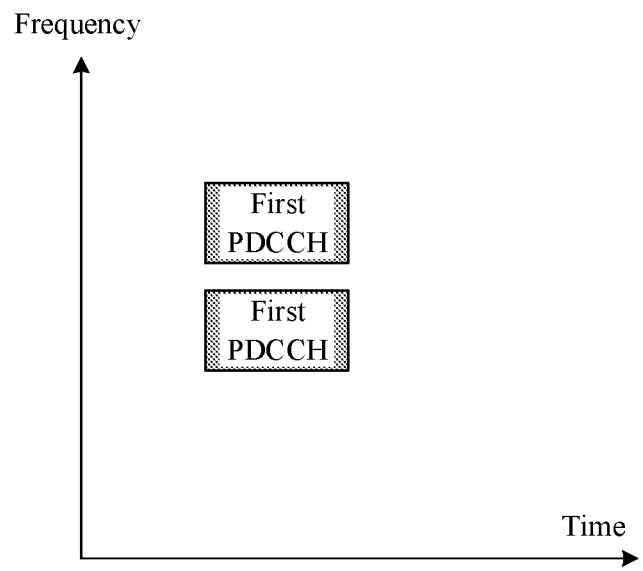
FIG. 6c is another schematic diagram of repeatedly transmitting a first PDCCH according to an embodiment of this application.

In another example, the M groups of time-frequency resources corresponding to the M times of transmission of the first PDCCH have a same time domain resource but different frequency domain resources. In this case, the network device may transmit the first PDCCH M times on a same time domain resource but different frequency domain resources based on the M TCI-states, that is, the network device may repeatedly transmit the first PDCCH in frequency domain. For example, referring to FIG. 6c, M=2, and the network device may transmit the first PDCCH once on a frequency domain resource 1, and transmit the first PDCCH once on a frequency domain resource 2. In this example, a same DMRS port may be used for the M first PDCCHs, or different DMRS ports may be used for the M first PDCCHs.

In another example, the M groups of time-frequency resources corresponding to the M times of transmission of the first PDCCH have different time domain resources but a same frequency domain resource. In this case, the network device may transmit the first PDCCH M times on a same frequency domain resource but different time domain resources based on the M TCI-states, that is, the network device may repeatedly transmit the first PDCCH in time domain. For example, referring to FIG. 6d, M=2, and the network device may transmit the first PDCCH once on a time domain resource 1, and transmit the first PDCCH once on a time domain resource 2. In this example, a same DMRS port may be used for the M first PDCCHs, or different DMRS ports may be used for the M first PDCCHs.

In another example, the M groups of time-frequency resources corresponding to the M times of transmission of the first PDCCH have different time domain resources and different frequency domain resources, that is, both time domain resources and frequency domain resources of the M groups of time-frequency resources are different. In this case, the network device may transmit the first PDCCH M times on different frequency domain resources and different time domain resources based on the M TCI-states. For example, referring to FIG. 6e, M=2, and the network device may transmit the first PDCCH once on a time-frequency resource 1, and transmit the first PDCCH once on a time-frequency resource 2.

It should be noted that the network device may repeatedly transmit the first PDCCH by using one of the plurality of transmission modes described in the foregoing examples. For example, the network device may further indicate, to the terminal device, a transmission mode used by the network device. For example, the network device sends indication information to the terminal device to indicate a specific transmission mode used by the network device.

Step 506. The terminal device monitors the first PDCCH on the time-frequency resources corresponding to the M control-resource sets and the M search spaces.

Figure 7:
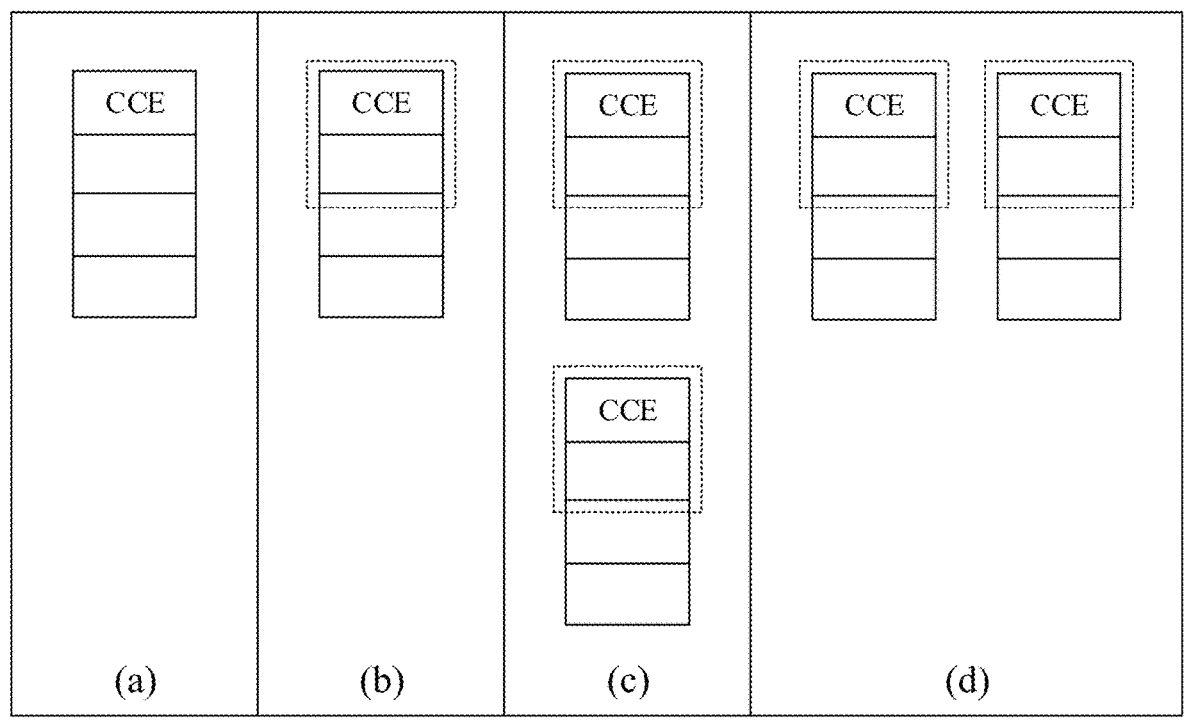
FIG. 7 is a schematic diagram of performing blind detection by a terminal device according to an embodiment of this application.

For example, the terminal device may receive, based on the M TCI-states corresponding to the M control-resource sets, the first PDCCH on the M groups of time-frequency resources corresponding to the M times of transmission of the first PDCCH. The terminal device may receive the first PDCCH by using a blind detection process. The blind detection process is to obtain a signal on some time-frequency resources such as one group of CCEs in one group of time-frequency resources, and then decode the signal. If the decoding succeeds, it indicates that the first PDCCH is successfully received. If the decoding does not succeed, the terminal device continues to attempt another group of CCEs. For example, it is assumed that one group of time-frequency resources includes four CCEs, and two CCEs may be used in one time of blind detection. In this case, as shown in FIG. 7(a), the terminal device may attempt various combinations including two CCEs in the four CCEs. A specific quantity of attempts may be configured by using the parameter nrofCandidates of the search space associated with the control-resource set. Therefore, the terminal device may receive a signal on each of the M groups of time-frequency resources based on the M TCI-states corresponding to the M control-resource sets, and perform separate decoding or combined decoding on the signals on the M groups of time-frequency resources.

Separate decoding may be understood as separately performing blind detection on the M groups of time-frequency resources. For example, the terminal device sequentially performs blind detection on the M groups of time-frequency resources. If blind detection on a group of time-frequency resources does not succeed, the terminal device continues to perform blind detection on a next group of time-frequency resources. If blind detection on a group of time-frequency resources succeeds, the terminal device may stop blind detection on a remaining group of time-frequency resources, to reduce a quantity of times of blind detection, and reduce a processing burden of the terminal device. Because each group of time-frequency resources corresponds to one search space, separate decoding may be further described as follows: Blind detection is separately performed in the M search spaces, and if blind detection in a search space does not succeed, the terminal device continues to perform blind detection in a next search space. If blind detection in a search space succeeds, the terminal device may stop blind detection in a remaining search space.

Combined decoding may be understood as performing joint blind detection on the M groups of time-frequency resources. For example, in a joint blind detection mechanism, a signal on some time-frequency resources such as one group of CCEs in the M groups of time-frequency resources may be obtained in each time of blind detection, to obtain a total of M signals, and combined decoding is performed on the M signals. The M signals correspond to the M groups of time-frequency resources, that is, one signal is determined from one group of CCEs in each group of time-frequency resources, and a total of M signals are obtained. Based on different repeated transmission modes of the first PDCCH, joint blind detection may fall into the following types that are described in detail below.

(1) Joint blind detection in the space-domain repeated transmission mode.

When the first PDCCH is repeatedly transmitted in space domain, the M groups of time-frequency resources corresponding to the M times of transmission of the first PDCCH are totally the same. As shown in FIG. 7(b), because the M groups of time-frequency resources are totally the same, that is, overlap together, the M groups of time-frequency resources may be considered as one group of time-frequency resources. The group of time-frequency resources includes a plurality of CCEs. Each time the terminal device obtains one group of CCEs from the CCEs included in the group of time-frequency resources, receives M signals from the group of CCEs by using M different DMRS ports, and performs combined decoding on the M signals. The foregoing operation is referred to as one time of joint blind detection. If the decoding does not succeed, the terminal device continues to perform a next time of blind detection, that is, obtains another group of CCEs from the CCEs included in the group of time-frequency resources, receives M signals from the group of CCEs by using M different DMRS ports, and performs combined decoding on the M signals. If the decoding succeeds, the terminal device stops blind detection on the M groups of time-frequency resources, or stops blind detection in search spaces corresponding to the M times of transmission of the first PDCCH. As shown in FIG. 7(b), the terminal device receives M signals on the first two CCEs by using M different DMRS ports, and performs combined decoding on the M signals. If the decoding does not succeed, the terminal device receives M signals on the last two CCEs by using M different DMRS ports, and performs combined decoding on the M signals.

(2) Joint blind detection in another repeated transmission mode.

When another repeated transmission mode is used for the first PDCCH, the M groups of time-frequency resources corresponding to the M times of transmission of the first PDCCH are not totally the same. For example, the another repeated transmission mode may include the frequency-domain repeated transmission mode, the time-domain repeated transmission mode, and the first repeated transmission mode. In this case, each group of time-frequency resources in the M groups of time-frequency resources includes a plurality of CCEs. In one time of blind detection, the terminal device may obtain one group of CCEs from each group of time-frequency resources, obtain a signal on the group of CCEs to obtain a total of M signals, and perform combined decoding on the M signals. If the decoding does not succeed, the terminal device continues to perform a next time of blind detection, that is, obtains another group of CCEs from each group of time-frequency resources, obtains a signal on the group of CCEs to obtain a total of M signals, and performs combined decoding on the M signals. If the decoding succeeds, the terminal device stops blind detection on the M groups of time-frequency resources, or stops blind detection in search spaces corresponding to the M times of transmission of the first PDCCH.

For example, in each time of blind detection, quantities of CCEs included in the groups of CCEs selected by the terminal device from all the groups of time-frequency resources for combined decoding are the same. For example, in each time of blind detection, the terminal device selects two CCEs from each group of time-frequency resources, obtains a signal on the two CCEs to obtain a total of M signals, and performs combined decoding on the M signals. Further, in one time of blind detection, the following may be limited: The groups of CCEs selected from all the groups of time-frequency resources for combined decoding have a same CCE number, sorting, or location in all the groups of time-frequency resources. For example, as shown in FIG. 7(c) and FIG. 7(d), each group of time-frequency resources in the M groups of time-frequency resources includes four CCEs. In the first time of blind detection, the first two CCEs in each group of time-frequency resources are obtained for combined decoding. In the second time of blind detection, the last two CCEs in each group of time-frequency resources are obtained for combined decoding. This manner may help implement joint blind detection, to avoid the following problem: Joint blind detection is disordered because CCEs at different locations or with different numbers are obtained from the M groups of time-frequency resources.

It should be noted that in another possible example, in each time of blind detection, the quantities of CCEs included in the groups of CCEs selected by the terminal device from all the groups of time-frequency resources for combined decoding may be different. This is not limited in this embodiment of this application.

For example, a specific combined decoding method for use may be indicated by the network device to the terminal device by using RRC, MAC CE, or DCI signaling, or reported by the terminal device to the network device.

In the foregoing method, the network device may configure the M control-resource sets and the M search spaces for the terminal device, and further transmits the first PDCCH M times on the time-frequency resources corresponding to the M control-resource sets and the M search spaces, so that transmission reliability of the first PDCCH can be effectively improved. In addition, after receiving the configuration information from the network device, the terminal device may learn that the M control-resource sets and the M search spaces are used to transmit the first PDCCH M times. If processing is performed through separate decoding, after the decoding succeeds, blind detection may be stopped, to prevent resource consumption of the terminal device from being large because blind detection is performed on all possibilities. If processing is performed through combined decoding, a quantity of times of blind detection may be effectively reduced, to help save processing resources of the terminal device.

Embodiment 2

In Embodiment 2, a possible implementation of the communication method is described based on the foregoing Solution 2.

Figure 8:
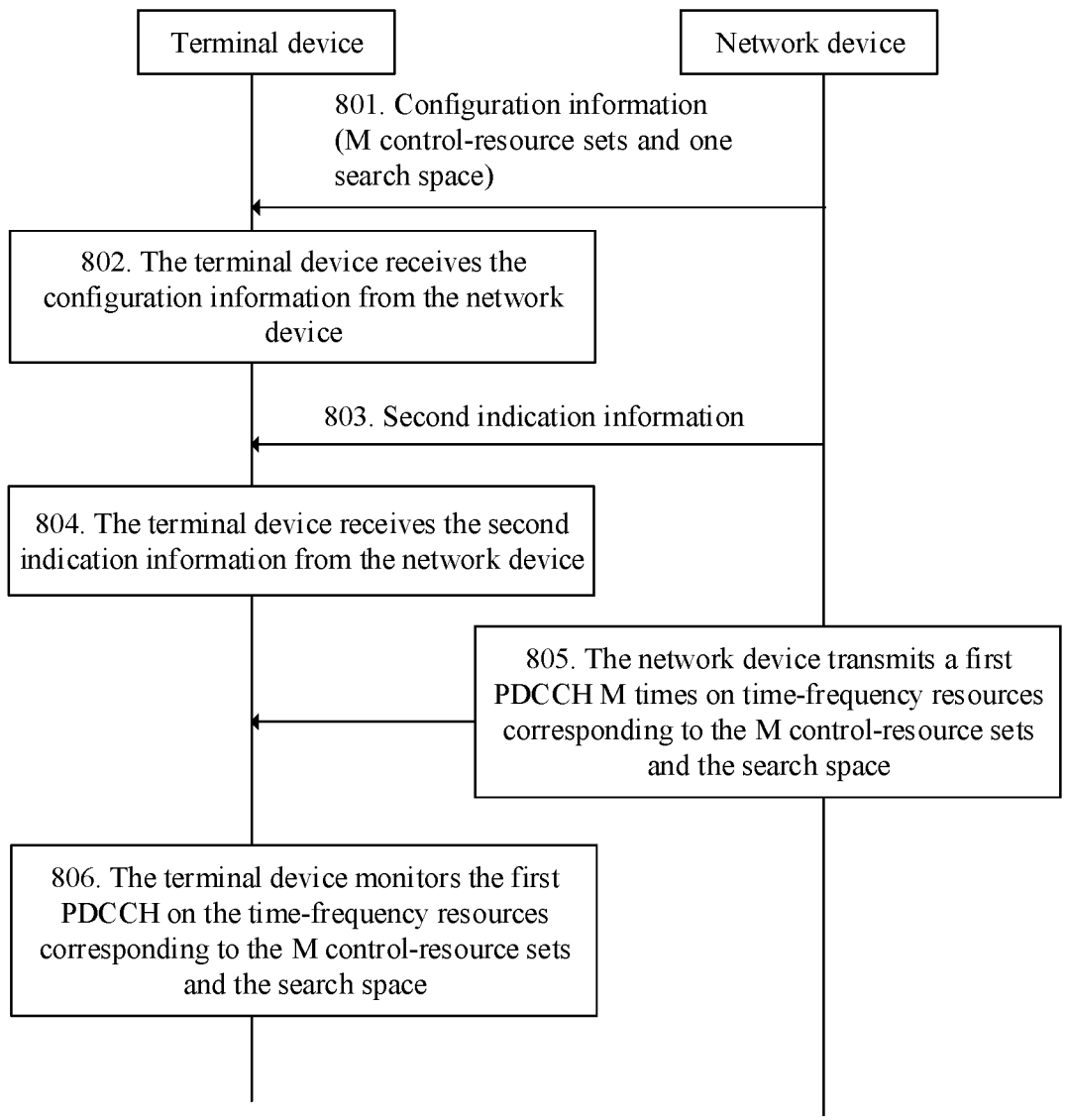
FIG. 8 is a schematic flowchart corresponding to a communication method according to Embodiment 2 of this application.

FIG. 8 is a schematic flowchart corresponding to a communication method according to Embodiment 2 of this application. As shown in FIG. 8, the method includes the following steps.

Step 801. A network device sends configuration information to a terminal device, where the configuration information is used to configure M control-resource sets and one search space, and the M control-resource sets each are associated with the search space.

Herein, each control-resource set in the M control-resource sets and the search space associated with the control-resource set are used to transmit a first PDCCH once. Therefore, the M control-resource sets and the search space associated with the M control-resource sets may be used to transmit the first PDCCH M times.

Correspondingly, in step 802, the terminal device receives the configuration information from the network device.

In this embodiment of this application, after receiving the configuration information from the network device, the terminal device may determine whether the M control-resource sets and the search space are used to transmit the first PDCCH M times. For example, the terminal device may determine, in a plurality of implementations, that the M control-resource sets and the search space are used to transmit the first PDCCH M times. The following describes two possible implementations that are respectively Implementation b1 and Implementation b2.

Implementation b1

If the terminal device determines, based on the configuration information, that the M control-resource sets meet a preset condition 3 and/or the search space meets a preset condition 4, the terminal device may determine that the M control-resource sets and the search space are used to transmit the first PDCCH M times.

That the M control-resource sets meet a preset condition 3 may include the following: One or more parameters of the M control-resource sets are the same. For example, that the M control-resource sets meet a preset condition 3 may include one or more of the following:
  (1) Frequency domain resources corresponding to the M control-resource sets are the same.
  (2) Quantities of frequency domain resources corresponding to the M control-resource sets are the same.
  (3) First duration of the M control-resource sets is the same.
  (4) CCE-REG mapping manners of the M control-resource sets are the same.
  (5) Precoding granularities of the M control-resource sets are the same.
  (6) Parameters tci-PresentInDCI of the M control-resource sets are the same.
  (7) DMRS scrambling identifiers of the M control-resource sets are the same.
  (8) Search spaces associated with the M control-resource sets are the same.

It should be noted that the foregoing is described based on some possible cases in which the M control-resource sets meet the preset condition 3. In another possible example, another possible case may be further included. This is not specifically limited.

That the search space meets a preset condition 4 includes one or more of the following:
  (1) The search space is associated with a plurality of control-resource sets.
  (2) The search space includes a plurality of MOs.
  (3) A quantity of MOs included in the search space is equal to a quantity of control-resource sets associated with the search space. For example, the search space includes M MOs, and the search space is associated with M control-resource sets.

It should be noted that, that the search space meets a preset condition 4 may alternatively mean that the search space meets a configuration constraint 4. The foregoing is described based on some possible cases in which the search space meets the preset condition 4. In another possible example, another possible case may be further included. This is not specifically limited.

Implementation b2

If the terminal device receives first indication information from the network device, and the first indication information is used to indicate that the M control-resource sets and the search space are used to transmit the first PDCCH M times, the terminal device may determine that the M control-resource sets and the search space are used to transmit the first PDCCH M times. For example, the terminal device may receive the first indication information from the network device in a plurality of manners. For example, the first indication information may be carried in RRC signaling, MAC CE signaling, or DCI signaling. The first indication information may also have a plurality of specific representation forms. For details, refer to the related descriptions of the first indication information in Embodiment 1. Details are not described herein again.

In this embodiment of this application, the M control-resource sets may meet a configuration constraint 3, and/or the search space may meet a configuration constraint 4. In other words, if the M control-resource sets are used to repeatedly transmit the first PDCCH M times, the M control-resource sets need to meet the configuration constraint 3. If the search space is used to repeatedly transmit the first PDCCH M times, the search space needs to meet the configuration constraint 4.

That the M control-resource sets meet the configuration constraint 3 may include the following: One or more parameters of the M control-resource sets are the same, and/or one or more parameters of the M control-resource sets are different. For example, that the M control-resource sets meet the configuration constraint 3 may include one or more of the following:
  (1) Frequency domain resources corresponding to the M control-resource sets are the same.
  (2) Quantities of frequency domain resources corresponding to the M control-resource sets are the same.
  (3) First duration of the M control-resource sets is the same.
  (4) CCE-REG mapping manners of the M control-resource sets are the same.
  (5) Precoding granularities of the M control-resource sets are the same.
  (6) Parameters tci-PresentInDCI of the M control-resource sets are the same.
  (7) DMRS scrambling identifiers of the M control-resource sets are the same.
  (8) Frequency domain resources corresponding to the M control-resource sets are different.
  (9) DMRS scrambling identifiers of the M control-resource sets are different.

That the search space meets the configuration constraint 4 may include the following: One or more parameters of the search space are the same, and/or one or more parameters of the search space are different. That the search space meets the configuration constraint 4 may include one or more of the following:
  (1) The search space is associated with a plurality of control-resource sets.
  (2) The search space includes a plurality of MOs.
  (3) A quantity of MOs included in the search space is equal to a quantity of control-resource sets associated with the search space. For example, the search space includes M MOs, and the search space is associated with M control-resource sets.

Step 803. The network device sends second indication information to the terminal device, where the second indication information is used to indicate to activate M TCI-states separately corresponding to the M control-resource sets.

Correspondingly, in step 804, the terminal device receives the second indication information from the network device, and activates the M TCI-states.

Step 805. The network device transmits the first PDCCH M times on time-frequency resources corresponding to the M control-resource sets and the search space.

For example, the network device may transmit, based on the M TCI-states separately corresponding to the M control-resource sets, the first PDCCH M times on the time-frequency resources corresponding to the M control-resource sets and the search space. For example, the M control-resource sets include a control-resource set 1 and a control-resource set 2, the control-resource set 1 and the control-resource set 2 are associated with the search space, an activated TCI-state corresponding to the control-resource set 1 is a TCI-state 1, and an activated TCI-state corresponding to the control-resource set 2 is a TCI-state 2. The network device may transmit, based on the TCI-state 1, the first PDCCH once on a time-frequency resource corresponding to the control-resource set 1 and the search space, and transmit, based on the TCI-state 2, the first PDCCH once on a time-frequency resource corresponding to the control-resource set 2 and the search space.

In this embodiment of this application, the search space may include one MO or M MOs. The following separately describes the two cases in detail.

Case 1: The search space includes one MO.

That the search space includes one MO may be that a quantity of bits whose values are 1 and that are included in a parameter monitoringSymbolsWithinSlot of the search space is 1. A group of symbols corresponding to X consecutive symbols starting from a symbol corresponding to the bit whose value is 1 in monitoringSymbolsWithinSlot is an MO. X is a value of a parameter duration of the control-resource set.

When the search space includes only one MO, the M control-resource sets and the MO may be used to determine M groups of time-frequency resources. In all the groups of time-frequency resources, time domain resources are the same, and frequency domain resources may be the same or different. Whether the frequency domain resources are the same depends on whether the frequency domain resources corresponding to the M control-resource sets are the same. The M groups of time-frequency resources are in a one-to-one correspondence with M times of transmission of the first PDCCH, that is, one time of transmission of the first PDCCH corresponds to one group of time-frequency resources.

In an example, referring to FIG. 6a, the frequency domain resources corresponding to the M control-resource sets are the same, that is, the M groups of time-frequency resources corresponding to the M control-resource sets and the search space are totally the same. Therefore, the network device may transmit the first PDCCH on a same time-frequency resource based on the M TCI-states. In all times of transmission of the first PDCCH, different DMRS ports or a same DMRS port may be used. In another example, referring to FIG. 6c, the frequency domain resources corresponding to the M control-resource sets are different, that is, the M groups of time-frequency resources corresponding to the M control-resource sets and the search space have a same time domain resource but different frequency domain resources. Therefore, the network device may transmit the first PDCCH on a same time domain resource but different frequency domain resources based on the M TCI-states. In all times of transmission of the first PDCCH, different DMRS ports or a same DMRS port may be used.

Case 2: The search space includes M MOs.

That the search space includes M MOs means that a quantity of bits whose bit values are 1 and that are included in a parameter monitoringSymbolsWithinSlot of the search space is M, and the M MOs correspond to M groups of different time domain resources. For example, the following may be further constrained: An offset between locations of any two bits whose values are 1 is at least X symbols, and X is a value indicated by a parameter duration of the control-resource set. The locations are staggered by X symbols, to ensure that the M MOs do not overlap, so as to repeatedly transmit the first PDCCH through time division. For example, when X=3, a value of monitoringSymbolsWithinSlot is 10010001000100, and the foregoing constraint is met because the offset between the locations of any two bits whose values are 1 is not less than three symbols.

When the search space includes M MOs, the M control-resource sets may be one-to-one associated with the M MOs. There may be a plurality of manners in which the M control-resource sets are on-to-one associated with the M MOs. For example, the M control-resource sets may be in a one-to-one correspondence with the M MOs in ascending order of indexes. For example, a control-resource set with a smallest index is associated with the first (earliest) MO, and a control-resource set with a largest index is associated with the last (latest) MO. The M control-resource sets may be in a one-to-one correspondence with the M MOs based on a configuration sequence. For example, a control-resource set that ranks first in the configuration sequence is associated with the first (earliest) MO, and a control-resource set that ranks last in the configuration sequence is associated with the last (latest) MO.

Further, the M control-resource sets and the M MOs may be used to determine M groups of time-frequency resources. In all the groups of time-frequency resources, time domain resources are different, and frequency domain resources may be the same or different. Whether the frequency domain resources are the same depends on whether the frequency domain resources corresponding to the M control-resource sets are the same. The M groups of time-frequency resources are in a one-to-one correspondence with M times of transmission of the first PDCCH, that is, one time of transmission of the first PDCCH corresponds to one group of time-frequency resources.

Figure 6D:
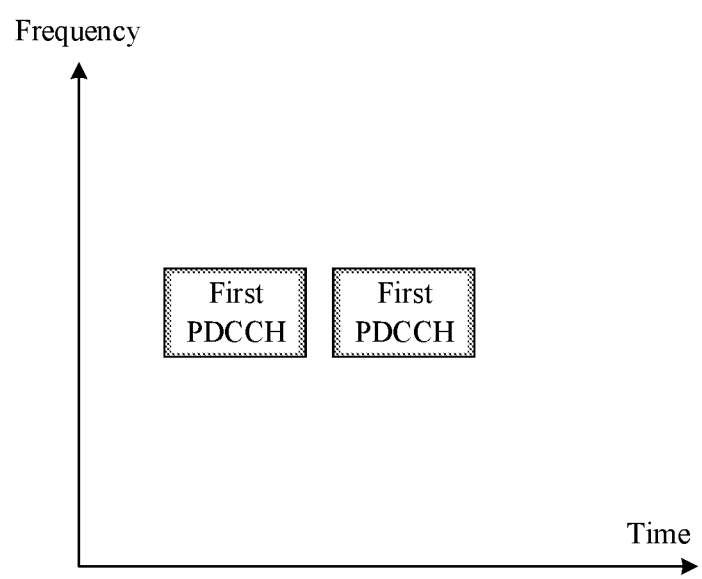
FIG. 6d is another schematic diagram of repeatedly transmitting a first PDCCH according to an embodiment of this application.

In an example, referring to FIG. 6d, the frequency domain resources corresponding to the M control-resource sets are the same, that is, the M groups of time-frequency resources corresponding to the M control-resource sets and the search space have different time domain resources but a same frequency domain resource. Therefore, the network device may transmit the first PDCCH M times on a same frequency domain resource but different time domain resources based on the M TCI-states. In all times of transmission of the first PDCCH, different DMRS ports or a same DMRS port may be used. In another example, referring to FIG. 6e, the frequency domain resources corresponding to the M control-resource sets are different, that is, the M groups of time-frequency resources corresponding to the M control-resource sets and the search space have different time domain resources and different frequency domain resources. Therefore, the network device may transmit the first PDCCH M times on different frequency domain resources and different time domain resources based on the M TCI-states. In all times of transmission of the first PDCCH, different DMRS ports or a same DMRS port may be used.

For example, the network device may indicate, to the terminal device, a transmission mode used by the network device. For example, the network device sends indication information to the terminal device to indicate a specific transmission mode used by the network device.

Step 806. The terminal device monitors the first PDCCH on the time-frequency resources corresponding to the M control-resource sets and the search space.

For example, the terminal device may receive the first PDCCH on the M groups of time-frequency resources based on the M TCI-states separately corresponding to the M control-resource sets. If the search space includes one MO, the terminal device may receive, based on the M TCI-states separately corresponding to the M control-resource sets, M signals on time-frequency resources corresponding to the M control-resource sets and the MO, and perform separate decoding or combined decoding on the M signals. If the search space includes M MOs, the terminal device may receive, based on the M TCI-states separately corresponding to the M control-resource sets, M signals on time-frequency resources corresponding to the M control-resource sets and the M MOs, and perform separate decoding or combined decoding on the M signals. For descriptions of separate decoding or combined decoding, refer to Embodiment 1. Details are not described herein again.

In the foregoing method, the network device may configure the M control-resource sets and the search space for the terminal device, and further transmits the first PDCCH M times on the time-frequency resources corresponding to the M control-resource sets and the search space, so that transmission reliability of the first PDCCH can be effectively improved. In addition, after receiving the configuration information from the network device, the terminal device may learn that the M control-resource sets and the search space are used to transmit the first PDCCH M times. If processing is performed through separate decoding, after the decoding succeeds, blind detection may be stopped, to prevent resource consumption of the terminal device from being large because blind detection is performed on all possibilities. If processing is performed through combined decoding, a quantity of times of blind detection may be effectively reduced, to help save processing resources of the terminal device.

Embodiment 3

In Embodiment 3, a possible implementation of the communication method is described based on the foregoing Solution 3.

Figure 9:
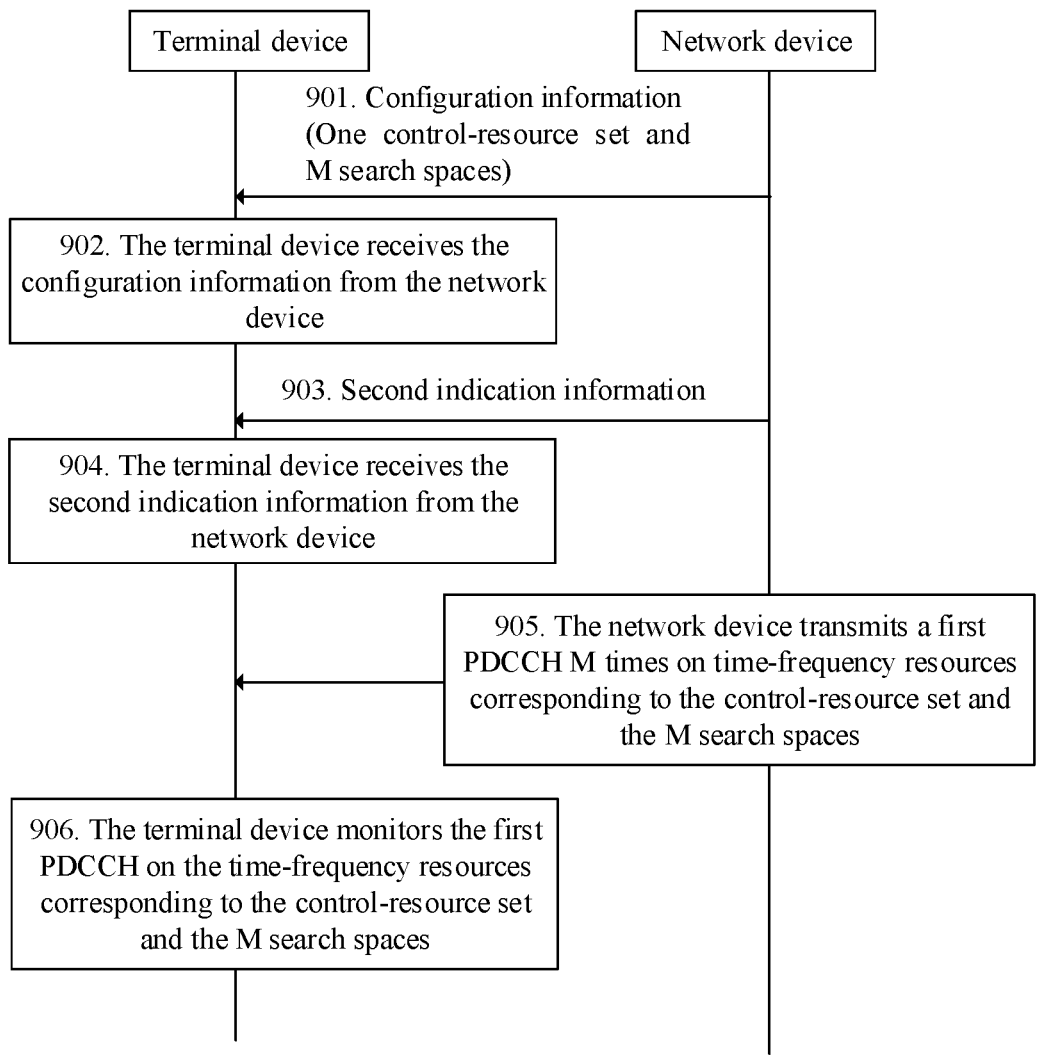
FIG. 9 is a schematic flowchart corresponding to a communication method according to Embodiment 3 of this application.

FIG. 9 is a schematic flowchart corresponding to a communication method according to Embodiment 3 of this application. As shown in FIG. 9, the method includes the following steps.

Step 901. A network device sends configuration information to a terminal device, where the configuration information is used to configure one control-resource set and M search spaces, and the control-resource set is associated with the M search spaces.

Herein, each search space in the M search spaces and the control-resource set associated with the search space are used to transmit a first PDCCH once. Therefore, the M search spaces and the control-resource set may be used to transmit the first PDCCH M times.

Correspondingly, in step 902, the terminal device receives the configuration information from the network device.

In this embodiment of this application, after receiving the configuration information from the network device, the terminal device may determine whether the control-resource set and the M search spaces are used to transmit the first PDCCH M times. For example, the terminal device may determine, in a plurality of implementations, that the control-resource set and the M search spaces are used to transmit the first PDCCH M times. The following describes two possible implementations that are respectively Implementation c1 and Implementation c2.

Implementation c1

If the terminal device determines, based on the configuration information, that the control-resource set meets a preset condition 5 and/or the M search spaces meet a preset condition 6, the terminal device may determine that the control-resource set and the M search spaces are used to transmit the first PDCCH M times.

That the control-resource set meets a preset condition 5 may include one or more of the following:

(1) The control-resource set is associated with a plurality of search spaces.

(2) The control-resource set has a plurality of activated TCI-states, or the control-resource set corresponds to a plurality of activated TCI-states.

(3) A quantity of activated TCI-states corresponding to the control-resource set is equal to a quantity of search spaces associated with the control-resource set.

It should be noted that, that the control-resource set meets a preset condition 5 may alternatively mean that the control-resource set meets a configuration constraint 5. The foregoing is described based on some possible cases in which the control-resource set meets the preset condition 5. In another possible example, another possible case may be further included. This is not specifically limited.

That the M search spaces meet a preset condition 6 include the following: One or more parameters of the M search spaces are the same. For example, that the M search spaces meet a preset condition 6 may include one or more of the following:

(1) Detection periods of the M search spaces are the same.
(2) Slot offsets of the M search spaces are the same.
(3) Second duration of the M search spaces is the same.
(4) Time-domain start locations of the M search spaces are the same.
(5) Quantities of times of blind detection of the M search spaces are the same.
(6) Types of the M search spaces are the same.

It should be noted that the foregoing is described based on some possible cases in which the M search spaces meet the preset condition 6. In another possible example, another possible case may be further included. This is not specifically limited.

Implementation c2

If the terminal device receives first indication information from the network device, and the first indication information is used to indicate that the control-resource set and the M search spaces are used to transmit the first PDCCH M times, the terminal device may determine that the control-resource set and the M search spaces are used to transmit the first PDCCH M times. For example, the terminal device may receive the first indication information from the network device in a plurality of manners. For example, the first indication information may be carried in RRC signaling, MAC CE signaling, or DCI signaling. The first indication information may also have a plurality of specific representation forms. For details, refer to the related descriptions of the first indication information in Embodiment 1. Details are not described herein again.

In this embodiment of this application, the control-resource set may meet a configuration constraint 5, and/or the M search spaces may meet a configuration constraint 6. In other words, if the control-resource set is used to repeatedly transmit the first PDCCH M times, the control-resource set needs to meet the configuration constraint 5. If the M search spaces are used to repeatedly transmit the first PDCCH M times, the M search spaces need to meet the configuration constraint 6.

That the control-resource set meets the configuration constraint 5 may include one or more of the following:
(1) The control-resource set is associated with a plurality of search spaces.
(2) The control-resource set has a plurality of activated TCI-states.
(3) A quantity of activated TCI-states corresponding to the control-resource set is equal to a quantity of search spaces associated with the control-resource set.

That the M search spaces meet the configuration constraint 6 may include the following: One or more parameters of the M search spaces are the same, and/or one or more parameters of the M search spaces are different. That the M search spaces meet the configuration constraint 6 may include one or more of the following:
(1) Detection periods of the M search spaces are the same.
(2) Slot offsets of the M search spaces are the same.
(3) Second duration of the M search spaces is the same.
(4) Time-domain start locations of the M search spaces are the same.
(5) Quantities of times of blind detection of the M search spaces are the same.
(6) Types of the M search spaces are the same.
(7) Time-domain start locations of the M search spaces are different.
(8) Slot offsets of the M search spaces are different.

Step 903. The network device sends second indication information to the terminal device, where the second indication information is used to activate one or more TCI-states corresponding to the control-resource set.

Correspondingly, in step 904, the terminal device receives the second indication information from the network device, and activates the one or more TCI-states.

In this embodiment of this application, if the second indication information is used to indicate to activate M TCI-states, the second indication information may include one or more of the following: identifiers of the M TCI-states; first information, where the first information is used to indicate a quantity of activated TCI-states; second information, where the second information is used to indicate that there are one or more activated TCI-states; and third information, where the third information is used to indicate that the M TCI-states are used to simultaneously transmit the first PDCCH or transmit the first PDCCH through time division. In an example, the second indication information may include the identifiers of the M TCI-states, and may further include one or more of the first information, the second information, and the third information. The second indication information may be carried in RRC signaling, MAC CE signaling, or DCI signaling.

For example, the network device may send a MAC CE to the terminal device, and the MAC CE includes the second indication information. In an example, the MAC CE may include a field 1, a field 2, and one or more fields 3. One field 3 is used to carry an identifier of one TCI-state. FIG. 10*a* is a schematic diagram of a format of a MAC CE. A field 1 may be referred to as an F field, and a field 2 may be referred to as an S/T field. It should be understood that specific names of the field 1 and the field 2 are not limited in this application.

The field 1 may be used to carry the first information or the second information. When the field 1 is used to carry the first information, a quantity of bits included in the field 1 is related to an upper limit N of a quantity of TCI-states that can be activated in one MAC CE. For example, if N=2, the field 1 may include 1 bit, and a value of the field 1 may be 0 or 1. If the value of the field 1 is 0, it indicates that one TCI-state is to be activated. If the value of the field 1 is 1, it indicates that two TCI-states are to be activated. Alternatively, if the value of the field 1 is 0, it indicates that two TCI-states are to be activated. If the value of the field 1 is 1, it indicates that one TCI-state is to be activated. When the field 1 is used to carry the second information, the field 1 may include 1 bit, and a value of the field 1 may be 0 or 1. If the value of the field 1 is 0, it indicates that a single TCI-state is to be activated. If the value of the field 1 is 1, it indicates that a plurality of TCI-states are to be activated. Alternatively, if the value of the field 1 is 0, it indicates that a plurality of TCI-states are to be activated. If the value of the field 1 is 1, it indicates that a single TCI-state is to be activated.

The field 2 may be used to carry the third information. If the third information is used to indicate that the M TCI-states are used to simultaneously transmit the first PDCCH, the network device may send simultaneously the PDCCH by using the M TCI-states, and the terminal device simultaneously receives the first PDCCH based on the M TCI-states. If the third information is used to indicate that the M TCI-states are used to transmit the first PDCCH through time division, the network device may separately send the first PDCCH at different time points by using the M TCI-states. Each time a single TCI-state is used, or each time some TCI-states are used, for example, half of the TCI-states are used. Accordingly, the terminal device may receive the first PDCCH at different time points by using a single TCI-state or some TCI-states each time.

For example, the M TCI-states may be further associated with each search space in the M search spaces. In other words, the network device may simultaneously transmit the first PDCCH by using the M TCI-states, each time of transmission corresponds to one search space, and a total of M times of transmission are performed.

It should be noted that: (1) In this embodiment of this application, an association relationship between the M search spaces and the M activated TCI-states corresponding to the control-resource set may be further determined based on the third information. For example, if the third information is used to indicate that the M TCI-states are used to simultaneously transmit the first PDCCH, it indicates that the M TCI-states are one-to-one associated with the M search spaces. If the third information is used to indicate that the M TCI-states are used to transmit the first PDCCH through time division, it indicates that each search space in the M search spaces is associated with the M TCI-states.

(2) The network device may send the third information explicitly. For example, the third information is carried in the field 2 described above and sent to the terminal device. Alternatively, the network may send the third information implicitly. For example, the MAC CE does not include the field 2. Instead, whether the time-domain start locations of the M search spaces associated with the control-resource set are the same is used to implicitly indicate that the M TCI-states are used to transmit the first PDCCH simultaneously or through time division. For example, if the time-domain start locations of the M search spaces associated with the control-resource set are the same, it indicates that the M activated TCI-states corresponding to the control-resource set are used to simultaneously transmit the first PDCCH (or the M TCI-states are used to simultaneously transmit the first PDCCH). If the time-domain start locations of the M search spaces associated with the control-resource set are different, it indicates that the M activated TCI-states corresponding to the control-resource set are used to transmit the first PDCCH through time division.

For example, there may be a plurality of possible manners in which the M TCI-states are associated with the M search spaces. The following describes several possible association manners by using an example in which the M TCI-states are one-to-one associated with the M search spaces.

Association Manner 1

The M TCI-states may be associated with the M search spaces based on indexes of the M TCI-states and indexes of the M search spaces. For example, the M TCI-states may be one-to-one associated with the M search spaces in ascending or descending order of the indexes of the M TCI-states and in ascending order of the indexes of the M search spaces. For example, a TCI-state with a smallest index is associated with a search space with a smallest index, and a TCI-state with a largest index is associated with a search space with a largest index.

Association Manner 2

The M TCI-states may be associated with the M search spaces based on a sequence of activating the M TCI-states and indexes of the M search spaces. For example, the M TCI-states may be one-to-one associated with the M search spaces based on the activation sequence and in ascending or descending order of the indexes. For example, a TCI-state that ranks first in the activation sequence is associated with a search space with a smallest index, and a TCI-state that ranks last in the activation sequence is associated with a search space with a largest index.

The sequence of activating the M TCI-states may be obtained based on a sequence of arranging the M TCI-states in the MAC CE. If a TCI-state ranks top in the MAC CE, the TCI-state ranks top in the activation sequence. As shown in FIG. 10b, if M=2 and a TCI-state 1 is arranged before a TCI-state 2 in the MAC CE, TCI-state 1 is activated earlier than the TCI-state 2.

Association Manner 3

The M TCI-states may be associated with the M search spaces based on indexes of the M TCI-states and a sequence of configuring the M search spaces. For example, the M TCI-states are one-to-one associated with the M search spaces in ascending or descending order of the indexes and based on the configuration sequence. For example, a TCI-state with a smallest index is associated with a search space that ranks first in the configuration sequence, and a TCI-state with a largest index is associated with a search space that ranks last in the configuration sequence.

Association Manner 4

The M TCI-states may be associated with the M search spaces based on a sequence of activating the M TCI-states and a sequence of configuring the M search spaces. For example, the M TCI-states are one-to-one associated with the M search spaces based on the activation sequence and the configuration sequence. For example, a TCI-state that ranks first in the activation sequence is associated with a search space that ranks first in the configuration sequence, and a TCI-state that ranks last in the activation sequence is associated with a search space that ranks last in the configuration sequence.

A specific combined decoding method for use may be indicated by the network device to the terminal device by using RRC, MAC CE, or DCI signaling, or reported by the terminal device to the network device.

It should be noted that the foregoing describes only four examples in which the M TCI-states are associated with the M search spaces. In another possible embodiment, there may be another manner in which the M TCI-states are associated with the M first search spaces. For example, each TCI-state is associated with the M search spaces, or each search space is associated with the M TCI-states.

Step 905. The network device transmits the first PDCCH M times on time-frequency resources corresponding to the control-resource set and the M search spaces.

For example, the network device may transmit, based on the M TCI-states corresponding to the control-resource set, the first PDCCH M times on the time-frequency resources corresponding to the control-resource set and the M search spaces. For example, the M search spaces include a search space 1 and a search space 2, the M activated TCI-states corresponding to the control-resource set include a TCI-state 1 and a TCI-state 2, the search space 1 is associated with the TCI-state 1, and the search space 2 is associated with the TCI-state 2. The network device may transmit, based on the TCI-state 1, the first PDCCH once on a time-frequency resource corresponding to the control-resource set and the search space 1, and transmit, based on the TCI-state 2, the first PDCCH once on a time-frequency resource corresponding to the control-resource set and the search space 2.

Figure 6E:
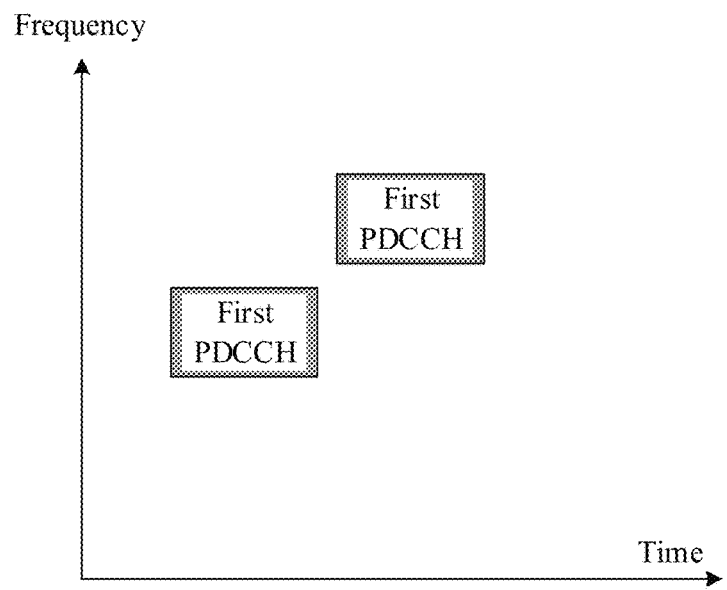
FIG. 6e is another schematic diagram of repeatedly transmitting a first PDCCH according to an embodiment of this application.

A frequency domain resource corresponding to the control-resource set may include M frequency domain resource parts. The M frequency domain resource parts may be one-to-one associated with the M search spaces (each frequency domain resource part in the M frequency domain resource parts and a search space associated with the frequency domain resource part correspond to one group of time-frequency resources, and are used to transmit the first PDCCH once; and the M frequency domain resource parts and the M search spaces correspond to M groups of time-frequency resources, and are used to transmit the first PDCCH M times), or the M frequency domain resource parts may be one-to-one associated with the M activated TCI-states, or each frequency domain resource part in the M frequency domain resource parts corresponds to one time of transmission of the first PDCCH, or the M frequency domain resource parts respectively correspond to M DMRS ports. The frequency domain resource corresponding to the control-resource set is divided into the M frequency domain resource parts, so that M first PDCCHs can be separately sent at M different frequency domain resource locations. An example in which the M frequency domain resource parts may be one-to-one associated with the M search spaces and the M search spaces are one-to-one associated with the M TCI-states is used. In this case, referring to FIG. 6c, if the M groups of time-frequency resources have a same time domain resource but different frequency domain resources, the network device may transmit the first PDCCH M times on a same time domain resource but different frequency domain resources based on the M TCI-states. Referring to FIG. 6e, if the M groups of time-frequency resources have different time domain resources and different frequency domain resources, the network device may transmit the first PDCCH M times on different time domain resources and different frequency domain resources based on the M TCI-states.

In this embodiment of this application, there may be a plurality of manners of dividing the frequency domain resource corresponding to the control-resource set into the M frequency domain resource parts. The following describes several possible division manners.

Division Manner 1

The frequency domain resource corresponding to the control-resource set is indicated by using a parameter frequencyDomainResources of the control-resource set, frequencyDomainResources is a bitmap, and each bit represents a consecutive segment of frequency domain resource (for example, six consecutive RBs). Therefore, bits in the parameter frequencyDomainResources may be equally divided into M parts, and each part corresponds to one frequency domain resource part. If the bits cannot be equally divided, the bits are equally divided as much as possible, so that a difference between quantities of bits in parts does not exceed one (or is less than or equal to one). For example, when M=2, the bits in the parameter frequencyDomainResources are equally divided into two parts (namely, the first half and the second half). If the bits cannot be equally divided, the first half may include one more bit than the second half, or the second half may include one more bit than the first half. For example, if the parameter frequencyDomainResources is a 45-bit bitmap, the first 23 bits may be used as the first half, and the last 22 bits may be used as the second half. Alternatively, the bits in the parameter frequencyDomainResources are divided based on parity of the bits, that is, all odd-numbered bits are used as a part, and all even-numbered bits are used as another part.

Division Manner 2

Bits whose values are 1 in a parameter frequencyDomainResources of the control-resource set are equally divided into M parts. If the bits cannot be equally divided, the bits are equally divided as much as possible, so that a difference between quantities of bits in parts does not exceed one (or is less than or equal to one). For example, when M=2, the bits whose values are 1 in the parameter frequencyDomainResources are equally divided into two parts (namely, the first half and the second half). If the bits cannot be equally divided, the first half may include one more bit than the second half, or the second half may include one more bit than the first half. For example, if the parameter frequencyDomainResources includes 21 bits whose values are 1, the first 11 bits may be used as the first half, and the last 10 bits may be used as the second half. Alternatively, all the bits whose values are 1 in the parameter frequencyDomainResources are divided based on parity of the bits, that is, all odd-numbered bits are used as a part, and all even-numbered bits are used as another part.

Division Manner 3

RBs (or CCEs, or RBGs, or precoding resource block groups (PRG)) indicated by a parameter frequencyDomainResources of the control-resource set are equally divided into M parts. If the RBs cannot be equally divided, the RBs are equally divided as much as possible, so that a difference between quantities of RBs (or CCEs, or RBGs, or PRGs) in parts does not exceed one (or is less than or equal to one). For example, when M=2, the RBs (or CCEs, or RBGs, or PRGs) indicated by the parameter frequencyDomainResources are equally divided into two parts (namely, the first half and the second half). If the RBs cannot be equally divided, the first half may include one more RB (or CCE, or RBG, or PRG) than the second half, or the second half may include one more RB (or CCE, or RBG, or PRG) than the first half. Alternatively, the RBs (or CCEs, or RBGs, or PRGs) indicated by the parameter frequencyDomainResources are divided based on parity of locations of the RBs. For example, all the RBs (or CCEs, or RBGs, or PRGs) are sorted, RBs (or CCEs, or RBGs, or PRGs) at all odd-numbered locations are used as a part, and RBs (or CCEs, or RBGs, or PRGs) at all even-numbered locations are used as another part.

It should be noted that the foregoing describes four examples in which the frequency domain resource corresponding to the control-resource set is divided into the M frequency domain resource parts. In another possible embodiment, there may be another division manner. This is not specifically limited.

Step 906. The terminal device monitors the first PDCCH on the time-frequency resources corresponding to the control-resource set and the M search spaces.

For example, the terminal device may receive, based on the M TCI-states (the M TCI-states are one-to-one associated with the M search spaces), the first PDCCH on the time-frequency resources corresponding to the control-resource set and the M search spaces. If the frequency domain resource corresponding to the control-resource set includes M frequency domain resource parts, and the M frequency domain resource parts are one-to-one associated with the M search spaces, the terminal device may separately receive, based on the M TCI-states, M signals from time-frequency resources corresponding to the M frequency domain resource parts and the M search spaces, and perform separate decoding or combined decoding on the M signals. For descriptions of separate decoding or combined decoding, refer to Embodiment 1. Details are not described herein again.

In the foregoing method, the network device may configure the control-resource set and the M search spaces for the terminal device, and further transmits the first PDCCH M times on the time-frequency resources corresponding to the control-resource set and the M search spaces, so that transmission reliability of the first PDCCH can be effectively improved. In addition, after receiving the configuration information from the network device, the terminal device may learn that the control-resource set and the M search spaces are used to transmit the first PDCCH M times. If processing is performed through separate decoding, after the decoding succeeds, blind detection may be stopped, to prevent resource consumption of the terminal device from being large because blind detection is performed on all possibilities. If processing is performed through combined decoding, a quantity of times of blind detection may be effectively reduced, to help save processing resources of the terminal device.

Embodiment 4

In Embodiment 4, a possible implementation of the communication method is described based on the foregoing Solution 4.

Figure 11:
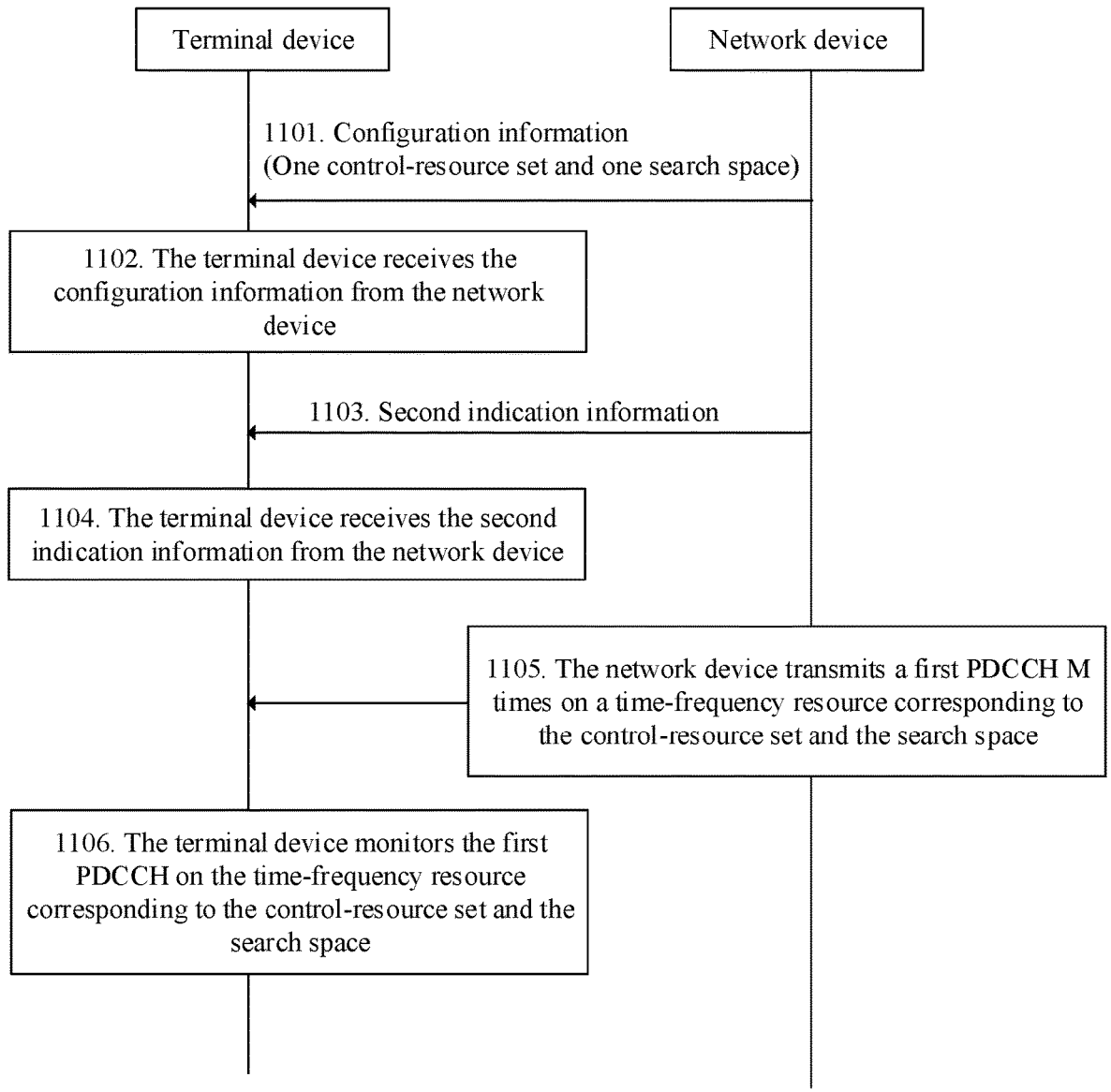
FIG. 11 is a schematic flowchart corresponding to a communication method according to Embodiment 4 of this application.

FIG. 11 is a schematic flowchart corresponding to a communication method according to Embodiment 4 of this application. As shown in FIG. 11, the method includes the following steps.

Step 1101. A network device sends configuration information to a terminal device, where the configuration information is used to configure one control-resource set and one search space, and the control-resource set is associated with the search space.

Correspondingly, in step 1102, the terminal device receives the configuration information from the network device.

In this embodiment of this application, after receiving the configuration information from the network device, the terminal device may determine whether the control-resource set and the search space are used to transmit a first PDCCH M times. For example, the terminal device may determine, in a plurality of implementations, that the control-resource set and the search space are used to transmit the first PDCCH M times. The following describes two possible implementations that are respectively Implementation d1 and Implementation d2.

Implementation d1

If the terminal device determines, based on the configuration information, that the control-resource set meets a preset condition 7 and/or the search space meets a preset condition 8, the terminal device may determine that the control-resource set and the search space are used to transmit the first PDCCH M times.

That the control-resource set meets a preset condition 7 may include one or more of the following:
(1) The control-resource set corresponds to a plurality of activated TCI-states.
(2) The control-resource set corresponds to a plurality of activated TCI-states, and a quantity of activated TCI-states corresponding to the control-resource set is equal to a quantity of MOs included in the search space associated with the control-resource set.

It should be noted that the foregoing is described based on some possible cases in which the control-resource set meets the preset condition 7. In another possible example, another possible case may be further included. This is not specifically limited.

That the search space meets a preset condition 8 includes one or more of the following:
(1) The search space includes a plurality of MOs.
(2) The search space includes a plurality of MOs, and the quantity of MOs included in the search space is equal to the quantity of activated TCI-states corresponding to the control-resource set associated with the search space.

It should be noted that the foregoing is described based on some possible cases in which the search space meets the preset condition 8. In another possible example, another possible case may be further included. This is not specifically limited.

Implementation d2

If the terminal device receives first indication information from the network device, and the first indication information is used to indicate that the control-resource set and the search space are used to transmit the first PDCCH M times, the terminal device may determine that the control-resource set and the search space are used to transmit the first PDCCH M times. For example, the terminal device may receive the first indication information from the network device in a plurality of manners. For example, the first indication information may be carried in RRC signaling, MAC CE signaling, or DCI signaling. The first indication information may also have a plurality of specific representation forms. For details, refer to the related descriptions of the first indication information in Embodiment 1. Details are not described herein again.

In this embodiment of this application, the control-resource set may meet a configuration constraint 7, and/or the search space may meet a configuration constraint 8. In other words, if the control-resource set is used to repeatedly transmit the first PDCCH M times, the control-resource set needs to meet the configuration constraint 7. If the search space is used to repeatedly transmit the first PDCCH M times, the search space needs to meet the configuration constraint 8.

That the control-resource set meets a configuration constraint 7 may include the following: The control-resource set corresponds to a plurality of activated TCI-states, or the control-resource set corresponds to a plurality of activated TCI-states, and a quantity of activated TCI-states corresponding to the control-resource set is equal to a quantity of MOs included in the search space associated with the control-resource set. That the search space meets a configuration constraint 8 may include the following: The search space includes a plurality of MOs, or the search space includes a plurality of MOs, and the quantity of MOs included in the search space is equal to the quantity of activated TCI-states corresponding to the control-resource set associated with the search space.

Step 1103. The network device sends second indication information to the terminal device, where the second indication information is used to indicate to activate one or more TCI-states corresponding to the control-resource set.

Correspondingly, in step 1104, the terminal device receives the second indication information from the network device, and activates the one or more TCI-states corresponding to the control-resource set.

Step 1105. The network device transmits the first PDCCH M times on a time-frequency resource corresponding to the control-resource set and the search space.

In this embodiment of this application, the control-resource set may correspond to one or M activated TCI-states. An example in which the control-resource set corresponds to M activated TCI-states is used. The network device may transmit, based on the M TCI-states, the first PDCCH M times on the time-frequency resource corresponding to the control-resource set and the search space. For example, referring to FIG. 6a, if the search space includes one MO, the network device may transmit, based on the M TCI-states, the first PDCCH M times on a time-frequency resource corresponding to the control-resource set and the MO. For another example, referring to FIG. 6c, a frequency domain resource corresponding to the control-resource set may include M frequency domain resource parts (the M frequency domain resource parts are one-to-one associated with the M TCI-states). The M frequency domain resource parts each are associated with the search space. Each frequency domain resource part in the M frequency domain resource parts and the search space associated with the frequency domain resource part are used to transmit the first PDCCH once (in other words, each frequency domain resource part in the M frequency domain resource parts and the search space associated with the frequency domain resource part correspond to one group of time-frequency resources, and are used to transmit the first PDCCH once; and the M frequency domain resource parts and the search space correspond to M groups of time-frequency resources, where the M groups of time-frequency resources have a same time domain resource but different frequency domain resources). Therefore, the network device may transmit the first PDCCH M times on a same time domain resource but different frequency domain resources based on the M TCI-states. For another example, referring to FIG. 6d, the search space may include M MOs (the M MOs are one-to-one associated with the M TCI-states). The M MOs each are associated with the control-resource set. Each MO in the M MOs and the control-resource set associated with the MO are used to transmit the first PDCCH once (in other words, each MO in the M MOs and the control-resource set associated with the MO correspond to one group of time-frequency resources, and are used to transmit the first PDCCH once; and the M MOs and the control-resource set correspond to M groups of time-frequency resources, where the M groups of time-frequency resources have a same frequency domain resource but different time domain resources). Therefore, the network device may transmit the first PDCCH M times on a same frequency domain resource but different time domain resources based on the M TCI-states. For another example, referring to FIG. 6e, a frequency domain resource corresponding to the control-resource set may include M frequency domain resource parts. The search space may include M MOs (the M MOs are one-to-one associated with the M TCI-states, and/or the M frequency domain resource parts are one-to-one associated with the M TCI-states). The M frequency domain resource parts are one-to-one associated with the M MOs. Each frequency domain resource part in the M frequency domain resource parts and an MO associated with the frequency domain resource part are used to transmit the first PDCCH once, or each MO in the M MOs and a frequency domain resource part associated with the MO are used to transmit the first PDCCH once (in other words, the M frequency domain resource parts and the M MOs correspond to M groups of time-frequency resources, where the M groups of time-frequency resources have different frequency domain resources and different time domain resources). Therefore, the network device may transmit the first PDCCH M times on different frequency domain resources and different time domain resources based on the M TCI-states.

The M MOs described above may be one-to-one associated with the M TCI-states in a plurality of manners. In a possible manner, the M MOs are one-to-one associated with the M TCI-states based on indexes of the M TCI-states and a time sequence of the M MOs. For example, the M TCI-states are one-to-one associated with the M MOs in ascending or descending order of the indexes and based on the time sequence. For example, a TCI-state with a smallest index is associated with an earliest MO, and a TCI-state with a largest index is associated with a latest MO.

In another possible manner, the M MOs are one-to-one associated with M TCI-states based on a sequence of activating the M TCI-states and a time sequence of the M MOs. For example, the M TCI-states are one-to-one associated with the M MOs based on the activation sequence and the time sequence. For example, a TCI-state that ranks first in the activation sequence is associated with an earliest MO, and a TCI-state that ranks last in the activation sequence corresponds to a latest MO.

It should be noted that, an example in which the control-resource set corresponds to M activated TCI-states is used above. When the control-resource set corresponds to one activated TCI-state, reference may be made to the foregoing descriptions for processing. For example, referring to FIG. 6a, if the control-resource set corresponds to one activated TCI-state, and the search space includes one MO, the network device may transmit, based on the TCI-state, the first PDCCH M times on a time-frequency resource corresponding to the control-resource set and the MO. For another example, referring to FIG. 6d, if the control-resource set corresponds to one activated TCI-state, and the search space includes M MOs, the network device may transmit, based on the TCI-state, the first PDCCH M times on a time-frequency resource corresponding to the control-resource set and the M MOs.

Step 1106. The terminal device monitors the first PDCCH on the time-frequency resource corresponding to the control-resource set and the search space.

For example, the control-resource set corresponds to M activated TCI-states. The terminal device may receive, based on the M TCI-states, the first PDCCH on the time-frequency resource corresponding to the control-resource set and the search space. For example, if the search space includes one MO (in this case, the network device transmits the first PDCCH in the manner shown in FIG. 6a), a signal received by the terminal device on a time-frequency resource corresponding to the control-resource set and the MO is a signal obtained after M first PDCCH signals are combined. Therefore, the terminal device may decode the signal obtained through combination. This may be understood as combined decoding. For another example, if the frequency domain resource corresponding to the control-resource set may include M frequency domain resource parts (in this case, the network device transmits the first PDCCH in the manner shown in FIG. 6c), the terminal device may receive, based on the M TCI-states, M signals on a time-frequency resource corresponding to the M frequency domain resource parts and the search space, and perform separate decoding or combined decoding on the M signals. For another example, if the search space may include M MOs (in this case, the network device may transmit the first PDCCH in the manner shown in FIG. 6d), the terminal device may receive, based on the M TCI-states, M signals on a time-frequency resource corresponding to the control-resource set and the M MOs, and perform separate decoding or combined decoding on the M signals. For another example, if the frequency domain resource corresponding to the control-resource set may include M frequency domain resource parts, and the search space may include M MOs (in this case, the network device may transmit the first PDCCH in the manner shown in FIG. 6e), the terminal device may receive, based on the M TCI-states, M signals on a time-frequency resource corresponding to the M frequency domain resource parts and the M MOs, and perform separate decoding or combined decoding on the M signals. For descriptions of separate decoding or combined decoding, refer to Embodiment 1. Details are not described herein again.

In the foregoing method, the network device may configure the control-resource set and the search space for the terminal device, and further transmits the first PDCCH M times on the time-frequency resource corresponding to the control-resource set and the search space, so that transmission reliability of the first PDCCH can be effectively improved. In addition, after receiving the configuration information from the network device, the terminal device may learn that the control-resource set and the search space are used to transmit the first PDCCH M times. If processing is performed through separate decoding, after the decoding succeeds, blind detection may be stopped, to prevent resource consumption of the terminal device from being large because blind detection is performed on all possibilities. If processing is performed through combined decoding, a quantity of times of blind detection may be effectively reduced, to help save processing resources of the terminal device.

For Embodiment 1 to Embodiment 4, it should be noted that:

(1) For the methods in the foregoing embodiments, a parameter in the method may be determined by using the following method.

The terminal device may report, by using a terminal capability report process, whether the terminal device supports the foregoing separate decoding, and/or whether the terminal device supports the foregoing combined decoding, and/or a decoding manner supported by the terminal device.

The terminal device may further report, by using the terminal capability report process, whether the terminal device supports PDCCH repeated transmission, for example, may report whether the terminal device supports PDCCH space-domain repeated transmission, and/or whether the terminal device supports PDCCH frequency-domain repeated transmission, and/or whether the terminal device supports PDCCH time-domain repeated transmission, and/or whether the terminal device supports the first repeated transmission mode.

The terminal device may further report, by using the terminal capability report process, a supported quantity, namely, a value of M in the foregoing embodiments, of times the PDCCH is repeatedly transmitted. A value range of M may be {1, 2, 3, 4}, or {1, 2, 4}, or {1, 2, 4, 8}, or {2, 4}, or {2, 3, 4}, or {2, 4, 8}, or {1, 2, 3, 4, 8}. If 1 is reported, it indicates that the terminal device does not support PDCCH repeated transmission. Alternatively, the protocol may specify a quantity, namely, a value of M in the foregoing embodiments, of times the PDCCH is repeatedly transmitted. For example, the protocol may specify that the value of M is one of {1, 2, 3, 4, 8}. Alternatively, the network device may indicate a value of M by using RRC signaling, MAC CE, or DCI signaling. In this case, a value range of M may be {1, 2, 3, 4}, or {1, 2, 4}, or {1, 2, 4, 8}, or {2, 4}, or {2, 3, 4}, or {2, 4, 8}, or {1, 2, 3, 4, 8}. If the network device indicates that the value is 1, it indicates that the network device does not repeatedly transmit the PDCCH.

The terminal device may further report a maximum quantity of search spaces associated with a control-resource set, or a maximum quantity of control-resource sets associated with a search space, or a maximum quantity of MOs that may be included in a search space, or a maximum quantity of frequency domain resource parts into which a control-resource set may be divided, or a maximum quantity of TCI-states that may be activated and that are of a control-resource set. For any one of the foregoing maximum quantities, S is used to represent the maximum quantity, and a value of S may be 2 or 4. Alternatively, the protocol specifies a maximum quantity of search spaces associated with a control-resource set, or a maximum quantity of control-resource sets associated with a search space, or a maximum quantity of MOs that may be included in a search space, or a maximum quantity of frequency domain resource parts into which a control-resource set may be divided, or a maximum quantity of TCI-states that may be activated and that are of a control-resource set. For any one of the foregoing maximum quantities, S is used to represent the maximum quantity, and a value of S may be 2 or 4.

For the methods corresponding to the foregoing embodiments, the network device may indicate, by using RRC, MAC CE, or DCI information, a method corresponding to a specific embodiment for use. Alternatively, the terminal device may report a method that corresponds to a specific embodiment and that is supported by the terminal device.

(2) The foregoing step numbers in FIG. 5, FIG. 8, FIG. 9, and FIG. 11 are an example for executing a process, and do not constitute a limitation on an execution sequence of steps. In embodiments of this application, there is no strict execution sequence between steps that have no time sequence dependency.

(3) The foregoing Embodiment 1 to Embodiment 4 focus on descriptions of a difference between different embodiments. For example, the difference between different embodiments includes the following: In Embodiment 1, M control-resource sets and M search spaces are used to repeatedly transmit the first PDCCH M times. In Embodiment 2, M control-resource sets and one search space are used to repeatedly transmit the first PDCCH M times. In Embodiment 3, one control-resource set and M search spaces are used to repeatedly transmit the first PDCCH M times. In Embodiment 4, one control-resource set and one search space are used to repeatedly transmit the first PDCCH M times. For content other than the foregoing difference, refer to Embodiment 1 to Embodiment 4 mutually.

The foregoing mainly describes the solutions provided in embodiments of this application from a perspective of interaction between the network device and the terminal device. It may be understood that, to implement the foregoing functions, the network device or the terminal device may include a corresponding hardware structure and/or a software module for performing each function. A person skilled in the art should be easily aware that, in combination with units and algorithm steps of the examples described in embodiments disclosed in this specification, embodiments of this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional units of the terminal device and the network device may be obtained through division based on the foregoing method example. For example, each functional unit may be obtained through division based on each corresponding function, or two or more functions may be integrated into one unit. The integrated unit may be implemented in a form of hardware, or may be implemented in a form of a software function unit.

Figure 12:
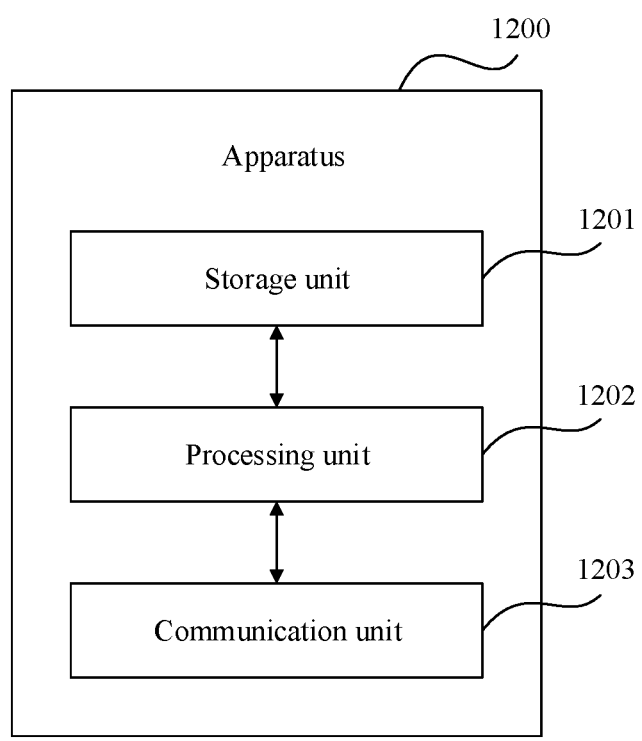
FIG. 12 is a possible example block diagram of an apparatus according to an embodiment of this application.

When an integrated unit is used, FIG. 12 is a possible example block diagram of an apparatus according to an embodiment of this application. As shown in FIG. 12, an apparatus 1200 may include a processing unit 1202 and a communication unit 1203. The processing unit 1202 is configured to control and manage an action of the apparatus 1200. The communications unit 1203 is configured to support the apparatus 1200 in communicating with another device. Optionally, the communication unit 1203 is also referred to as a transceiver unit, and may include a receiving unit and/or a sending unit, which are respectively configured to perform a receiving operation and a sending operation.

The apparatus 1200 may further include a storage unit 1201, configured to store program code and/or data of the apparatus 1200.

The apparatus 1200 may be the terminal device in any one of the foregoing embodiments, or may be a chip disposed in the terminal device. The processing unit 1202 may support the apparatus 1200 in performing actions of the terminal device in the foregoing method examples. Alternatively, the processing unit 1202 mainly performs internal actions of the terminal device in the method examples, and the communication unit 1203 may support communication between the apparatus 1200 and a network device. For example, the communication unit 1203 may be configured to perform step 502, step 504, and step 506 in FIG. 5, step 802, step 804, and step 806 in FIG. 8, step 902, step 904, and step 906 in FIG. 9, and step 1102, step 1104, and step 1106 in FIG. 11.

Specifically, in an embodiment, the communication unit 1203 is configured to: receive configuration information from the network device, where the configuration information is used to configure one control-resource set and M search spaces, the control-resource set is associated with the M search spaces, and each search space in the M search spaces and the control-resource set associated with the search space are used to transmit a first PDCCH once; and monitor the first PDCCH on time-frequency resources corresponding to the control-resource set and the M search spaces, where M is an integer greater than 1.

In a possible design, the control-resource set meets a first preset condition, and/or the M search spaces meet a second preset condition.

In a possible design, that the control-resource set meets a first preset condition includes one or more of the following:
the control-resource set is associated with a plurality of search spaces;
the control-resource set corresponds to a plurality of activated TCI-states; and
a quantity of activated TCI-states corresponding to the control-resource set is equal to a quantity of search spaces associated with the control-resource set; and
that the M search spaces meet a second preset condition includes one or more of the following:
periods of the M search spaces are the same;
duration of the M search spaces is the same; and
time-domain start locations corresponding to the M search spaces are the same.

In a possible design, the communication unit 1203 is further configured to receive first indication information from the network device, where the first indication information is used to indicate that the control-resource set and the M search spaces are used to transmit the first PDCCH M times.

In a possible design, a frequency domain resource corresponding to the control-resource set includes M frequency domain resource parts, and the M frequency domain resource parts are one-to-one associated with the M search spaces; and that each search space in the M search spaces and the control-resource set associated with the search space are used to transmit a first PDCCH once includes: each search space in the M search spaces and a frequency domain resource part associated with the search space are used to transmit the first PDCCH once.

In a possible design, the control-resource set corresponds to M activated TCI-states; and the communication unit 1203 is specifically configured to receive, based on the M activated TCI-states, the first PDCCH on the time-frequency resources corresponding to the control-resource set and the M search spaces.

In a possible design, the M activated TCI-states are one-to-one associated with the M search spaces.

In a possible design, if the control-resource set corresponds to M activated TCI-states, the communication unit 1203 is further configured to receive second indication information from the network device, where the second indication information is used to indicate to activate the M TCI-states corresponding to the control-resource set.

In a possible design, the second indication information includes one or more of the following:
identifiers of the M TCI-states;
first information, where the first information is used to indicate a quantity of activated TCI-states;
second information, where the second information is used to indicate that there are a plurality of activated TCI-states; and
third information, where the third information is used to indicate that the M TCI-states are used to simultaneously transmit the first PDCCH or transmit the first PDCCH through time division.

In a possible design, the time-frequency resources corresponding to the control-resource set and the M search spaces include M groups of time-frequency resources, and each search space in the M search spaces and the control-resource set associated with the search space correspond to one group of time-frequency resources in the M groups of time-frequency resources; and the M groups of time-frequency resources are totally the same; or the M groups of time-frequency resources have a same time domain resource but different frequency domain resources; or the M groups of time-frequency resources have a same frequency domain resource but different time domain resources; or the M groups of time-frequency resources have different frequency domain resources and different time domain resources.

In another embodiment, the communication unit 1203 is configured to: receive configuration information from the network device, where the configuration information is used to configure M control-resource sets and M search spaces, the M control-resource sets are one-to-one associated with the M search spaces, and each control-resource set in the M control-resource sets and a search space associated with the control-resource set are used to transmit a first PDCCH once; and monitor the first PDCCH on time-frequency resources corresponding to the M control-resource sets and the M search spaces, where M is an integer greater than 1.

In a possible design, the M control-resource sets meet a first preset condition, and/or the M search spaces meet a second preset condition.

In a possible design, that the M control-resource sets meet a first preset condition includes: frequency domain resources corresponding to the M control-resource sets are the same, and/or DMRS scrambling identifiers of the M control-resource sets are the same; and
that the M search spaces meet a second preset condition includes one or more of the following:
detection periods of the M search spaces are the same;
duration of the M search spaces is the same; and
time-domain start locations of the M search spaces are the same.

In a possible design, the communication unit 1203 is further configured to receive first indication information from the network device, where the first indication information is used to indicate that the M control-resource sets and the M search spaces are used to transmit the first PDCCH M times.

In a possible design, each control-resource set in the M control-resource sets corresponds to one activated TCI-state;

and the communication unit 1203 is specifically configured to receive, based on the M activated TCI-states, the first PDCCH on the time-frequency resources corresponding to the M control-resource sets and the M search spaces.

In a possible design, the time-frequency resources corresponding to the M control-resource sets and the M search spaces include M groups of time-frequency resources, and each control-resource set in the M control-resource sets and the search space associated with the control-resource set correspond to one group of time-frequency resources in the M groups of time-frequency resources; and the M groups of time-frequency resources are totally the same; or the M groups of time-frequency resources have a same time domain resource but different frequency domain resources; or the M groups of time-frequency resources have a same frequency domain resource but different time domain resources; or the M groups of time-frequency resources have different frequency domain resources and different time domain resources.

In another embodiment, the communication unit 1203 is configured to: receive configuration information from the network device, where the configuration information is used to configure M control-resource sets and one search space, the M control-resource sets each are associated with the search space, and each control-resource set in the M control-resource sets and the search space associated with the control-resource set are used to transmit a first PDCCH once; and monitor the first PDCCH on time-frequency resources corresponding to the M control-resource sets and the search space, where M is an integer greater than 1.

In a possible design, the M control-resource sets meet a first preset condition, and/or the search space meets a second preset condition.

In a possible design, that the M control-resource sets meet a first preset condition includes one or more of the following:
  search spaces associated with the M control-resource sets are the same;
  frequency domain resources corresponding to the M control-resource sets are the same; and
  DMRS scrambling identifiers of the M control-resource sets are the same; and
that the search space meets a second preset condition includes one or more of the following:
  the search space is associated with a plurality of control-resource sets;
  the search space includes a plurality of MOs; and
  a quantity of MOs included in the search space is equal to a quantity of control-resource sets associated with the search space.

In a possible design, the communication unit 1203 is further configured to receive first indication information from the network device, where the first indication information is used to indicate that the M control-resource sets and the search space are used to transmit the first PDCCH M times.

In a possible design, the search space includes M MOs, and the M MOs are one-to-one associated with the M control-resource sets; and that each control-resource set in the M control-resource sets and the search space associated with the control-resource set are used to transmit a first PDCCH once includes: each control-resource set in the M control-resource sets and an MO associated with the control-resource set are used to transmit the first PDCCH once.

In a possible design, each control-resource set in the M control-resource sets corresponds to one activated TCI-state; and the communication unit 1203 is specifically configured to receive, based on the M activated TCI-states, the first PDCCH on the time-frequency resources corresponding to the M control-resource sets and the search space.

In a possible design, the time-frequency resources corresponding to the M control-resource sets and the search space include M groups of time-frequency resources, and each control-resource set in the M control-resource sets and the search space associated with the control-resource set correspond to one group of time-frequency resources in the M groups of time-frequency resources; and the M groups of time-frequency resources are totally the same; or the M groups of time-frequency resources have a same time domain resource but different frequency domain resources; or the M groups of time-frequency resources have a same frequency domain resource but different time domain resources; or the M groups of time-frequency resources have different frequency domain resources and different time domain resources.

In another embodiment, the communication unit 1203 is configured to: receive configuration information from the network device, where the configuration information is used to configure one control-resource set and one search space, the control-resource set is associated with the search space, and the control-resource set and the search space are used to transmit a first PDCCH M times; and monitor the first PDCCH on a time-frequency resource corresponding to the control-resource set and the search space.

In a possible design, the control-resource set meets a first preset condition, and/or the search space meets a second preset condition.

In a possible design, that the control-resource set meets a first preset condition includes: the control-resource set corresponds to a plurality of activated TCI-states, or the control-resource set corresponds to a plurality of activated TCI-states, and a quantity of activated TCI-states corresponding to the control-resource set is equal to a quantity of MOs included in the search space; and that the search space meets a second preset condition includes: the search space includes a plurality of MOs, or the quantity of MOs included in the search space is equal to the quantity of activated TCI-states corresponding to the control-resource set.

In a possible design, the communication unit 1203 is further configured to receive first indication information from the network device, where the first indication information is used to indicate that the control-resource set and the search space are used to transmit the first PDCCH M times.

In a possible design, the search space includes M MOs, and the M MOs each are associated with the control-resource set; and that the control-resource set and the search space are used to transmit a first PDCCH M times includes: each MO in the M MOs and the control-resource set associated with the MO are used to transmit the first PDCCH once.

In a possible design, a frequency domain resource corresponding to the control-resource set includes M frequency domain resource parts, and the M frequency domain resource parts each are associated with the search space; and that the control-resource set and the search space are used to transmit a first PDCCH M times includes: each frequency domain resource part in the M frequency domain resource parts and the search space associated with the frequency domain resource part are used to transmit the first PDCCH once.

In a possible design, the control-resource set corresponds to M activated TCI-states; and the communication unit 1203 is specifically configured to receive, based on the M activated TCI-states, the first PDCCH on the time-frequency resource corresponding to the control-resource set and the search space.

In a possible design, if the control-resource set corresponds to M activated TCI-states, the communication unit 1203 is further configured to receive second indication information from the network device, where the second indication information is used to indicate to activate the M TCI-states corresponding to the control-resource set.

In a possible design, the second indication information includes one or more of the following:
  identifiers of the M TCI-states;
  first information, where the first information is used to indicate a quantity of activated TCI-states;
  second information, where the second information is used to indicate that there are a plurality of activated TCI-states; and
  third information, where the third information is used to indicate that the M TCI-states are used to simultaneously transmit the first PDCCH or transmit the first PDCCH through time division.

In a possible design, the time-frequency resource corresponding to the control-resource set and the search space includes M groups of time-frequency resources, and each group of time-frequency resources in the M groups of time-frequency resources is used to transmit the first PDCCH once; and the M groups of time-frequency resources are totally the same; or the M groups of time-frequency resources have a same time domain resource but different frequency domain resources; or the M groups of time-frequency resources have a same frequency domain resource but different time domain resources; or the M groups of time-frequency resources have different frequency domain resources and different time domain resources.

The apparatus 1200 may be the network device in any one of the foregoing embodiments, or may be a chip disposed in the network device. The processing unit 1202 may support the apparatus 1200 in performing actions of the network device in the foregoing method examples. Alternatively, the processing unit 1202 mainly performs internal actions of the network device in the method examples, and the communication unit 1203 may support communication between the apparatus 1200 and a terminal device. For example, the communication unit 1203 may be configured to perform step 501, step 503, and step 505 in FIG. 5, step 801, step 803, or step 805 in FIG. 8, step 901, step 903, and step 905 in FIG. 9, and step 1101, step 1103, and step 1105 in FIG. 11.

Specifically, in an embodiment, the communication unit 1203 is configured to: send configuration information to the terminal device, where the configuration information is used to configure one control-resource set and M search spaces, the control-resource set is associated with the M search spaces, and each search space in the M search spaces and the control-resource set associated with the search space are used to transmit a first PDCCH once; and transmit the first PDCCH M times on time-frequency resources corresponding to the control-resource set and the M search spaces, where M is an integer greater than 1.

In a possible design, the control-resource set meets a first preset condition, and/or the M search spaces meet a second preset condition.

In a possible design, that the control-resource set meets a first preset condition includes one or more of the following:
  the control-resource set is associated with a plurality of search spaces;
  the control-resource set corresponds to a plurality of activated TCI-states; and a quantity of activated TCI-states corresponding to the control-resource set is equal to a quantity of search spaces associated with the control-resource set; and
that the M search spaces meet a second preset condition includes one or more of the following:
  periods of the M search spaces are the same;
  duration of the M search spaces is the same; and
  time-domain start locations of the M search spaces are the same.

In a possible design, the communication unit 1203 is further configured to send first indication information to the terminal device, where the first indication information is used to indicate that the control-resource set and the M search spaces are used to transmit the first PDCCH M times.

In a possible design, a frequency domain resource corresponding to the control-resource set includes M frequency domain resource parts, and the M frequency domain resource parts are one-to-one associated with the M search spaces; and that each search space in the M search spaces and the control-resource set associated with the search space are used to transmit a first PDCCH once includes: each search space in the M search spaces and a frequency domain resource part associated with the search space are used to transmit the first PDCCH once.

In a possible design, the control-resource set corresponds to M activated TCI-states; and the communication unit 1203 is specifically configured to transmit, based on the M activated TCI-states, the first PDCCH on the time-frequency resources corresponding to the control-resource set and the M search spaces.

In a possible design, the M activated TCI-states are one-to-one associated with the M search spaces.

In a possible design, if the control-resource set corresponds to M activated TCI-states, the communication unit 1203 is further configured to send second indication information to the terminal device, where the second indication information is used to indicate to activate the M TCI-states corresponding to the control-resource set.

In a possible design, the second indication information includes one or more of the following:
  identifiers of the M TCI-states;
  first information, where the first information is used to indicate a quantity of activated TCI-states;
  second information, where the second information is used to indicate that there are a plurality of activated TCI-states; and
  third information, where the third information is used to indicate that the M TCI-states are used to simultaneously transmit the first PDCCH or transmit the first PDCCH through time division.

In a possible design, the time-frequency resources corresponding to the control-resource set and the M search spaces include M groups of time-frequency resources, and each search space in the M search spaces and the control-resource set associated with the search space correspond to one group of time-frequency resources in the M groups of time-frequency resources; and the M groups of time-frequency resources are totally the same; or the M groups of time-frequency resources have a same time domain resource but different frequency domain resources; or the M groups of time-frequency resources have a same frequency domain resource but different time domain resources; or the M groups of time-frequency resources have different frequency domain resources and different time domain resources.

In another embodiment, the communication unit 1203 is configured to: send configuration information to the terminal device, where the configuration information is used to configure M control-resource sets and M search spaces, the M control-resource sets are one-to-one associated with the M search spaces, and each control-resource set in the M control-resource sets and a search space associated with the control-resource set are used to transmit a first PDCCH once; and transmit the first PDCCH M times on time-frequency resources corresponding to the M control-resource sets and the M search spaces, where M is an integer greater than 1.

In a possible design, the M control-resource sets meet a first preset condition, and/or the M search spaces meet a second preset condition.

In a possible design, that the M control-resource sets meet a first preset condition includes: frequency domain resources corresponding to the M control-resource sets are the same, and/or DMRS scrambling identifiers of the M control-resource sets are the same; and that the M search spaces meet a second preset condition includes one or more of the following:
detection periods of the M search spaces are the same;
duration of the M search spaces is the same; and
time-domain start locations of the M search spaces are the same.

In a possible design, the communication unit 1203 is further configured to send first indication information to the terminal device, where the first indication information is used to indicate that the M control-resource sets and the M search spaces are used to transmit the first PDCCH M times.

In a possible design, each control-resource set in the M control-resource sets corresponds to one activated TCI-state; and the communication unit 1203 is specifically configured to transmit, based on the M activated TCI-states, the first PDCCH on the time-frequency resources corresponding to the M control-resource sets and the M search spaces.

In a possible design, the time-frequency resources corresponding to the M control-resource sets and the M search spaces include M groups of time-frequency resources, and each control-resource set in the M control-resource sets and the search space associated with the control-resource set correspond to one group of time-frequency resources in the M groups of time-frequency resources; and the M groups of time-frequency resources are totally the same; or the M groups of time-frequency resources have a same time domain resource but different frequency domain resources; or the M groups of time-frequency resources have a same frequency domain resource but different time domain resources; or the M groups of time-frequency resources have different frequency domain resources and different time domain resources.

In another embodiment, the communication unit 1203 is configured to: send configuration information to the terminal device, where the configuration information is used to configure M control-resource sets and one search space, the M control-resource sets each are associated with the search space, and each control-resource set in the M control-resource sets and the search space associated with the control-resource set are used to transmit a first PDCCH once; and transmit the first PDCCH M times on time-frequency resources corresponding to the M control-resource sets and the search space, where M is an integer greater than 1.

In a possible design, the M control-resource sets meet a first preset condition, and/or the search space meets a second preset condition.

In a possible design, that the M control-resource sets meet a first preset condition includes one or more of the following:

search spaces associated with the M control-resource sets are the same;
frequency domain resources corresponding to the M control-resource sets are the same; and
DMRS scrambling identifiers of the M control-resource sets are the same; and that the search space meets a second preset condition includes one or more of the following:
the search space is associated with a plurality of control-resource sets;
the search space includes a plurality of MOs; and
a quantity of MOs included in the search space is equal to a quantity of control-resource sets associated with the search space.

In a possible design, the communication unit 1203 is further configured to send first indication information to the terminal device, where the first indication information is used to indicate that the M control-resource sets and the search space are used to transmit the first PDCCH M times.

In a possible design, the search space includes M MOs, and the M MOs are one-to-one associated with the M control-resource sets; and that each control-resource set in the M control-resource sets and the search space associated with the control-resource set are used to transmit a first PDCCH once includes: each control-resource set in the M control-resource sets and an MO associated with the control-resource set are used to transmit the first PDCCH once.

In a possible design, each control-resource set in the M control-resource sets corresponds to one activated TCI-state; and the communication unit 1203 is specifically configured to transmit, based on the M activated TCI-states, the first PDCCH on the time-frequency resources corresponding to the M control-resource sets and the search space.

In a possible design, the time-frequency resources corresponding to the M control-resource sets and the search space include M groups of time-frequency resources, and each control-resource set in the M control-resource sets and the search space associated with the control-resource set correspond to one group of time-frequency resources in the M groups of time-frequency resources; and the M groups of time-frequency resources are totally the same; or the M groups of time-frequency resources have a same time domain resource but different frequency domain resources; or the M groups of time-frequency resources have a same frequency domain resource but different time domain resources; or the M groups of time-frequency resources have different frequency domain resources and different time domain resources.

In another embodiment, the communication unit 1203 is configured to: send configuration information to the terminal device, where the configuration information is used to configure one control-resource set and one search space, and the control-resource set is associated with the search space; and transmit a first PDCCH M times on a time-frequency resource corresponding to the control-resource set and the search space.

In a possible design, the control-resource set meets a first preset condition, and/or the search space meets a second preset condition.

In a possible design, that the control-resource set meets a first preset condition includes: the control-resource set corresponds to a plurality of activated TCI-states, or the control-resource set corresponds to a plurality of activated TCI-states, and a quantity of activated TCI-states corresponding to the control-resource set is equal to a quantity of MOs included in the search space; and that the search space meets a second preset condition includes: the search space includes a plurality of MOs, or the search space includes a plurality of MOs, and the quantity of MOs included in the search space is equal to the quantity of activated TCI-states corresponding to the control-resource set.

In a possible design, the communication unit 1203 is further configured to send first indication information to the terminal device, where the first indication information is used to indicate that the control-resource set and the search space are used to transmit the first PDCCH M times.

In a possible design, the search space includes M MOs, and the M MOs each are associated with the control-resource set; and each MO in the M MOs and the control-resource set associated with the MO are used to transmit the first PDCCH once.

In a possible design, a frequency domain resource corresponding to the control-resource set includes M frequency domain resource parts, and the M frequency domain resource parts each are associated with the search space; and each frequency domain resource part in the M frequency domain resource parts and the search space associated with the frequency domain resource part are used to transmit the first PDCCH once.

In a possible design, the control-resource set corresponds to M activated TCI-states; and the communication unit 1203 is specifically configured to transmit, based on the M activated TCI-states, the first PDCCH on the time-frequency resource corresponding to the control-resource set and the search space.

In a possible design, if the control-resource set corresponds to M activated TCI-states, the communication unit 1203 is further configured to send second indication information to the terminal device, where the second indication information is used to indicate to activate the M TCI-states corresponding to the control-resource set.

In a possible design, the second indication information includes one or more of the following:
  identifiers of the M TCI-states;
  first information, where the first information is used to indicate a quantity of activated TCI-states;
  second information, where the second information is used to indicate that there are a plurality of activated TCI-states; and
  third information, where the third information is used to indicate that the M TCI-states are used to simultaneously transmit the first PDCCH or transmit the first PDCCH through time division.

In a possible design, the time-frequency resource corresponding to the control-resource set and the search space includes M groups of time-frequency resources, and each group of time-frequency resources in the M groups of time-frequency resources is used to transmit the first PDCCH once; and the M groups of time-frequency resources are totally the same; or the M groups of time-frequency resources have a same time domain resource but different frequency domain resources; or the M groups of time-frequency resources have a same frequency domain resource but different time domain resources; or the M groups of time-frequency resources have different frequency domain resources and different time domain resources.

It should be understood that division into the units in the foregoing apparatuses is merely logical function division. During actual implementation, all or some of the units may be integrated into a physical entity, or may be physically separate. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be an independently disposed processing element, or may be integrated into a chip of the apparatuses for implementation. Alternatively, each unit may be stored in a memory in a form of a program to be invoked by a processing element of the apparatuses to perform a function of the unit. In addition, all or some of the units may be integrated together, or may be implemented independently. The processing element herein may also be referred to as a processor, and may be an integrated circuit having a signal processing capability. In an implementation process, the steps or the foregoing units in the foregoing methods may be implemented by using a hardware integrated logic circuit in the processing element, or may be implemented in a form of software invoked by the processing element.

For example, a unit in any one of the foregoing apparatuses may be one or more integrated circuits configured to implement the foregoing method, for example, one or more application-specific integrated circuits (ASICs), one or more microprocessors (digital signal processors, DSPs), one or more field programmable gate arrays (FPGAs), or a combination of at least two of the integrated circuits. For another example, when a unit in the apparatuses may be implemented in a form of a program invoked by the processing element, the processing element may be a general purpose processor, for example, a central processing unit (CPU), or another processor that can invoke the program. For still another example, the units may be integrated and implemented in a form of a system-on-a-chip (SOC).

The foregoing receiving unit is an interface circuit of the apparatus, and is configured to receive a signal from another apparatus. For example, when the apparatus is implemented in a form of a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented in a form of a chip, the sending unit is an interface circuit that is of the chip and that is configured to send a signal to another chip or apparatus.

Figure 13:
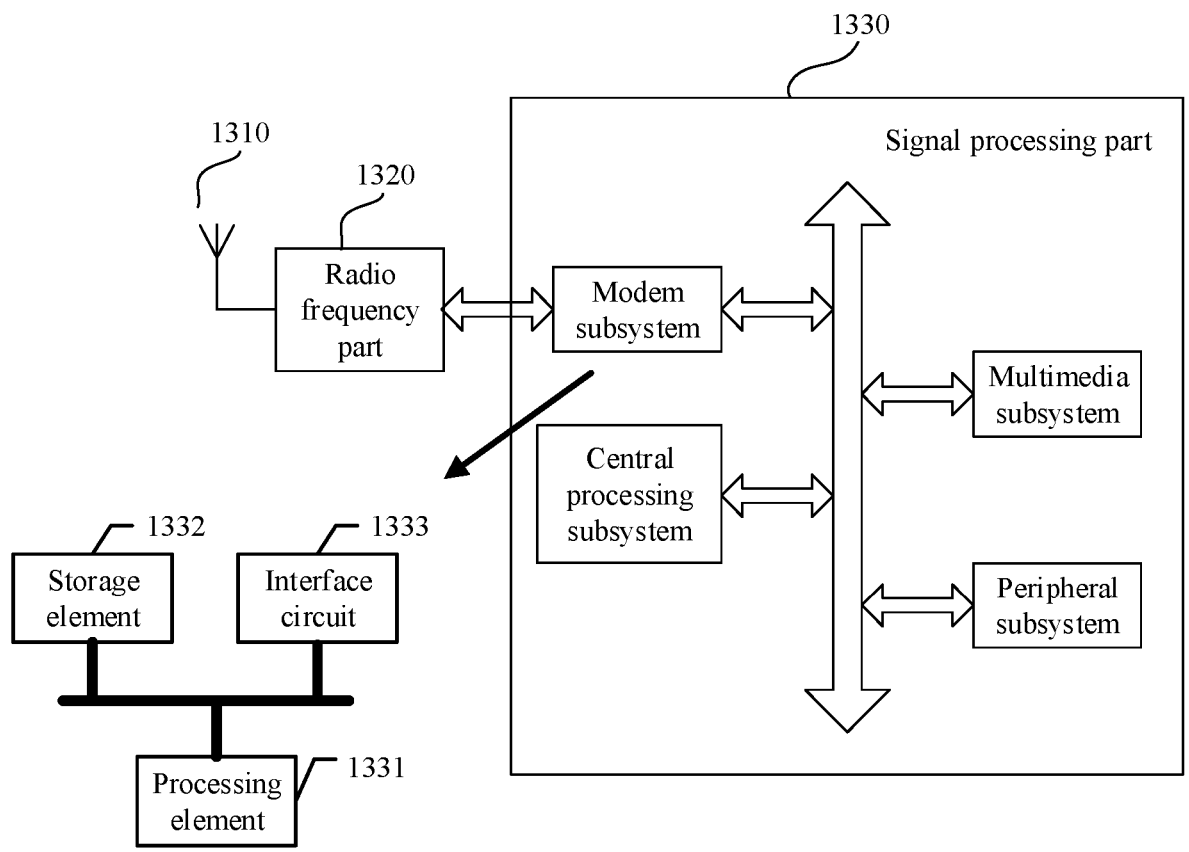
FIG. 13 is a schematic diagram of a structure of a terminal device according to an embodiment of this application.

FIG. 13 is a schematic diagram of a structure of a terminal device according to an embodiment of this application. The terminal device may be the terminal device in the foregoing embodiments and is configured to implement operations of the terminal device in the foregoing embodiments. As shown in FIG. 13, the terminal device includes an antenna 1310, a radio frequency part 1320, and a signal processing part 1330. The antenna 1310 is connected to the radio frequency part 1320. In a downlink direction, the radio frequency part 1320 receives, by using the antenna 1310, information sent by a network device, and sends, to the signal processing part 1330 for processing, the information sent by the network device. In an uplink direction, the signal processing part 1330 processes information of the terminal device, and sends the information to the radio frequency part 1320. The radio frequency part 1320 processes the information of the terminal device, and then sends the information to the network device by using the antenna 1310.

The signal processing part 1330 may include a modem subsystem, configured to process data at each communications protocol layer. The signal processing part 1330 may further include a central processing subsystem, configured to process an operating system and an application layer that are of the terminal device. In addition, the signal processing part 1330 may further include another subsystem, for example, a multimedia subsystem, or a peripheral subsystem. The multimedia subsystem is configured to control a camera or a screen display of the terminal device. The peripheral subsystem is configured to connect to another device. The modem subsystem may be a separately disposed chip.

The modem subsystem may include one or more processing elements 1331, for example, a main control CPU and another integrated circuit. In addition, the modem subsystem may further include a storage element 1332 and an interface circuit 1333. The storage element 1332 is configured to store data and a program. However, a program used to perform the methods performed by the terminal device in the foregoing methods may not be stored in the storage element 1332, but is stored in a memory outside the modem subsystem, and is loaded and used by the modem subsystem when to be used. The interface circuit 1333 is configured to communicate with another subsystem.

The modem subsystem may be implemented by using a chip. The chip includes at least one processing element and an interface circuit. The processing element is configured to perform steps of any method performed by the foregoing terminal device, and the interface circuit is configured to communicate with another apparatus. In an implementation, units of the terminal device that implement the steps of the foregoing methods may be implemented by a program invoked by a processing element. For example, the apparatus used for the terminal device includes a processing element and a storage element. The processing element invokes a program stored in the storage element, to perform the methods performed by the terminal device in the foregoing method embodiment. The storage element may be a storage element located on a same chip as the processing element, that is, an on-chip storage element.

In another implementation, a program used to perform the method performed by the terminal device in the foregoing methods may be in a storage element located on a different chip from the processing element, that is, an off-chip storage element. In this case, the processing element invokes or loads the program from the off-chip storage element to the on-chip storage element, to invoke and perform the methods performed by the terminal device in the foregoing method embodiments.

In still another implementation, units of the terminal device that implement the steps in the foregoing method may be configured as one or more processing elements. These processing elements are disposed in the modem subsystem. The processing element herein may be an integrated circuit, for example, one or more ASICs, one or more DSPs, one or more FPGAs, or a combination of these types of integrated circuits. These integrated circuits may be integrated together to form a chip.

The units of the terminal device that implement the steps in the foregoing method may be integrated together, and implemented in a form of a system-on-a-chip (SOC). The SOC chip is configured to implement the foregoing method. At least one processing element and storage element may be integrated into the chip, and the processing element invokes a program stored in the storage element to implement the foregoing methods performed by the terminal device. Alternatively, at least one integrated circuit may be integrated into the chip, to implement the foregoing methods performed by the terminal device. Alternatively, with reference to the foregoing implementations, functions of some units may be implemented by a program invoked by the processing element, and functions of some units may be implemented by the integrated circuit.

It can be learned that the foregoing apparatus used for the terminal may include at least one processing element and interface circuit. The at least one processing element is configured to perform any one of the methods that are provided in the foregoing method embodiments and performed by the terminal device. The processing element may perform some or all steps performed by the terminal device, in a first manner, to be specific, by invoking the program stored in the storage element; or may perform some or all steps performed by the terminal device, in a second manner, to be specific, by using a hardware integrated logic circuit in the processor element in combination with an instruction; or may certainly perform, by combining the first manner and the second manner, some or all steps performed by the terminal device.

The processing element herein is the same as that in the foregoing descriptions, and may be implemented by using a processor. A function of the processing element may be the same as a function of the processing unit described in FIG. 12. For example, the processing element may be a general purpose processor such as a CPU, or may be one or more integrated circuits configured to implement the foregoing method, such as one or more ASICs, one or more DSPs, one or more FPGAs, or a combination of at least two of these integrated circuit forms. The storage element may be implemented by using a memory, and a function of the storage element may be the same as a function of the storage unit described in FIG. 12. The storage element may be one memory, or may be a general term of a plurality of memories. The interface circuit may be implemented by using a transceiver, and the transceiver may include a receiver and/or a transmitter. The receiver is configured to implement a receiving operation, for example, receive a signal. The transmitter is configured to implement a sending operation, for example, send a signal. A function of the interface circuit may be the same as a function of the communication unit described in FIG. 12.

The terminal device shown in FIG. 13 can implement processes related to the terminal device in the method embodiment shown in FIG. 5, FIG. 8, FIG. 9, or FIG. 11. Operations and/or functions of each module in the terminal device shown in FIG. 13 are respectively used to implement corresponding processes in the foregoing method embodiments. For details, refer to the descriptions in the foregoing method embodiments. To avoid repetition, detailed descriptions are properly omitted herein.

Figure 14:
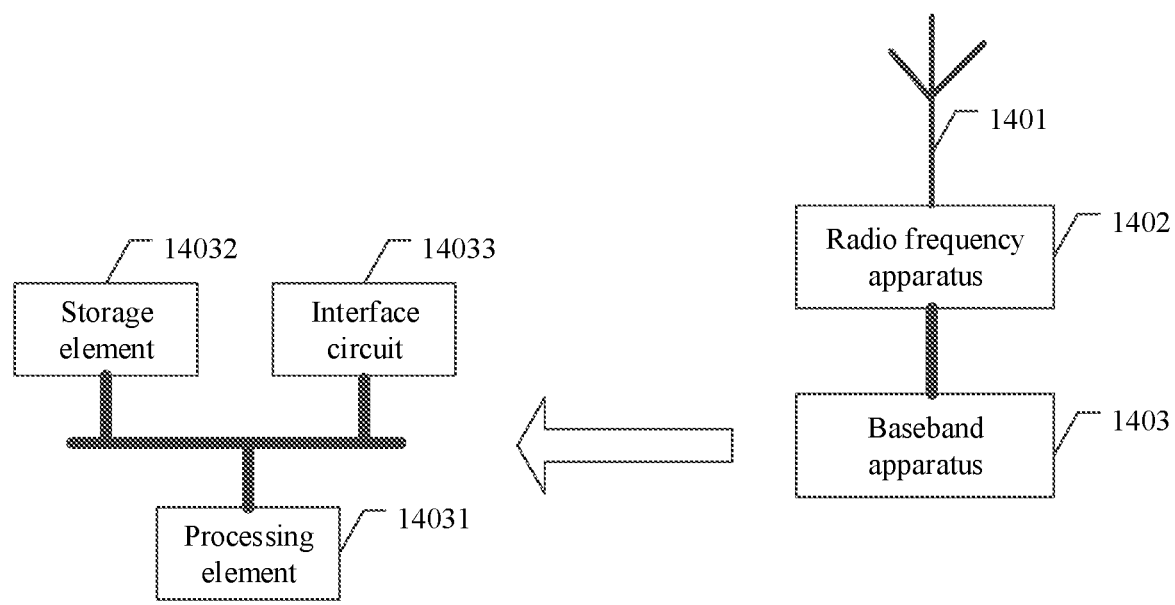
FIG. 14 is a schematic diagram of a structure of a network device according to an embodiment of this application.

FIG. 14 is a schematic diagram of a structure of a network device according to an embodiment of this application. The network device is configured to implement operations of the network device in the foregoing embodiments. As shown in FIG. 14, the network device includes an antenna 1401, a radio frequency apparatus 1402, and a baseband apparatus 1403. The antenna 1401 is connected to the radio frequency apparatus 1402. In an uplink direction, the radio frequency apparatus 1402 receives, through the antenna 1401, information sent by a terminal device, and sends, to the baseband apparatus 1403 for processing, the information sent by the terminal device. In a downlink direction, the baseband apparatus 1403 processes information of the terminal device, and sends the information to the radio frequency apparatus 1402. The radio frequency apparatus 1402 processes the information of the terminal device, and then sends the processed information to the terminal device through the antenna 1401.

The baseband apparatus 1403 may include one or more processing elements 14031, for example, include one main control CPU and another integrated circuit. In addition, the baseband apparatus 1403 may further include a storage element 14032 and an interface circuit 14033. The storage element 14032 is configured to store a program and data. The interface circuit 14033 is configured to exchange information with the radio frequency apparatus 1402, and the interface is, for example, a common public radio interface (CPRI). The foregoing apparatus used for the network device may be located in the baseband apparatus 1403. For example, the foregoing apparatus used for the network device may be a chip on the baseband apparatus 1403. The chip includes at least one processing element and interface circuit. The processing element is configured to perform the steps in any one of the methods performed by the network device. The interface circuit is configured to communicate with another apparatus. In an implementation, units, in the network device, for implementing the steps in the foregoing method may be implemented by scheduling a program by a processing element. For example, the apparatus used in the network device includes a processing element and a storage element. The processing element invokes a program stored in the storage element, to perform the method performed by the network device in the foregoing method embodiments. The storage element may be a storage element located on a same chip as the processing element, namely, an on-chip storage element, or may be a storage element located on a different chip from the processing element, namely, an off-chip storage element.

In another implementation, units of the network device that implement the steps in the foregoing method may be configured as one or more processing elements. These processing elements are disposed on the baseband apparatus. The processing element herein may be an integrated circuit, for example, one or more ASICs, one or more DSPs, one or more FPGAs, or a combination of these types of integrated circuits. These integrated circuits may be integrated together to form a chip.

Units of the network device that implement the steps in the foregoing methods may be integrated together, and implemented in a form of a system-on-a-chip (SOC). For example, the baseband apparatus includes the SOC chip, configured to implement the foregoing methods. At least one processing element and storage element may be integrated into the chip, and the processing element invokes a program stored in the storage element to implement the foregoing methods performed by the network device. Alternatively, at least one integrated circuit may be integrated into the chip, to implement the foregoing methods performed by the network device. Alternatively, with reference to the foregoing implementations, functions of some units may be implemented by a program invoked by the processing element, and functions of some units may be implemented by the integrated circuit.

It can be learned that the foregoing apparatus used for the network device may include at least one processing element and interface circuit. The at least one processing element is configured to perform any one of the methods that are provided in the foregoing method embodiments and performed by the network device. The processing element may perform some or all steps performed by the network device, in a first manner, to be specific, by invoking the program stored in the storage element; or may perform some or all steps performed by the network device, in a second manner, to be specific, by using a hardware integrated logic circuit in the processor element in combination with an instruction; or may certainly perform, by combining the first manner and the second manner, some or all steps performed by the network device.

The processing element herein is the same as that in the foregoing descriptions, and may be implemented by using a processor. A function of the processing element may be the same as a function of the processing unit described in FIG. 12. For example, the processing element may be a general purpose processor such as a CPU, or may be one or more integrated circuits configured to implement the foregoing method, such as one or more ASICs, one or more DSPs, one or more FPGAs, or a combination of at least two of these integrated circuit forms. The storage element may be implemented by using a memory, and a function of the storage element may be the same as a function of the storage unit described in FIG. 12. The storage element may be one memory, or may be a general term of a plurality of memories. The interface circuit may be implemented by using a transceiver, and the transceiver may include a receiver and/or a transmitter. The receiver is configured to implement a receiving operation, for example, receive a signal. The transmitter is configured to implement a sending operation, for example, send a signal. A function of the interface circuit may be the same as a function of the communication unit described in FIG. 12.

The network device shown in FIG. 14 can implement processes related to the network device in the method embodiment shown in FIG. 5, FIG. 8, FIG. 9, or FIG. 11. Operations and/or functions of each module in the network device shown in FIG. 14 are respectively used to implement corresponding processes in the foregoing method embodiments. For details, refer to the descriptions in the foregoing method embodiments. To avoid repetition, detailed descriptions are properly omitted herein.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

The computer program instructions may alternatively be stored in a computer readable memory that can indicate the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device to generate computer-implemented processing. Therefore, the instructions executed on the computer or the another programmable device provide steps for implementing a specified function in one or more processes in the flowcharts and/or in one or more blocks in the block diagrams.

A person skilled in the art can make various modifications and variations to this application without departing from the scope of this application. This application is intended to cover these modifications and variations of this application provided that they fall within the scope of the claims of this application and their equivalent technologies.

What is claimed is:

1. A communication method, wherein the method comprises:
   receiving configuration information from a network device, wherein the configuration information is used to configure M control-resource sets and M search spaces, M is an integer greater than 1, the M control-resource sets are in one-to-one association with the M search spaces, and each search space in the M search spaces and an associated control-resource set in the M control-resource sets are used to transmit a first physical downlink control channel (PDCCH) once;
   receiving first indication information from the network device, wherein the first indication information indicates that the M search spaces have an association relationship, and the M search spaces are used to transmit the first PDCCH M times; and
   monitoring the first PDCCH on time-frequency resources corresponding to the M control-resource sets and the M search spaces.

2. The method according to claim 1, wherein the M search spaces satisfy one or more of the following:
   detection periods of the M search spaces are the same;
   slot offsets of the M search spaces are the same; and
   duration of the M search spaces is the same.

3. The method according to claim 1, wherein the M control-resource sets satisfy:
   first parameters of the M control-resource sets are the same, wherein a first parameter of a first control-resource set in the M control-resource sets indicates whether a PDCCH corresponding to the first control-resource set comprises a transmission configuration indication (TCI) field.

4. The method according to claim 1, wherein the M search spaces comprise a first search space, configuration information of the first search space comprises the first indication information, and the first indication information comprises identifier information of another search space other than the first search space in the M search spaces.

5. A communication method, wherein the method comprises:
   sending, by a network device, configuration information to a terminal device, wherein the configuration information is used to configure M control-resource sets and M search spaces, M is an integer greater than 1, the M control-resource sets are in one-to-one association with the M search spaces, and each search space in the M search spaces and an associated control-resource set in the M control-resource sets are used to transmit a first physical downlink control channel (PDCCH) once;
   sending, by the network device, first indication information to the terminal device, wherein the first indication information indicates that the M search spaces have an association relationship, and the M search spaces are used to transmit the first PDCCH M times; and
   transmitting, by the network device, the first PDCCH M times on time-frequency resources corresponding to the M control-resource sets and the M search spaces.

6. The method according to claim 5, wherein the M search spaces satisfy one or more of the following:
   detection periods of the M search spaces are the same;
   slot offsets of the M search spaces are the same; and
   duration of the M search spaces is the same.

7. The method according to claim 5, wherein the M control-resource sets satisfy:
   first parameters of the M control-resource sets are the same, wherein a first parameter of a first control-resource set in the M control-resource sets indicates whether a PDCCH corresponding to the first control-resource set comprises a transmission configuration indication (TCI) field.

8. The method according to claim 5, wherein the M search spaces comprise a first search space, configuration information of the first search space comprises the first indication information, and the first indication information comprises identifier information of another search space other than the first search space in the M search spaces.

9. A communications apparatus, comprising:
   at least one processor and a communication interface receiving programming instructions, wherein the at least one processor executes the programming instructions to cause the apparatus to:
   receive configuration information from a network device, wherein the configuration information is used to configure M control-resource sets and M search spaces, M is an integer greater than 1, the M control-resource sets are in one-to-one association with the M search spaces, and each search space in the M search spaces and an associated control-resource set in the M control-resource sets are used to transmit a first physical downlink control channel (PDCCH) once;
   receive first indication information from the network device, wherein the first indication information indicates that the M search spaces have an association relationship, and the M search spaces are used to transmit the first PDCCH M times; and
   monitor the first PDCCH on time-frequency resources corresponding to the M control-resource sets and the M search spaces.

10. The communications apparatus according to claim 9, wherein the M search spaces satisfy one or more of the following:
    detection periods of the M search spaces are the same;
    slot offsets of the M search spaces are the same; and
    duration of the M search spaces is the same.

11. The communications apparatus according to claim 9, wherein the M control-resource sets satisfy:
    first parameters of the M control-resource sets are the same, wherein a first parameter of a first control-resource set in the M control-resource sets indicates whether a PDCCH corresponding to the first control-resource set comprises a transmission configuration indication (TCI) field.

12. The communications apparatus according to claim 9, wherein the M search spaces comprise a first search space, configuration information of the first search space comprises the first indication information, and the first indication information comprises identifier information of another search space other than the first search space in the M search spaces.

13. A communications apparatus, comprising:
   at least one processor and a communication interface receiving programming instructions, wherein the at least one processor executes the programming instructions to cause the apparatus to:
   send configuration information to a terminal device, wherein the configuration information is used to configure M control-resource sets and M search spaces, M is an integer greater than 1, the M control-resource sets are in one-to-one association with the M search spaces, and each search space in the M search spaces and an associated control-resource set in the M control-resource sets are used to transmit a first physical downlink control channel (PDCCH) once;
   send first indication information to the terminal device, wherein the first indication information indicates that the M search spaces have an association relationship, and the M search spaces are used to transmit the first PDCCH M times; and
   transmit the first PDCCH M times on time-frequency resources corresponding to the M control-resource sets and the M search spaces.

14. The communications apparatus according to claim 13, wherein the M search spaces satisfy one or more of the following:
   detection periods of the M search spaces are the same;
   slot offsets of the M search spaces are the same; and
   duration of the M search spaces is the same.

15. The communications apparatus according to claim 13, wherein the M control-resource sets satisfy:
   first parameters of the M control-resource sets are the same, wherein a first parameter of a first control-resource set in the M control-resource sets indicates whether a PDCCH corresponding to the first control-resource set comprises a transmission configuration indication (TCI) field.

16. The communications apparatus according to claim 13, wherein the M search spaces comprise a first search space, configuration information of the first search space comprises the first indication information, and the first indication information comprises identifier information of another search space other than the first search space in the M search spaces.

* * * * *